(12) United States Patent
Onuki et al.

(10) Patent No.: US 7,567,369 B2
(45) Date of Patent: Jul. 28, 2009

(54) OPTICAL APPARATUS

(75) Inventors: Ichiro Onuki, Kawasaki (JP); Goro Noto, Tokyo (JP); Eriko Kawanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/213,173

(22) Filed: Jun. 16, 2008

(65) Prior Publication Data

US 2008/0252990 A1  Oct. 16, 2008

Related U.S. Application Data

(62) Division of application No. 11/601,769, filed on Nov. 20, 2006, now Pat. No. 7,388,705, which is a division of application No. 11/184,937, filed on Jul. 20, 2005, now Pat. No. 7,142,344, which is a division of application No. 10/914,269, filed on Aug. 10, 2004, now Pat. No. 6,950,219, which is a division of application No. 09/795,397, filed on Mar. 1, 2001, now Pat. No. 6,806,988.

(30) Foreign Application Priority Data

| Mar. 3, 2000 | (JP) | 2000-058295 |
|---|---|---|
| Mar. 3, 2000 | (JP) | 2000-058312 |
| Mar. 3, 2000 | (JP) | 2000-058377 |
| Jun. 22, 2000 | (JP) | 2000-187227 |

(51) Int. Cl.
*G02F 1/03* (2006.01)
*G02B 1/06* (2006.01)

(52) U.S. Cl. .............. 359/253; 359/245; 359/250; 359/254; 359/665; 359/666

(58) Field of Classification Search .............. 359/245, 359/246, 250, 252, 253, 254, 259, 665, 666
See application file for complete search history.

(56) References Cited

U.S. PATENT DOCUMENTS

| 5,576,893 | A | 11/1996 | Yamanouchi |
|---|---|---|---|
| 6,369,954 | B1 | 4/2002 | Berge et al. |
| 6,469,683 | B1 | 10/2002 | Suyama et al. |
| 6,577,343 | B2 * | 6/2003 | Ohkawara .............. 348/347 |

FOREIGN PATENT DOCUMENTS

| JP | 06-303492 | 10/1994 |
|---|---|---|
| JP | 08-114703 | 5/1996 |
| JP | 2633079 | 4/1997 |
| JP | 11-133210 | 5/1999 |
| WO | 99-18456 | 4/1999 |

* cited by examiner

*Primary Examiner*—William C Choi
*Assistant Examiner*—Jack Dinh
(74) *Attorney, Agent, or Firm*—Fitzpatrick, Cella, Harper & Scinto

(57) ABSTRACT

To provide an optical apparatus which controls an interface state to change a focal length by using an optical element having a container sealing first liquid that is conductive or polarized and second liquid that does not mutually mix with the first liquid with their interface in a predetermined form and electrodes provided in the container and of which optical characteristics change according to change of interface form due to application of voltage to the electrodes, and in particular an optical apparatus that controls a duty ratio of alternating current voltage applied to said electrodes for changing said interface form.

2 Claims, 55 Drawing Sheets

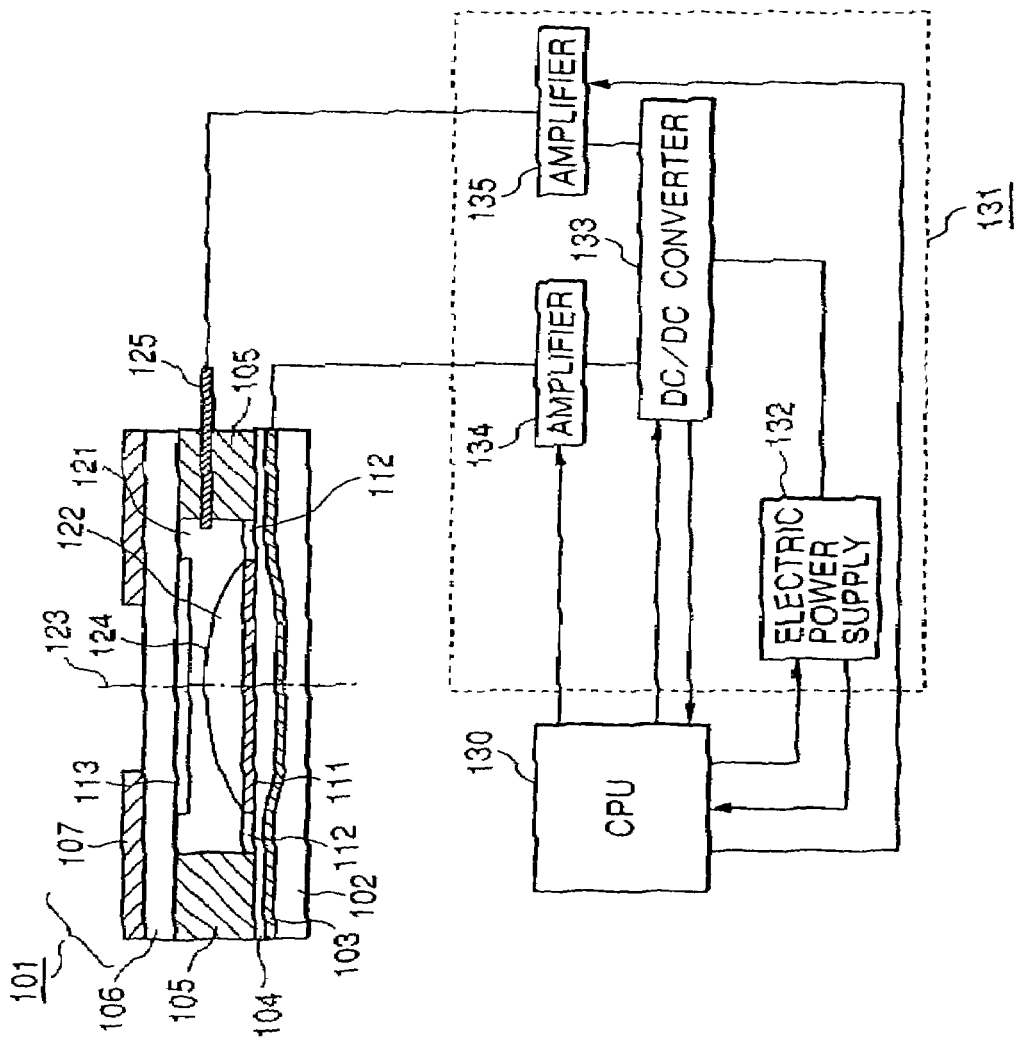

WAVE FORM A

WAVE FORM B

FIG. 26

|  | f=20mm | f=15mm | f=12mm | f=10mm |
|---|---|---|---|---|
| −5 °C | 30V | 145V | 166V | 218V |
| 0 °C | 28V | 142V | 163V | 214V |
| 10 °C | 25V | 140V | 160V | 210V |
| 20 °C | 22V | 137V | 158V | 207V |
| 30 °C | 20V | 133V | 154V | 203V |
| 40 °C | 18V | 130V | 151V | 198V |

UNDER OPERATION OF T SIDE ZOOM SWITCH

UNDER OPERATION OF W SIDE ZOOM SWITCH

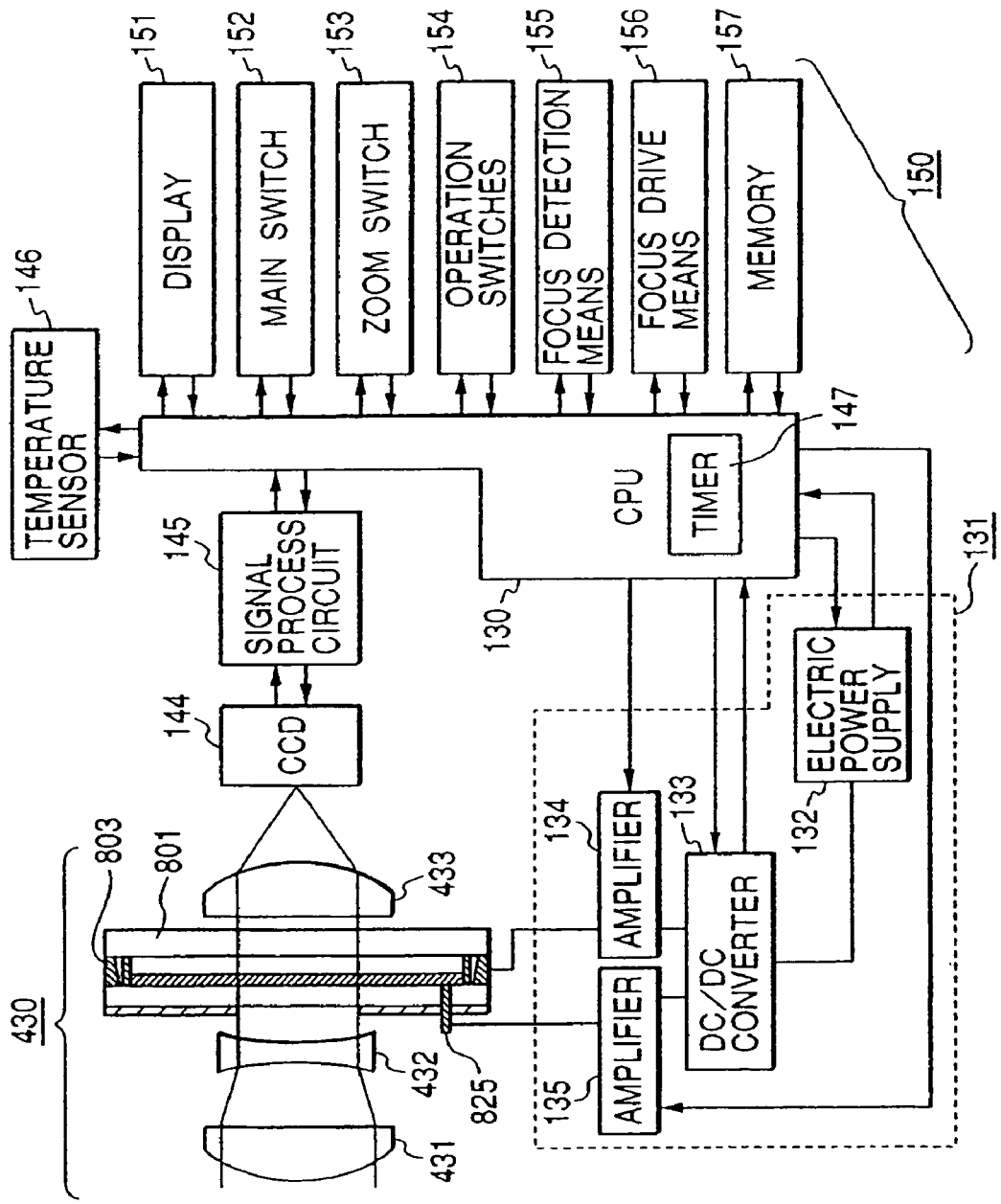

OPTICAL APPARATUS

BACKGROUND OF THE INVENTION

1. Field of the Invention

The present invention relates to an optical apparatus including an optical element utilizing electro-wetting (electro-capillarity), and in particular to power supply means for driving the element.

2. Related Background Art

Of optical systems built into optical apparatuses such as a still camera and a video camera, those capable of changing a focal length mostly change a focal length of the entire optical system by mechanically moving part of lenses (or a lens group) comprising the optical system in a direction of an optical axis.

For instance, Japanese Patent No. 2633079 shows a configuration wherein, of a zoom lens-barrel comprising a first group of lenses moving in a direction of an optical axis by zooming, a first group of lens-barrels moving in the optical axis direction on movement of the first group of lenses and a cam barrel moving in the optical axis direction due to movement of the first group of lens-barrels, the first group of lens-barrels fit an outer-diameter side of a fixed barrel, the cam barrel fits an inner-diameter side of the fixed barrel, and a front part of the cam barrel fits an inner diameter side of the first group of lens-barrels, and the cam barrel is moved in the optical axis direction so as to move the first group of lenses and perform zooming.

Thus, in the case of changing a focal length by mechanically moving lenses (or a lens group) in a direction of an optical axis, there is a deficiency, that is, complicated mechanical structure of the optical apparatus.

To solve this deficiency, there is a case of rendering a focal length variable by changing optical characteristics of a lens itself.

For instance, Japanese Patent Application Laid-Open No. 8-114703 provides a varifocal lens wherein, in the case where hydraulic fluid is filled in a pressure chamber at least one side of which is comprised of a transparent elastic diaphragm, and the transparent elastic diaphragm is deformed by hydraulic fluid pressure exerted on the diaphragm to render a focal length under variable control, the deformed form of the transparent elastic diaphragm is optimized so as to make lens aberration less likely to occur, and also hydraulic fluid pressure in the pressure chamber is measured with a pressure sensor formed on the transparent elastic diaphragm so that, by adjusting hydraulic fluid pressure based on that value, change of a focal length due to thermal expansion and contraction of hydraulic fluid and so on can also be controlled.

In addition, in Japanese Patent Application Laid-Open No. 11-133210, an electric potential difference is given between a first electrode and a conductive elastic plate to lessen the space between them by generating attraction by Coulomb's force, and it consequently becomes possible, by using a volume of transparent liquid excluded from the space between them, to make convex and deform a central portion of the transparent elastic plate with respect to its back facing the transparent liquid. Then, a convex lens is formed by the convex-deformed transparent elastic plate, transparent plate and the transparent liquid filled between them, so that power of this convex lens is adjusted by the above electric potential difference to constitute a varifocal lens.

On the other hand, a varifocal lens using electro-capillarity is disclosed by WO99/18456. If this technique is used, electrical energy can be used directly to change form of a lens formed by an interface between the first and second liquid, so that it becomes possible to make the lens varifocal without mechanically moving it.

However, the above-mentioned related arts have the following problems. For instance, the above Japanese Patent Application Laid-Open No. 8-114703 describes an actuator controlling apparatus for driving an actuator wherein, as the actuator, a unimorph mechanism by a piezoelectric element formed on a transparent elastic diaphragm is utilized. However, this known technique requires high rigidity of the elastic deformed portion, and consequently has a fault of requiring large amounts of electric power.

Moreover, the above Japanese Patent Application Laid-Open No. 11-133210 also requires high rigidity of the elastic deformed portion, and consequently has a fault of requiring large amounts of electric power likewise.

Furthermore, the above WO99/18456 can change optical power with small amounts of electric power since there is no mechanical movable part, but there is no detailed description of power means, and a technique for controlling optical power with precision and small amounts of electric power is not disclosed.

SUMMARY OF THE INVENTION

One aspect of the invention is to provide an optical apparatus which controls, in a short time and properly or in a state of reduced power consumption or in a state suited to a photography sequence, an optical element comprising a container sealing first liquid that is conductive or polarized and second liquid that does not mutually mix with the first liquid with their interface in a predetermined form and electrodes provided in the container and of which optical characteristics change according to change of interface form due to application of voltage to the electrodes.

One aspect of the invention is to duty-drive the element for the above object.

One aspect of the invention is to drive the element by controlling a frequency for the above object.

One aspect of the invention is to provide an apparatus for, on driving the element, transitionally applying first voltage and switching to second voltage from that state for the above object.

One aspect of the invention is to provide an apparatus for, on using the element as an optical system of a camera, inhibiting photography from being performed before a predetermined time passes from application of voltage to the element for the above object.

One aspect of the invention is to provide an apparatus for stopping application of voltage when operation of an operating member for changing a voltage signal to be applied to the element is not performed for a predetermined time for the above object.

One aspect of the invention is to provide an apparatus for storing a voltage signal applied to the element at a last photography time and applying a voltage signal corresponding to this stored value at a next photography time for the above object.

One aspect of the invention is to provide an apparatus for detecting electrostatic capacity of an optical element to determine and control a state of interface form of an optical apparatus for the above object.

Other objects of the present invention will become clearer from the embodiments described hereunder by using the drawings.

BRIEF DESCRIPTION OF THE DRAWINGS

FIG. 7 is a diagram describing an optical element and power supply means in the first embodiment of the present invention;

FIG. 26 is an example of temperature correction table in the fourth embodiment of the present invention;

FIG. 39 is a diagram describing optical action of an optical element in the eighth embodiment of the present invention;

DESCRIPTION OF THE PREFERRED EMBODIMENTS

First Embodiment

Figure 1A:
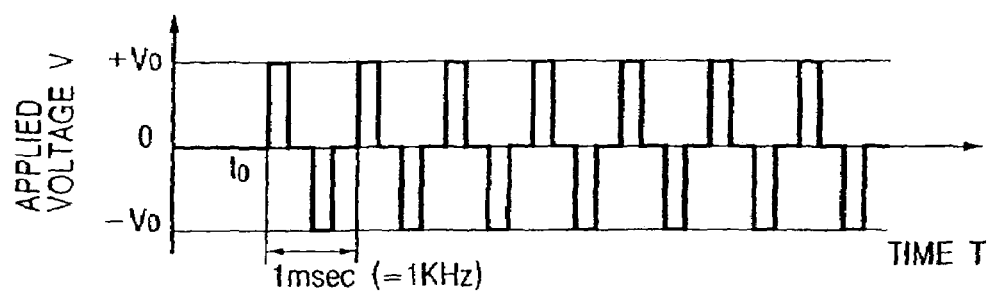
FIGS. 1A, 1B and 1C are diagrams describing power supply controlling methods of an optical element in the first embodiment of the present invention respectively.
Figure 1B:
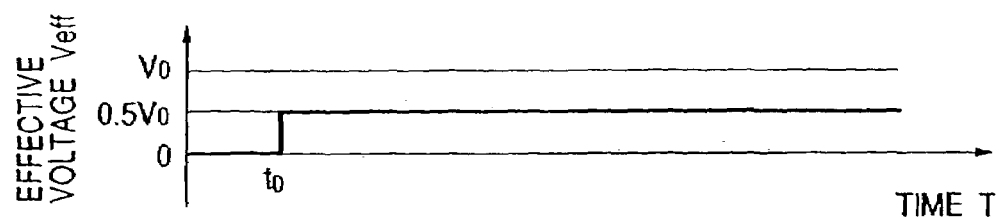
Figure 1C:
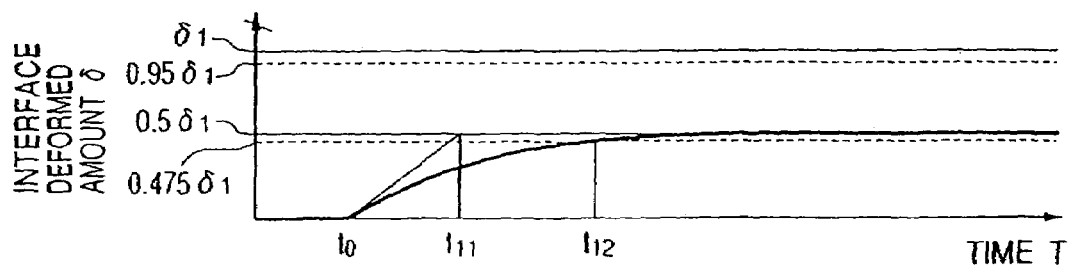
Figure 2:
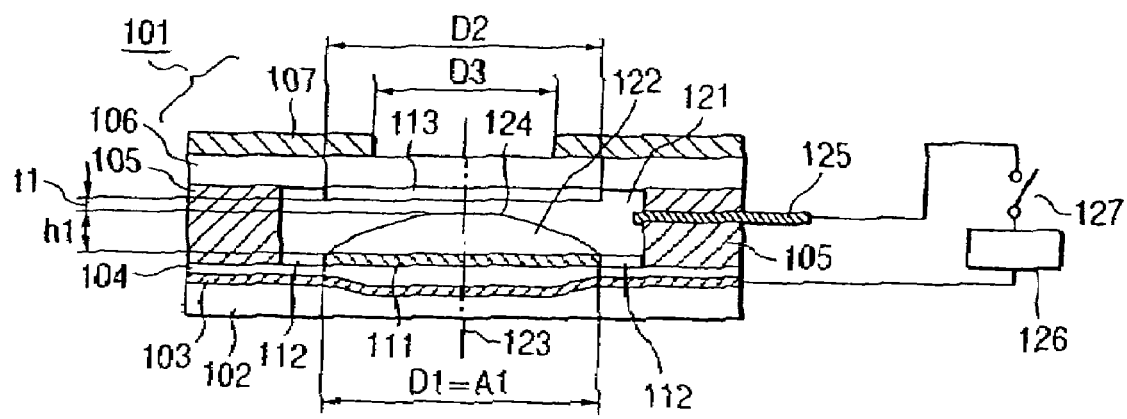
FIG. 2 is a sectional view of an optical element in the first embodiment of the present invention.

FIGS. 1A to 1C through FIGS. 11A to 11C are explanatory views for describing a configuration of a first embodiment of the present invention, and FIG. 2 is a sectional view showing a configuration of an optical element of this embodiment. With reference to FIG. 2, at first, the configuration and a producing method of this embodiment will be described.

In FIG. 2, reference numeral 101 denotes the optical element of the present invention in its entirety while reference numeral 102 denotes a transparent substrate made of transparent acryl in which a concave portion is provided in the center thereof. On the upper face of the transparent substrate 102, a transparent electrode (ITO) 103 made of indium tin oxide is formed by sputtering, and in tight contact with the upper face thereof, an insulating layer 104 made of transparent acryl is provided. The insulating layer 104 is formed by dripping replica resin onto the center of the above described transparent electrode 103, and pushing it with a glass plate for flattening and smoothing its surface, and thereafter radiation by UV is implemented for hardening and forming. Onto the upper surface of the insulating layer 104, a shading cylindrical container 105 is fixed by gluing, and onto it a cover plate 106 made of transparent acryl is fixed by gluing, and moreover onto it a diaphragm plate 107 having opening of diameter D3 in the center is disposed. In the above described configuration, a sealed space of a predetermined volume enclosed by the insulating layer 104, the container 105 and the upper cover 106, that is, a box having a liquid chamber is formed. In addition, surface treatment described below is implemented on the wall of the liquid chamber.

At first, a water-repelling treatment agent is applied to the central upper surface of the insulating layer 104 within the range of the diameter D1 to form a water-repelling film 111. For the water-repelling agent, fluoride compounds, etc. are suitable. In addition, in the outskirt range beyond the diameter D1 on the upper surface of the insulating layer 104, a hydrophilic treatment agent is applied so that a hydrophilic film 112 is formed. As a hydrophilic agent, surface-active agent and hydrophilic polymer, etc. are suitable. On the other hand, on the bottom surface of the cover plate 106, hydrophilic treatment is implemented within a range of the diameter D2 so that a hydrophilic film 113 having properties as the above described hydrophilic film 112 is formed. In addition, all the configuring members having been described so far are shaped rotary symmetrical around an optical axis 123. Moreover, a hole is formed in a portion of the container 105, and thereto a stick-like electrode 125 is inserted and sealed by adhesive agent to maintain a sealing state of the above-described liquid chamber. In addition, power supply means 126 is brought into connection with the transparent electrode 103 and the stick-like electrode 125 and with operation on a switch 127 a predetermined voltage is arranged to be applicable between the both electrodes.

The liquid chamber configured as described so far will be filled with two kinds of liquid as described below. At first, onto the water-repelling film 111 on the insulating layer 104 a predetermined quantity of a second liquid 122 is dripped. The second liquid 122 is colorless and transparent, and silicone oil which has specific gravity of 1.06 and a refractive index of 1.49 in a room temperature will be used. On the other hand, the remaining space inside the liquid chamber is filled with conductive or polarized first liquid 121. The first liquid 121 is electrolytic solution, which is a mixture of water and ethyl-alcohol at a predetermined ratio and moreover to which a predetermined quantity of salt (sodium chloride) is added, with specific gravity 1.06 and with refractive index 1.38 under a room temperature. That is, for the first and the second liquid, liquids which have the same specific gravity and are insoluble each other are selected. There, the both liquids form an interface 124 and each of them exists independently without being mixed together.

Next, the shape of the above-described interface will be described. At first, in the case where no voltage is applied to the first liquid, the shape of the interface 124 is determined by interfacial tension between both liquids, interfacial tension between the first liquid and the water-repelling film 111 or the hydrophilic film 112 on the insulating layer 104, interfacial tension between the second liquid and the water-repelling film 111 or the hydrophilic film 112 on the insulating layer 104, and volume of the second liquid. In this embodiment selection of materials is implemented so that interfacial tension between silicone oil being material for the second liquid 122 and the water-repelling film 111 becomes relatively small. That is, wet-aptness is high between both materials and therefore the outer periphery of lens-shaped drops which the second liquid 122 form tends to expand and is stabilized where the outer periphery corresponds with the application region of the water-repelling film 111. That is, the diameter A1 of the bottom surface of the lens which the second liquid forms is equal to the diameter D1 of the water-repelling film 111. On the other hand, since the specific gravity of the both liquids is the same as described above, gravity is not influential. Then, the interface 124 becomes spherical, and the radius of curvature as well the height h1 thereof are determined by the volume of the second liquid 122. In addition, thickness of the first liquid on the optical axis will be t1.

On the other hand, when the switch 127 is operated to close so that a voltage is applied to the first liquid 121, electric capillary phenomenon causes the interfacial tension between the first liquid 121 and the hydrophilic film 112 to decrease and the first liquid trespass the interface between the hydrophilic film 112 and the water-repelling film 111 to penetrate into region on the water-repelling film 111. Consequently, as in FIG. 3, the diameter of the bottom surface of the lens which the second liquid forms decreases from A1 to A2 while its height increases from h1 to h2. In addition, thickness of the first liquid on the optical axis will be t2. Thus, application of voltage to the first liquid 121 changes balance in the interfacial tensions of the two kinds of liquid so that the interface between the two liquids is deformed. Accordingly, such an optical element that can freely deform the interface 124 with voltage control on the power supply means 126 can be realized. In addition, the first as well as the second liquid have different refractive indexes to provide a power as an optical lens and therefore the optical element 101 will be a variable focusing lens with deformation of the interface 124.

Figure 3:
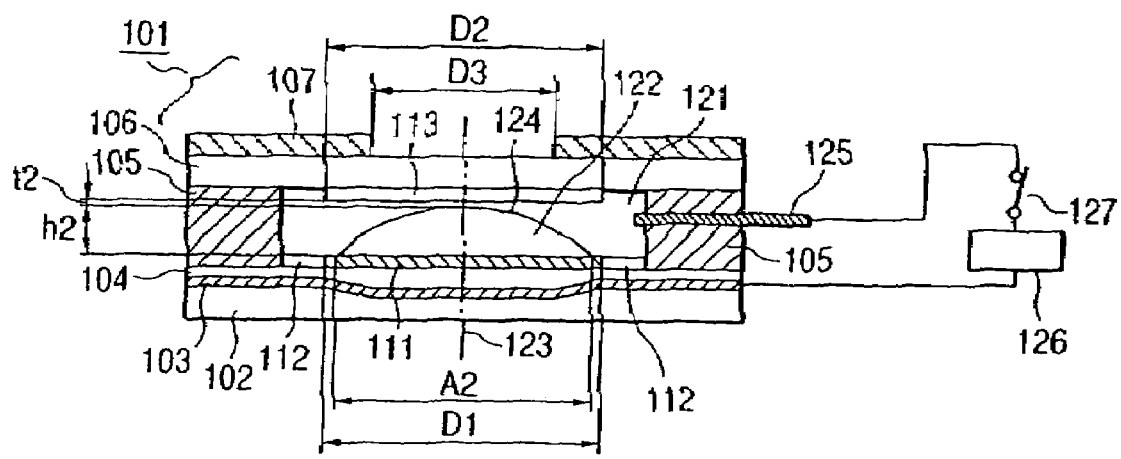
FIG. 3 is a diagram describing operation on applying voltage to an optical element in the first embodiment of the present invention.

Moreover, since compared with FIG. 2 the interface 124 in FIG. 3 is shorter in the radius of curvature, the optical element 101 in the state shown in FIG. 3 has a focal length shorter than that in the state shown in FIG. 2.

Figure 4A:
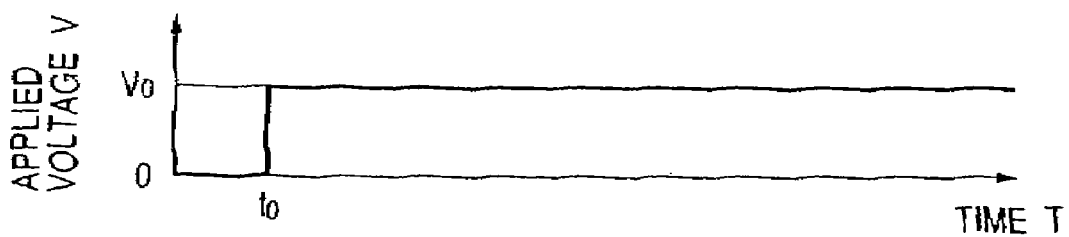
FIGS. 4A and 4B are diagrams describing operation on applying DC voltage to an optical element of the present invention respectively.
Figure 4B:
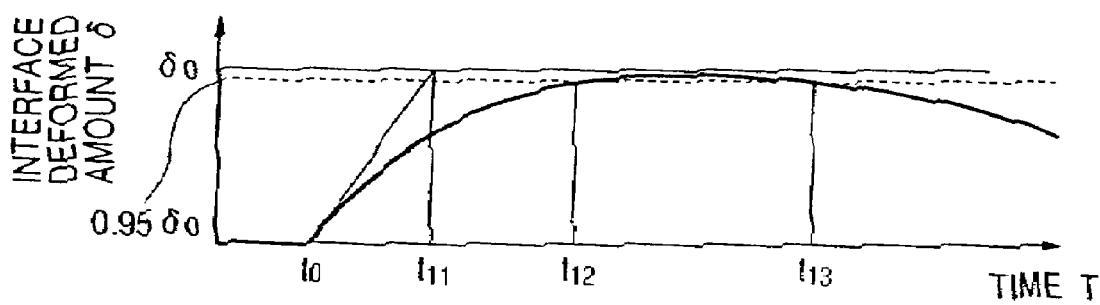

FIGS. 4A and 4B are explanatory views conceptually showing deformation process of the interface 124 of the optical element 101 when the power supply means 126 are caused to give rise to a direct voltage.

In FIG. 4A, a step-like direct current voltage of voltage $V_0$ is applied to the optical element 101 at time $t_0$. At this time, the interface which both liquids form in the optical element 101 responds as a curve shown in FIG. 4B. That is, the deformed amount starts with a predetermined time constant to reach a value of 95% of the final deformed amount δo at time $t_{12}$, and gets further closer toward δo, but regardless of the voltage being applied, the subsequent deformed amount decreases. This is originated in that in FIG. 3 charges are gradually implanted into the insulating layer 104 and electric capillary phenomenon is caused to decrease. In order to avoid this phenomena, it is described in page 158 of Comptes Rendus des Seances dei'Academie des Science 317 (1993) that an alternate current electric power supply of around 50 to 3 kHz can be successfully used as the power supply means 126.

Incidentally, the reference character δ conceptually denotes interface deformed amount, and does not mean a numerical value directly describing height or contact angle of an interface but intensity of electric capillary phenomenon.

Figure 5A:
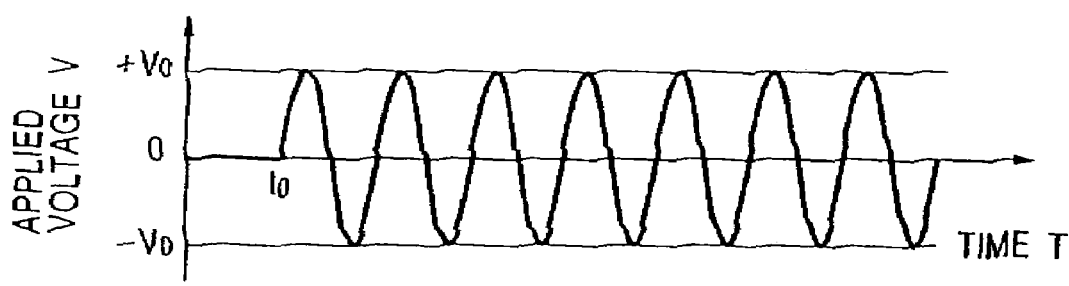
FIGS. 5A and 5B are diagrams describing operation on applying AC voltage to an optical element of the present invention respectively.
Figure 5B:
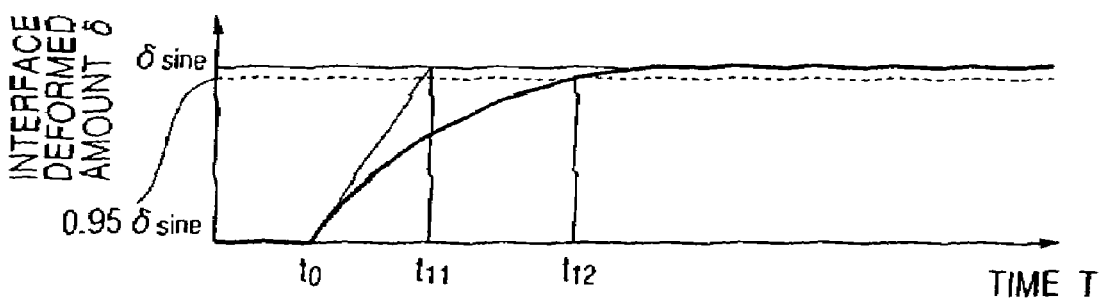

FIGS. 5A and 5B are explanatory views conceptually showing deformation process of the interface 124 of the optical element 101 when the power supply means 126 is caused to give rise to an alternate current voltage.

In FIG. 5A, when a sine-wave-like alternate current voltage of maximum voltage $V_0$ with a predetermined frequency is applied to the optical element 101 at time $t_0$, the interface of the optical element 101 responds as a curve shown in FIG. 5B. That is, the deformed amount starts with a predetermined time constant to reach a value of 95% of the final deformed amount δsine at time $t_{12}$ as in FIG. 4B. And as time lapses, the deformed amount gets further closer toward δsine, but subsequently never decreases.

As described so far, the optical element 101 has different response characteristics at the time of interfacial deformation corresponding with driving frequency of the power supply means. Under the circumstances, the one in which deformed response of the interface 124 of the optical element 101 to frequencies of voltages outputted from the power supply means is conceptually shown is FIG. 6. In the present drawing, the horizontal axis represents frequencies of alternate current voltage supplied to the optical element 101 by the power supply means while the vertical axis represents deformation velocity of the interface at the time of starting power supply, the interface deformed amount when sufficient time has lapsed from the start of power supply, and electric power which the power supply means consumes.

According to the present drawing, the case of the driving frequency of $f_1$, which gives rise to the phenomena shown in the above described FIG. 4B and cannot provide a predetermined deformed amount, is inappropriate to control the optical state of the optical element 101 exactly. The case of the driving frequency of $f_2$ can provide a predetermined deformed amount but deformation (response) velocity is comparatively slow. The case of the driving frequency of $f_3$ can provide a predetermined deformed amount and deformation velocity is fast. The case of the driving frequency of $f_4$ can no longer provide a predetermined deformed amount. The reason hereof is that the optical element can be regarded as a capacitance having a predetermined electrostatic capacity, but since resistant of the transparent electrode 103 and ion mobility of the electrolytic solution 122 are a limited values, the driving frequency being a high frequency will prevent electrical charge from being implanted into the optical element 101 so that the electric capillary phenomenon will not take place effectively. That is, in order to control the optical element 101 effectively, it is necessary to appropriately set the electric power supply condition for driving this.

FIG. 7 and FIGS. 8A to 8E are explanatory views related to power supply means in the first embodiment of the present invention, and FIG. 7 is a sectional view of the optical element of this embodiment and a drawing to show a configuration of power supply means.

In FIG. 7, reference numeral 130 denotes a central processing unit (hereinafter to be referred to as CPU) to control operation of a later-described optical apparatus 150 in its entirety, and is one-chip microcomputer having ROM, RAM, EEPROM, A/D converter function, D/A converter function, and PWM (Pulse Width Modulation) function. Reference numeral 131 denotes power supply means for applying voltages to the optical element 101, and its configuration will be described as follows.

Reference numeral 132 denotes a direct current electric power supply incorporated into the optical apparatus 150 such as a dry cell, etc., reference numeral 133 denotes a DC/DC converter to increase the voltage outputted from the electric power supply 132 to a desired voltage value corresponding with a control signal of the CPU 130, reference numerals 134 and 135 are amplifiers to amplify in accordance with controlling signals of the CPU 130, for example, frequency/duty ratio variable signals to be realized by PWM (Pulse Width Modulation) function as the signal levels to reach voltage levels increased with the DC/DC converter. In addition, the amplifier 134 is brought into connection with the transparent electrode 103 of the optical element 101 and the amplifier 135 with a stick-like electrode 125 of the optical element 101 respectively.

That is, corresponding with the controlling signals of the CPU 130, output voltage of the electric power supply 132 will be applied to the optical element 101 by the DC/DC converter 133, the amplifier 134 and the amplifier 135 with a desired voltage value, frequency and duty.

FIGS. 8A to 8E are explanatory views describing voltage waveforms to be outputted from the amplifiers 134 and 135. Incidentally, under assumption that a voltage of 100V was outputted into the amplifiers 134 and 135 from the DC/DC converter 133 respectively, following description will be implemented.

Figure 8A:
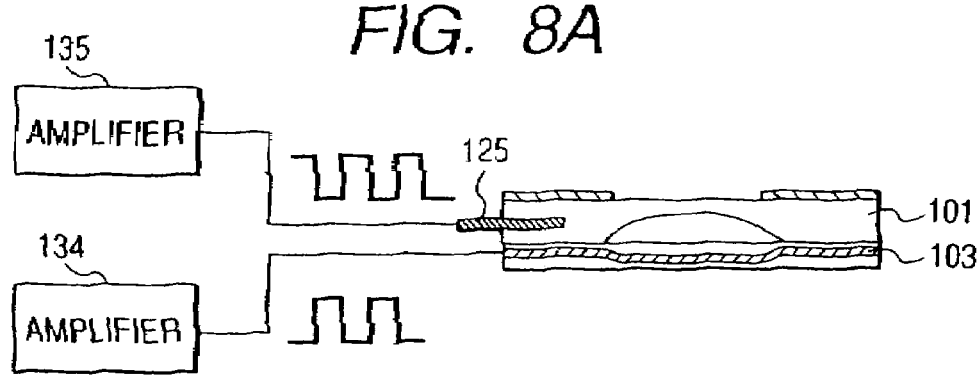
FIGS. 8A, 8B, 8C, 8D and 8E are diagrams describing operation of power supply means in the first embodiment of the present invention.
Figure 8B:
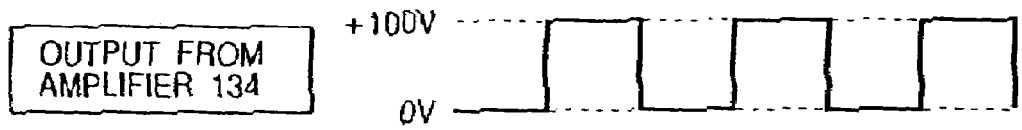
Figure 8C:
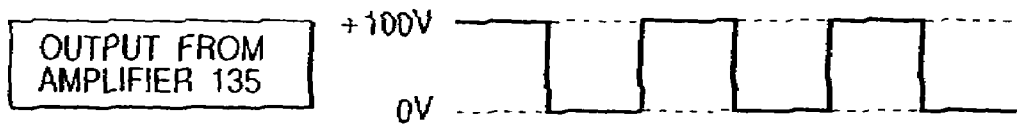
Figure 8D:
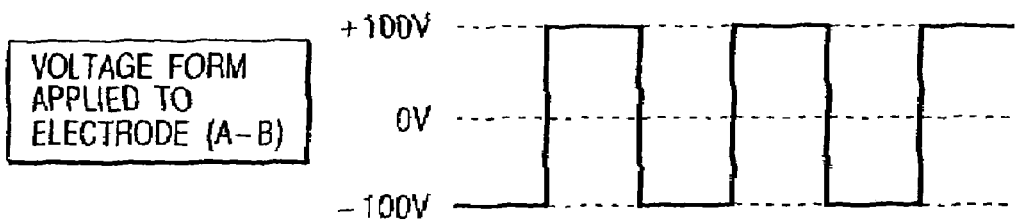

As having been shown in FIG. 8A, the amplifiers 134 and 135 are respectively brought into connection with the optical elements 101. From the amplifier 134, as shown in FIG. 8B, a voltage of rectangular waveform with desired frequency and duty ratio is outputted by the controlling signals of the CPU 130. On the other hand, from the amplifier 135, as having been shown in FIG. 8C, a voltage of rectangular waveform with the opposite phase of the amplifier 134, the same frequency and the same duty ratio is outputted by the controlling signals of the CPU 130. This will cause the voltage to be applied between the transparent electrode 103 and the stick-like electrode 125 of the optical element 101 to become a rectangular waveform of ±100V, that is, an alternate current voltage as shown in FIG. 8D.

Therefore, an alternate current voltage will be applied to the optical element 101 with the power supply means 131.

Figure 8E:
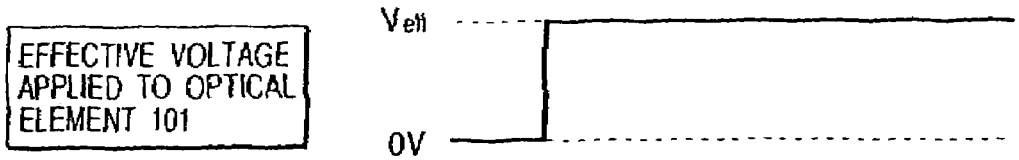

In addition, an effective voltage applied to the optical element from the application start of the voltage to be applied to the optical element 101 can be show as in FIG. 8E.

Incidentally, in the above described description, a rectangular waveform voltage was described to be outputted from the amplifiers 134 and 135, but it goes without saying that a likewise configuration could be implemented with sine waves.

In addition, in the above described description, the case where the electric power supply 132 is incorporated into the optical apparatus 150 was described, but the case where an exterior-type electric power supply or power supply means implement alternate application into the optical element 101 will do as well.

Figure 9:
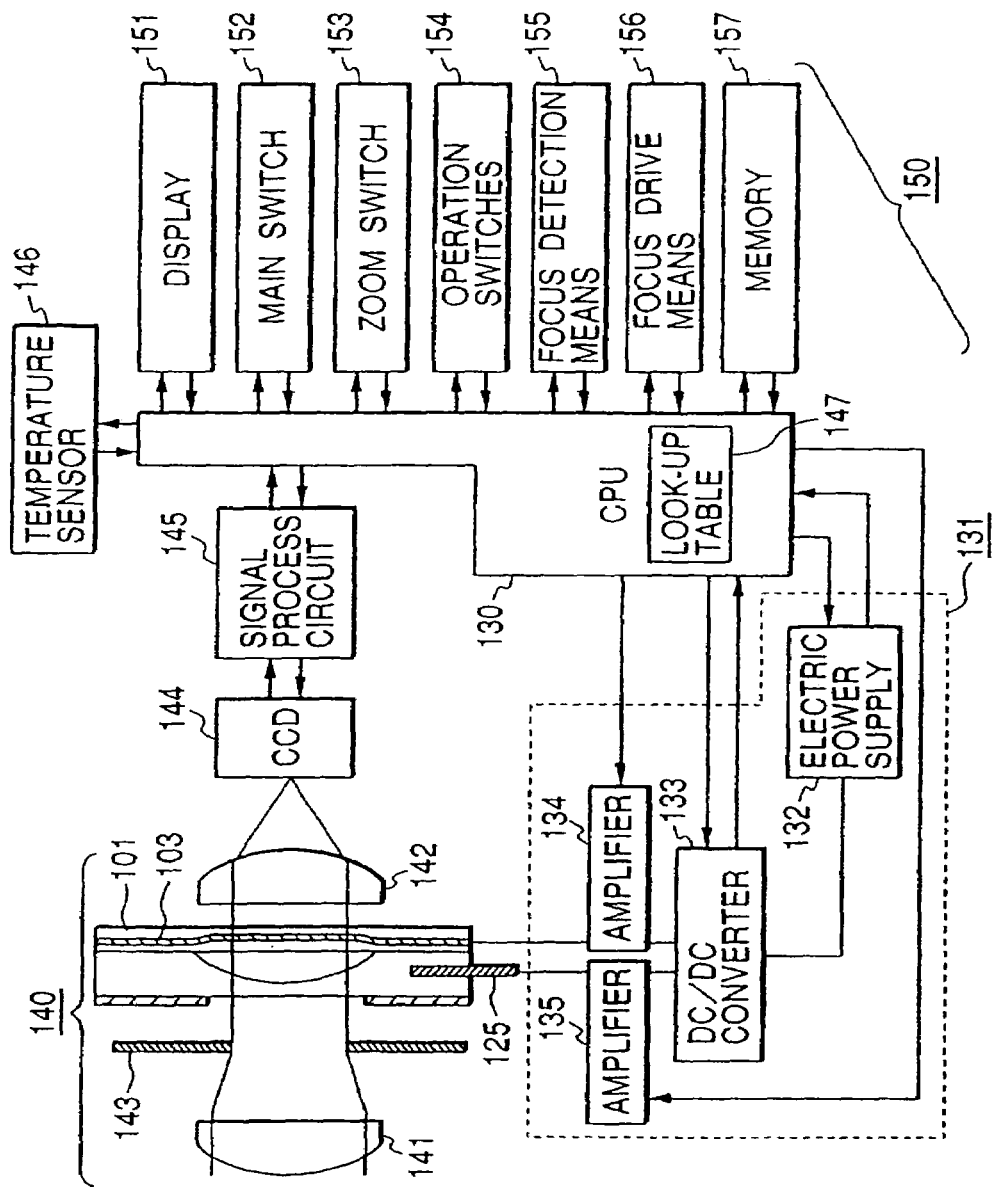
FIG. 9 is a block diagram of an optical apparatus in the first embodiment of the present invention.

FIG. 9 is the one in which the optical element 101 was applied to an optical apparatus. In this embodiment, the optical apparatus 150 will be exemplified, for description, by so-called digital still camera which converts a still image into electric signals with photo-taking means and records them as digital data.

Reference numeral 140 denotes a photo-taking optical system comprising a plurality of lens groups and is configured with first lens group 141, second lens group 142, and the optical element 101. Forward and backward movement in the optical axis of the first lens group 141 implements focus adjustment. The optical element 101 undergoes power change to implement zooming. Incidentally, in order to implement zooming in the photo-taking optical system, normally power changes in a plurality of lens groups and movement of the groups is necessary, but for the present drawing, for the sake of simplicity the power changes in the optical element 101 are caused to represent the zooming operation. The second lens group 142 is a relay lens group without movements. In addition, the optical element 101 is disposed between the first lens group 141 and the second lens group 142, and a diaphragm unit 143 to adjust the light amount of photo-taking optical flux by adjusting diaphragm aperture by a known art is disposed between the first lens group 141 and the optical element 101.

In addition, the photo-taking means 144 is disposed in the focal position (planned image forming surface) of the photo-taking optical system 140. For this, photoelectric conversion means such as a two-dimensional CCD, etc. comprising a plurality of photoelectric conversion portions to convert the irradiated optical energy into electrical charges, an electrical charge accumulating portion to accumulate the electrical charges, and electrical charge transfer portion to transfer the electrical charges and transmit them to outside.

Reference numeral 145 denotes an image signal process circuit, which brings the analog image signals inputted from the photo-taking means 144 into A/D conversion, and implements image processing such as AGC control, white balance, γ correction, and edge emphasis, etc.

Reference numeral 146 denotes a temperature sensor to measure environmental temperature (air temperature) in the optical apparatus 150.

Reference numeral 147 is a look-up table provided in the memory region inside the CPU 130, and there duty ratio data on the output voltage of the power supply means 131 necessary to control the optical power of the optical element 101 at a predetermined value are stored in a mode of a corresponding table.

Reference numeral 151 denotes a display such as a liquid crystal display, etc., and displays the subject image recognized by the photo-taking means 144 and the operation status of the optical apparatus having a variable focal lens. Reference numeral 152 denotes a main switch to drive the CPU 130 from the sleeping state to a state to execute the program while reference numeral 153 denotes a zoom switch, and corresponding with switch operation by the photographer, the later described variable power operation is implemented so that the focal length of the photo-taking optical system 140 is changed. Reference numeral 154 is operation switches other than the above described switches, which are configured by a pre-photo-taking switch, photo-taking commencement switch, and a photographic conditions setup switch to set up shutter timing by second, etc.

Reference numeral 155 denotes focus detecting means and the focus detecting means of phase difference detecting system, etc. used for a single-lens reflex camera is suitable. Reference numeral 156 denotes focusing operation means, which includes an actuator and a driver circuit to move the first lens group 141 forward and backward in the optical axis, implements focus operation based on the focus signals calculated by the above described focus detecting means 155 so that the focus state of the photo-taking optical system 140 is adjusted. Reference numeral 157 denotes memory means and the memory means records the photographed image signals. In particular, a detachably attachable PC-card-type flush memory, etc. is suitable.

Figure 10:
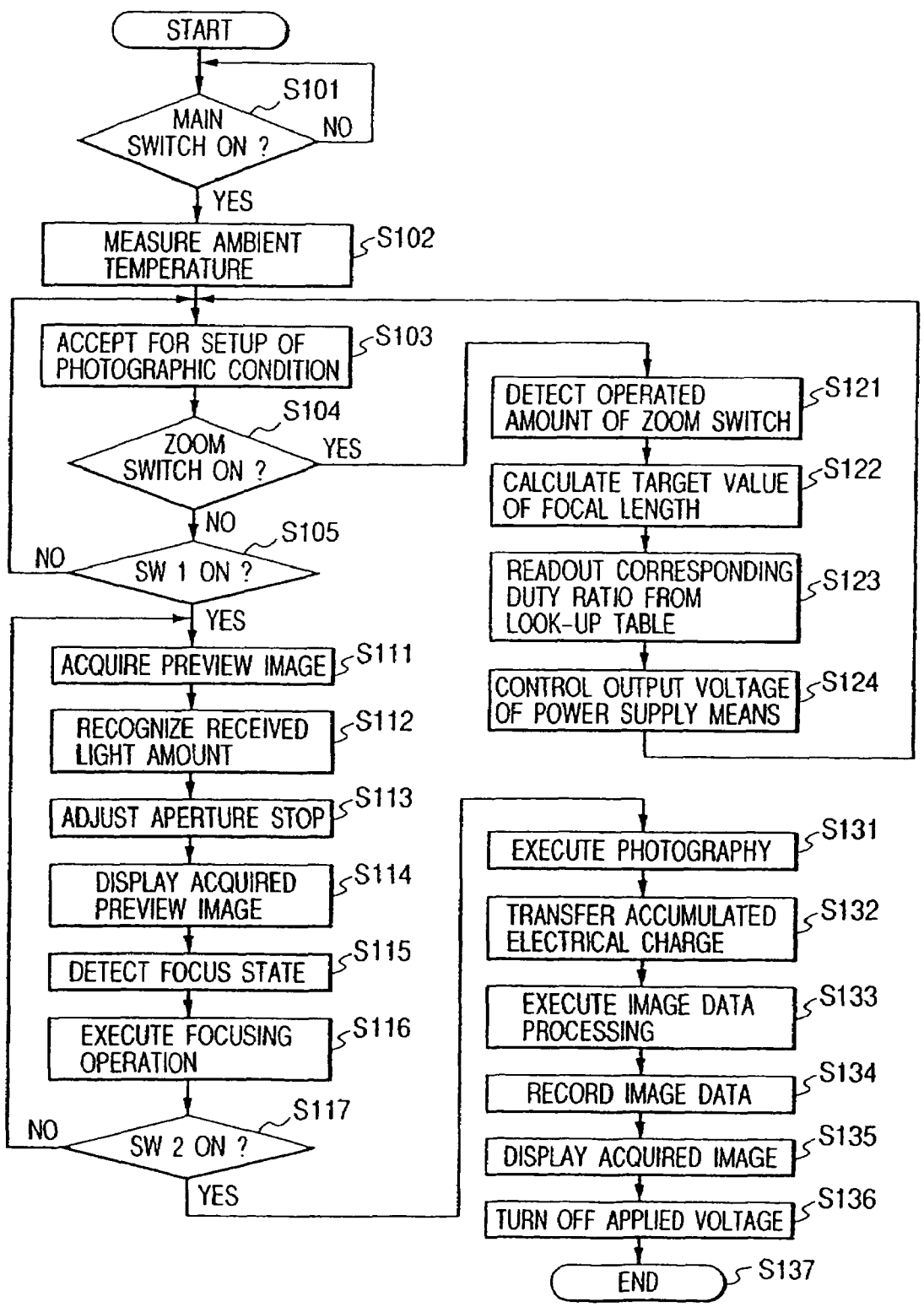
FIG. 10 is a control flow diagram of an optical apparatus in the first embodiment of the present invention.

FIG. 10 is a control flow chart on the CPU 130 which the optical apparatus 150 having been shown in FIG. 9 has. The control flow of the optical apparatus 150 will be described with reference to FIG. 9 as well as FIG. 10 as follows.

In the step S101, distinction on whether or not on-operation of the main switch 152 is executed is implemented and when the on-operation is not yet executed, a waiting mode state in which operation of various switches is waited for remains. In the step S101, when on-switch operation of the main switch 152 is distinguished, the waiting mode will be overridden and the process continues to the subsequent step S102 and onward.

In the step S102, the ambient temperature where the optical apparatus 150 is disposed, that is, the periphery air temperature of the optical apparatus 150 is measured with the temperature sensor 146.

In the step S103, setup of photographic conditions by a photographer is accepted. For example, setup such as setup on exposure control mode (shutter priority AE and program AE, etc.), image quality mode (size in the number of recording pixels and size of image compression rate, etc.), and the electronic flash mode (compulsory flash and flash prohibition, etc.), etc. is implemented.

In the step S104 distinction on whether or not the zoom switch 153 has been operated by the photographer is implemented. In the case no on-operation has been executed, the process continues to the step S105. Here, in the case where the zoom switch 153 has been operated, the process continues to the step S121.

In the step S121, the operation quantity of the zoom switch 153 (operation direction and on-time period, etc.) is detected. In the step S122 the focal length control target value of the photo-taking optical system 140 is calculated based on that operation quantity. In the step S123 duty ratio on the voltage applied to the optical element 101 corresponding to the above-described focal length control target value is read out from the look-up table 147 in the CPU 130. The deformed amount of the optical element 101 directed to the duty ratio will be described later with reference to FIGS. 1A to 1C and FIGS. 11A to 11C. In the step S124, power supply to the optical element 101 from the power supply means 131 starts at the above-described duty ratio, and the state returns to the step S103.

That is, while operation of the zoom switch 153 goes on, signals of a predetermined duty ratio corresponding with the operation quantity are applied to the optical element 101 so that the process continues to the step S105 at the time point when on-operation of the zoom switch 153 is over.

In the step S105 distinction on whether or not on-operation on the pre-photo-taking switch (indicated as SW1 in the flow chart in FIG. 10) among the operation switches 154 has been executed by the photographer is implemented. In the case where the on-operation is not executed, the state returns to the step S103 so that acceptance for setup of photographic conditions and distinguishing on operation of zoom switch 153 is repeated. Once the pre-photo-taking switch is determined to have been operated on in the step S105, the process continues on to the step S111.

In the step S111, the photo-taking means 144 as well as the signal process circuit 145 is driven to acquire the preview image. The preview image refers to an image to be acquired prior to photo-taking session in order to appropriately set up the photo-taking conditions on the image for final recording as well as to make the photographer understand the photo-taking construction.

In the step S112 the received light level of the preview image acquired by the step S111 is recognized. In particular, in the image signals which the photo-taking means 144 output, the output signal levels of maximum, minimum and average are calculated so that the light amount emitted into the photo-taking means 144 is perceived.

In the step S113, based on received light amount recognized on the above-described step S112, the diaphragm unit 143 provided within the photo-taking optical system 140 is driven so that the aperture diameter of the diaphragm unit 143 is adjusted so as to be a proper light amount.

In the step S114, the preview image acquired in the step S111 is displayed in the display 151. Subsequently, in the step S115, with the focus detecting means 155 the focus state of the photo-taking optical system 140 is detected. Subsequently, in the step S116, with the focus drive means 156, the first lens group 141 is caused to move forward and backward toward the optical axis to implement accurate focusing operation. Thereafter, the process continues to the step S117 to distinguish whether or not the on-operation of the photo-taking switch (which is expressed as SW2 in the flow chart FIG. 10) has been implemented. When it does not undergo on-operation, the state goes back to the step S111 and the steps covering from the acquisition of the preview image to the focus drive is repeatedly executed. As described above, in the midst of executing the pre-photo-taking operation repeatedly, the photographer could implement on-operation of the photo-taking switch, and then the state leaps from the step S117 to the step S131.

In the step S131, photo-taking session is implemented. That is, the subject image formed on the photo-taking means 144 undergoes photoelectric conversion, and the electrical charges in proportion to intensity of the optical image are accumulated in the electrical charge accumulating portion in the vicinity of each light receiving portion. In the step S132 the electrical charges accumulated in the step S131 is read out via accumulated electrical charge transfer line, and the read-out analog signals are inputted into the signal process circuit 145. In the step S133, in the signal process circuit 145, the analog image signals are inputted into A/D conversion, and image processing such as AGC control, white balance, γ correction, and edge emphasis, etc. are implemented, and moreover if there arises any necessity, JPEG compression, etc. is implemented with image compression program stored inside the CPU 130. In the step S134 the image signals acquired in the above-described step S133 are recorded into the memory 157. In the step S135, at first the preview image displayed in the step S114 is erased, and the image signals acquired in the step S133 is again displayed on the display 151. In the step S136 power supply output from the power supply means 131 is stopped so that a series of photo-taking operations come to an end in the step 137.

Figure 11A:
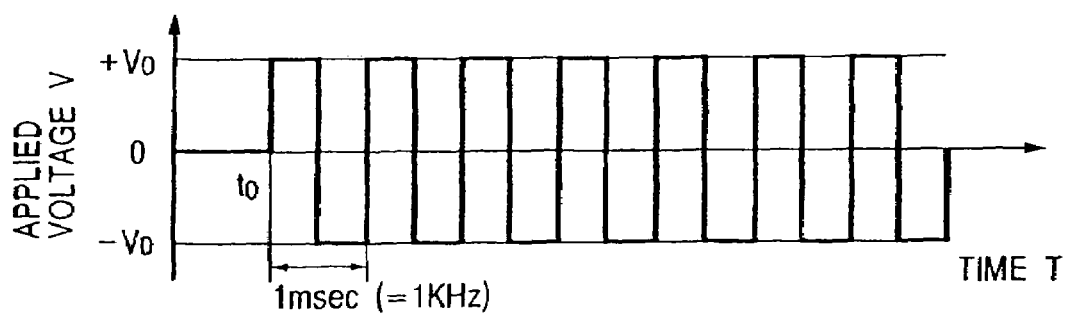
FIGS. 11A, 11B and 11C are diagrams describing a power supply controlling method in the first embodiment of the present invention.
Figure 11B:
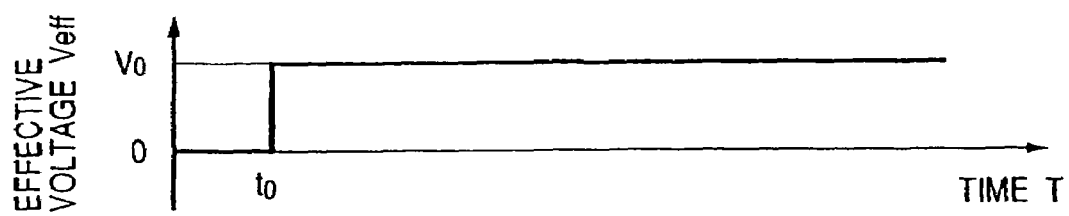
Figure 11C:
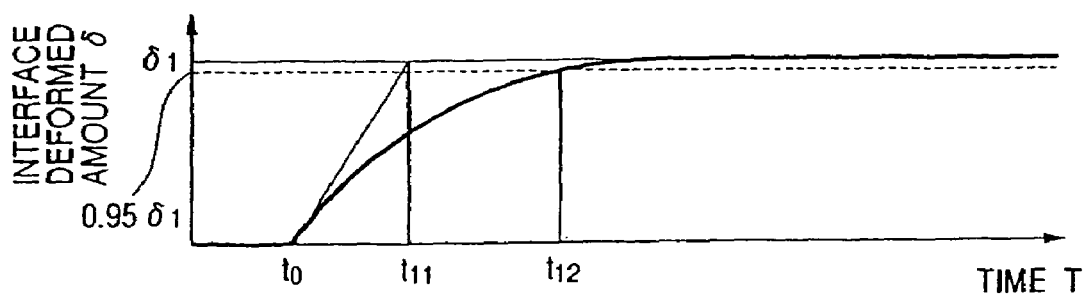

Next, actions in the step S123 in the above-described FIG. 10 will be described with reference to FIGS. 1A to 1C and FIGS. 11A to 11C. FIGS. 11A to 11C are explanatory views describing control method of the power supply means and its effects in the case where the interface 124 of the optical element 101 is deformed significantly and the focal length of the optical element 101 is made short.

FIG. 11A shows voltage waveform outputted from the power supply means 131 and applied to the optical element 101, and its definition is similar to the one having been described in FIG. 8D. This waveform represents an alternate current voltage of a rectangular wave with the peak voltage of $\pm V_0$ [v], frequency of 1 kHz, and duty ratio of 100%. At this time, the effective voltage applied to the optical element 101 will be $V_0$ as in FIG. 11B and deformation of the interface 124 will get still with a predetermined deformation amount $\delta_1$ as shown in FIG. 11C.

FIGS. 1A to 1C are explanatory views describing a control method of the power supply means and its effects in the case where a deformation amount given to the interface 124 of the optical element 101 is smaller than in FIG. 11.

FIG. 1A shows a voltage waveform outputted from the power supply means 131 and applied to the optical element 101. This waveform represents an alternate current voltage of a rectangular wave with the peak voltage of $\pm V_0$ [V] similar to that in FIG. 11, frequency of likewise 1 kHz, and duty ratio of 50%. At this time, the effective voltage applied to the optical element 101 will be $0.5 V_0$ as in FIG. 1B and deformation of the interface 124 will get still with approximately half the deformation amount as shown in FIG. 11, that is, $0.5\delta_1$.

That is, in this embodiment, the peak voltage and the frequency of the drive voltage outputted from the power supply means are always constant, and the duty ratio is made variable so that the effective voltage to be supplied to the optical element 101 is controlled and the deformation amount of the interface 124 is controlled. In addition, 1 kHz was taken for this drive frequency in this embodiment, but this is equivalent to the frequency in the vicinity of $f_3$ in FIG. 6. Selection of such a frequency enables the optical power of the optical element 101 to change rapidly and stably.

According to the above described first embodiment:

(1) The peak voltage and the frequency of the drive voltage outputted from the power supply means are made to be constant, and only the duty ratio is made variable, which results in simple configuration of the power supply means and can provide power supply means suitable to digital control with a microcomputer, etc. As a result thereof, optical characteristics of an optical element will become accurately controllable with an inexpensive control circuit; and, (2) Since the output frequency of the power supply means has been selected to be higher than the frequency with which electrical charge implantation into the insulating layer of the optical element takes place and to be lower than the frequency with which electrical charge movements due to increase in impedance are hampered, the interface can be deformed on a stable basis, and the like will be attained.

Incidentally, in this embodiment, as an example of the optical element, a digital still camera which brings images into photoelectric conversion and records those data was taken, but it goes without saying that also a video camera or a silver halide film camera recording images into a silver halide film, etc. can be taken likewise without spoiling the effects.

Second Embodiment

The above-described first embodiment was a mode of an embodiment in which an alternate voltage with the peak voltage and the frequency being constant was applied to the optical element and duty of the alternate signals is changed so that the interface of the optical element was deformed into a desired shape. In contrast hereto, as the second embodiment, an embodiment in which an alternate cuffent voltage with the peak voltage and duty being constant is applied to an optical element, and variation of frequency of that alternate signals deforms the interface of the optical element into a desired shape will be shown.

Figure 12:
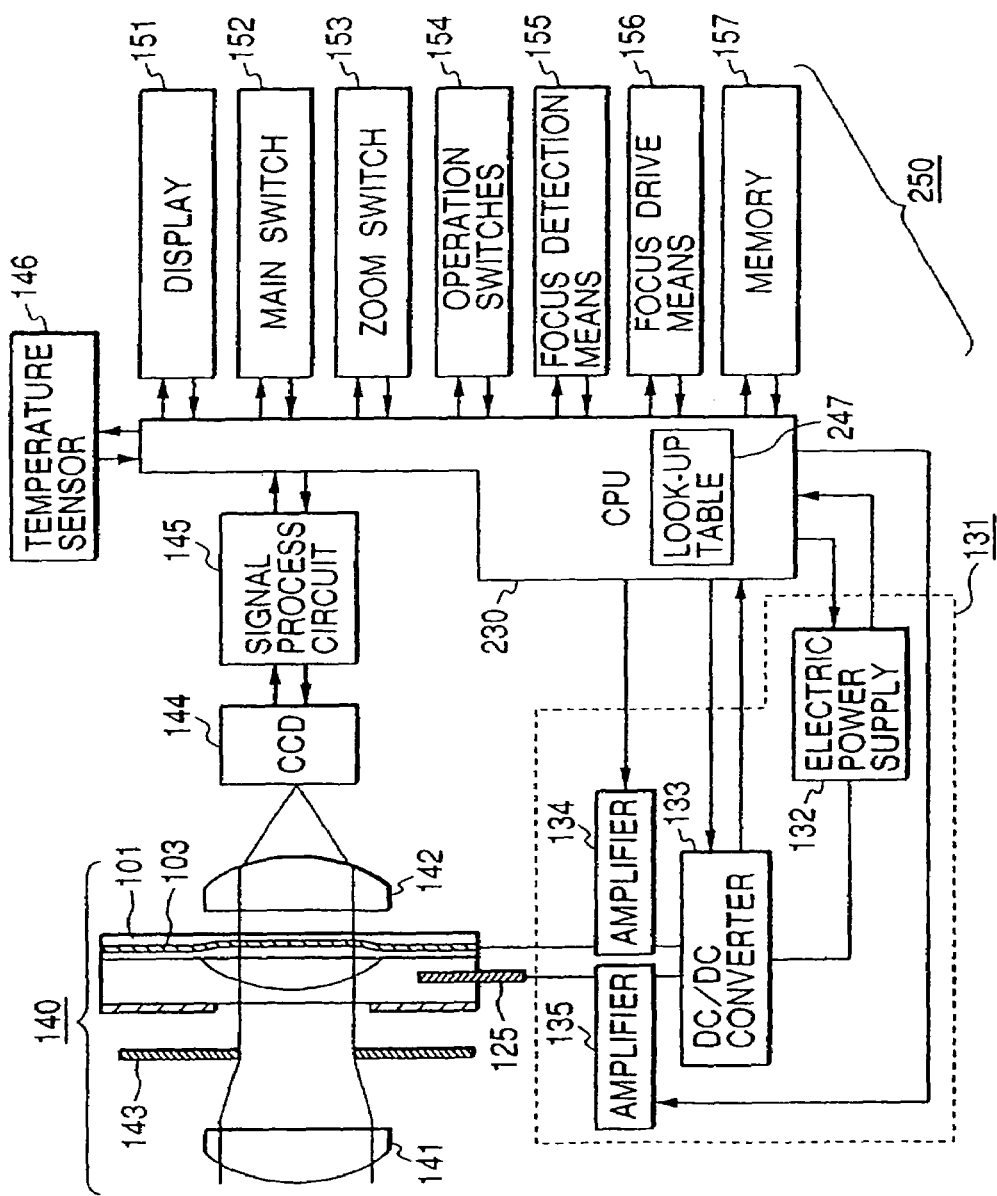
FIG. 12 is a block diagram of an optical apparatus in the second embodiment of the present invention.

FIG. 12 through FIGS. 15A to 15C are drawings to describe this embodiment, and FIG. 12 is a drawing to show configuration of a optical element of this embodiment, or a drawing to show a digital still camera 250 comprising the optical element 101 and the power supply means 131 as in the first embodiment.

A portion which differentiates the optical element 250 of this embodiment from the optical element 150 of the first embodiment is a point that the CPU 230 has a look-up table 247 which stores output frequency data of the power supply means 131 necessary for controlling the optical power of the optical element 101 at a predetermined value in a mode of a corresponding table. Otherwise, the configuration and effects are similar to those in the first embodiment and therefore detailed description will be omitted.

Figure 13:
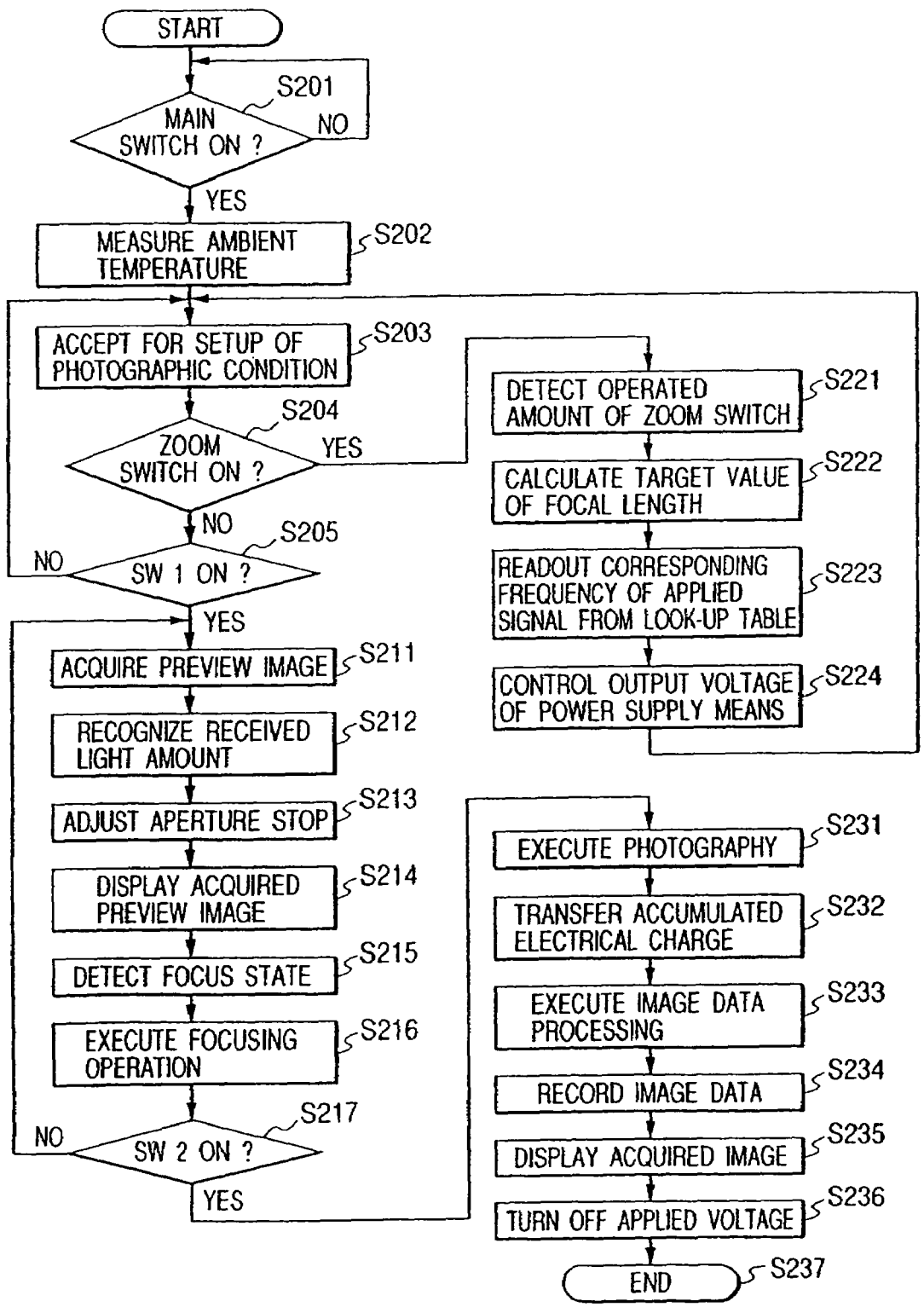
FIG. 13 is a control flow diagram of an optical apparatus in the second embodiment of the present invention.

FIG. 13 is a control flow chart on the CPU 230 which the optical apparatus 250 in the second embodiment has. A portion which differentiates the present flow chart from the flow chart in FIG. 10 in the first embodiment is only the portion to readout data from the above described look-up table 247. This altered portion only will be described as follows.

In the step S204 distinction on whether or not the zoom switch 153 has been operated by the photographer is implemented, and in the case where the zoom switch 153 has been operated, the process continues to the step S221.

In the step S221, the operation quantity of the zoom switch 153 (operation direction and on-time period, etc.) is detected. In the step S222 the focal length control target value of the photo-taking optical system 140 is calculated based on that operation quantity. In the step S223 frequency on the power supply signals applied to the optical element 101 corresponding to the above described focal length control target value are read out from the look-up table 127 in the CPU 230. The deformed amount of the optical element 101 directed to the frequency will be described with reference to FIG. 14 and FIG. 15. In the step S224, power supply to the optical element 101 from the power supply means 131 starts at the above described frequency, and the state returns to the step S203.

Figure 14A:
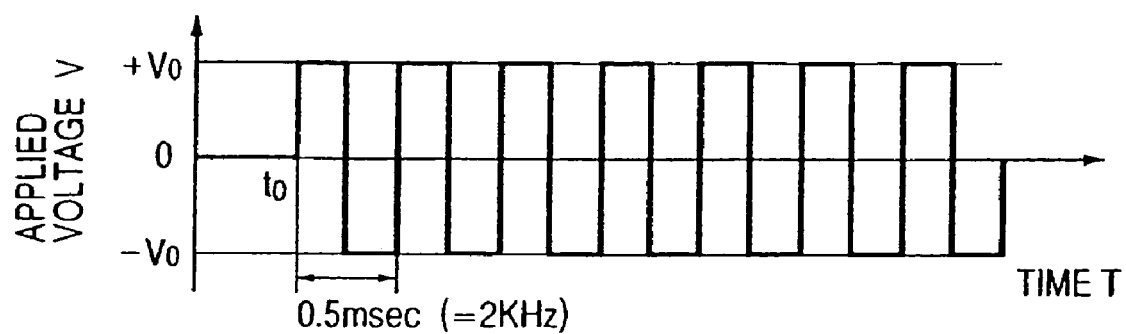
FIGS. 14A, 14B and 14C are diagrams describing power supply controlling methods in the second embodiment of the present invention respectively.
Figure 14B:
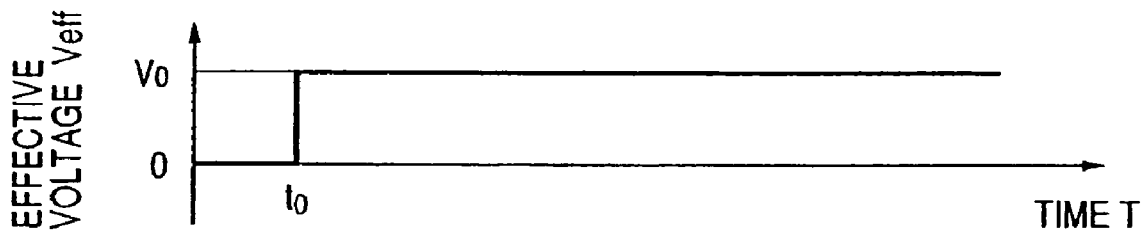
Figure 14C:
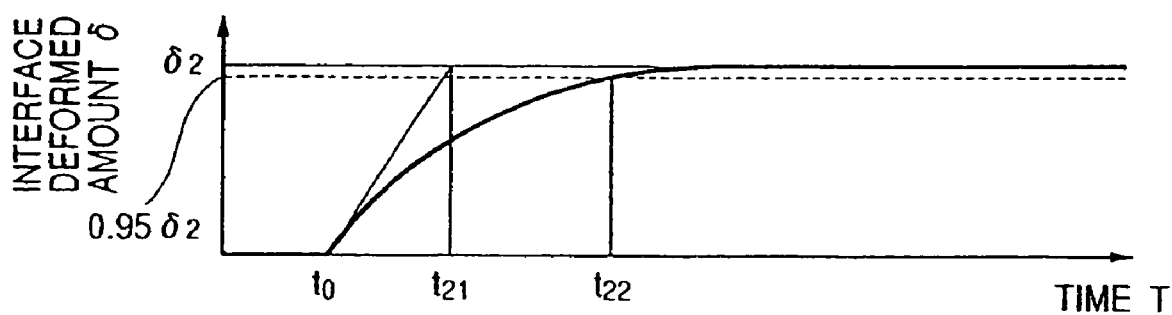

Next, actions in the step S223 in the above described FIG. 13 will be described with reference to FIGS. 14A to 14C and FIGS. 15A to 15C. FIGS. 14A to 14C are explanatory views describing control method of the power supply means and its effects in the case where the interface 124 of the optical element 101 is deformed significantly and the focal length of the optical element 101 is made short.

FIG. 14A shows voltage waveform outputted from the power supply means 131 and applied to the optical element 101, and its definition is similar to the one having been described in FIG. 8D or FIG. 1A and FIG. 11A. This waveform represents an alternate voltage of a rectangular wave with the peak voltage of $+V_0$ [V], frequency of 2 kHz, and duty ratio of 100%. At this time, the effective voltage applied to the optical element 101 will be $V_0$ as in FIG. 11B and deformation of the interface 124 will get still with a predetermined deformation amount $\delta_2$ as shown in FIG. 11C.

Figure 15A:
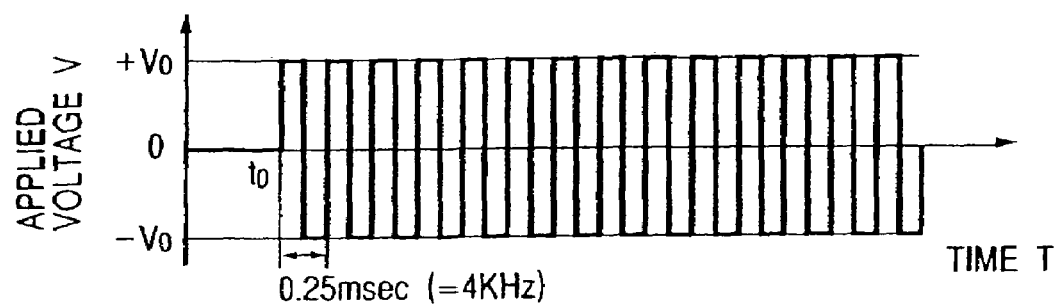
FIGS. 15A, 15B and 15C are diagrams describing power supply controlling methods in the second embodiment of the present invention respectively.
Figure 15B:
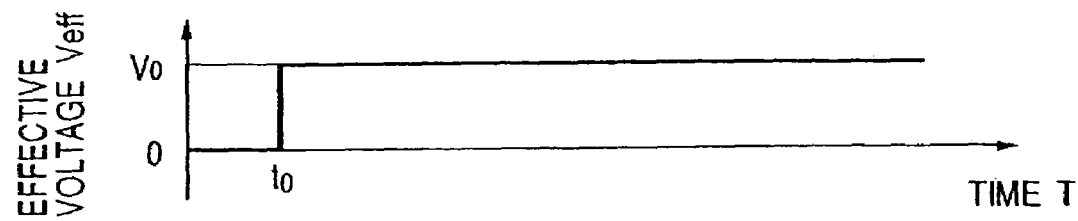
Figure 15C:
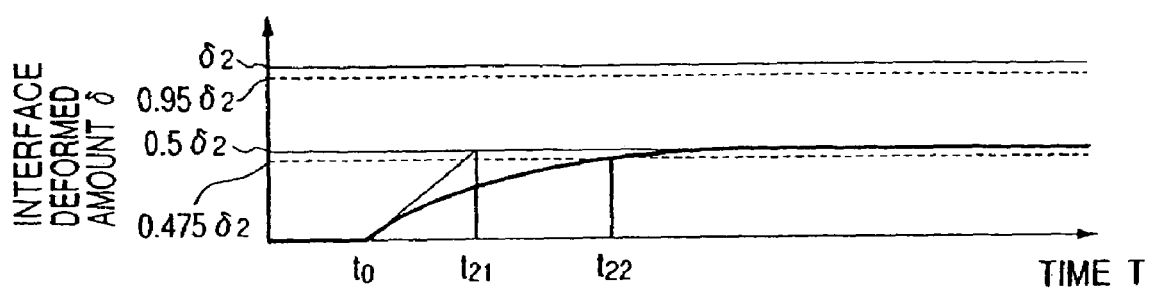

FIGS. 15A to 15C are explanatory views describing control method of the power supply means and its effects in the case where deformation amount given to the interface 124 of the optical element 101 is smaller than in FIGS. 14A to 14C.

The above described FIG. 15A shows a voltage waveform outputted from the power supply means 131 and applied to the optical element 101. This waveform represents an alternate voltage of a rectangular wave with the peak voltage of $\pm V_0$ [V] similar to that in FIGS. 14A to 14C, duty ratio of likewise 100%, and frequency of 4 kHz being a double. At this time, the effective voltage applied to the optical element 101 will be $V_0$ as in FIG. 14B and deformation of the interface 124 will as shown in FIG. 15C get still with approximately half the deformation amount in FIGS. 14A to 14C, that is, $0.5\delta_2$.

Figure 6:
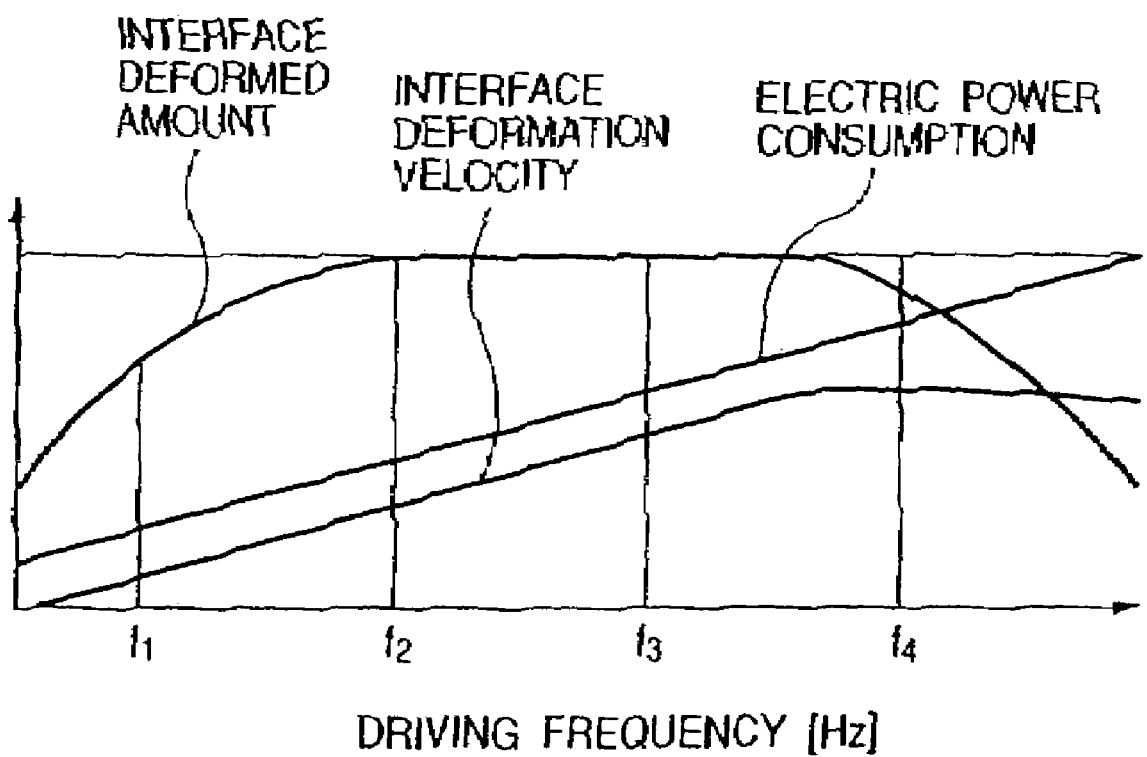
FIG. 6 is a conceptual rendering of a driving frequency and a response in an optical element of the present invention.

This is caused by this embodiments adoption of frequency in the vicinity of $f_4$ in FIG. 6. That is, this is caused since, with the power supply voltage having a frequency higher than a predetermined value, electrical charges for deforming the interface 124 can no longer be supplied to the optical element 101 easily, and occuaence of the electric capillary phenomenon is controlled. Accordingly, since the deformation amount of the interface 124 decreases as the drive frequency increases, control on the drive frequency can control the optical power of the optical element 101 at a predetermined value.

According to the above described second embodiment:

(1) The peak voltage and the duty ratio of the drive voltage outputted from the power supply means are made to be constant, and only the frequency is made variable, which results in a simple configuration of the power supply means and can provide with control means suitable to digital control with a microcomputer, etc. As a result thereof, optical characteristics of an optical element will become accurately controllable with an inexpensive control circuit; and, (2) Since the output frequency of the power supply means has been selected to be a frequency higher than the frequency with which electrical charge movements into the optical element are hampered, the interface can be deformed accurately and continuously by changes in frequency, and the like will be attained.

Incidentally, also in this embodiment, as an example of the optical element, a digital still camera was taken, but it goes without saying that also a video camera or a silver halide film camera, etc. other than that can be taken likewise without spoiling the effects.

Third Embodiment

Figure 16:
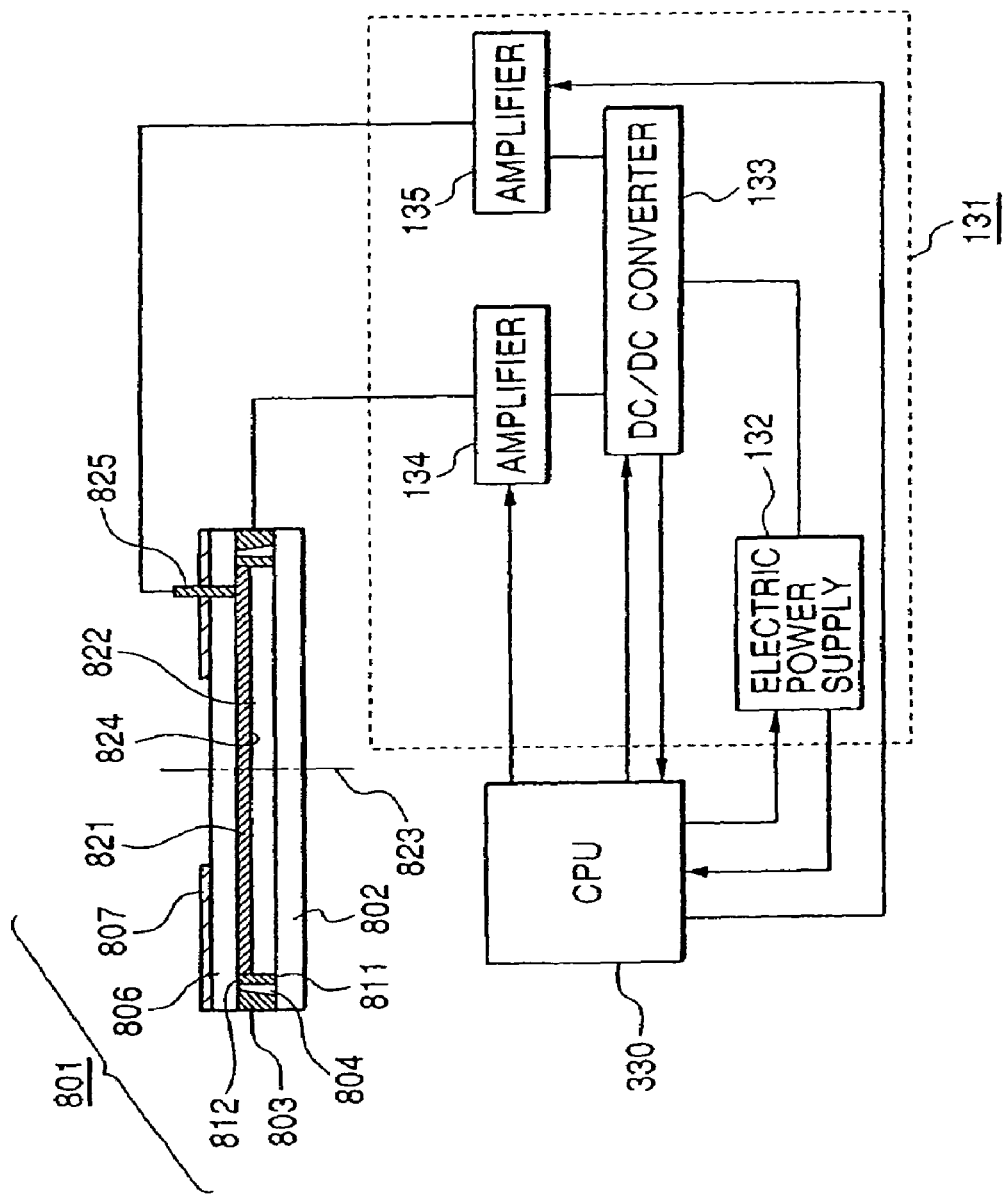
FIG. 16 is a sectional view of an optical element in the third embodiment of the present invention.
Figure 17A:
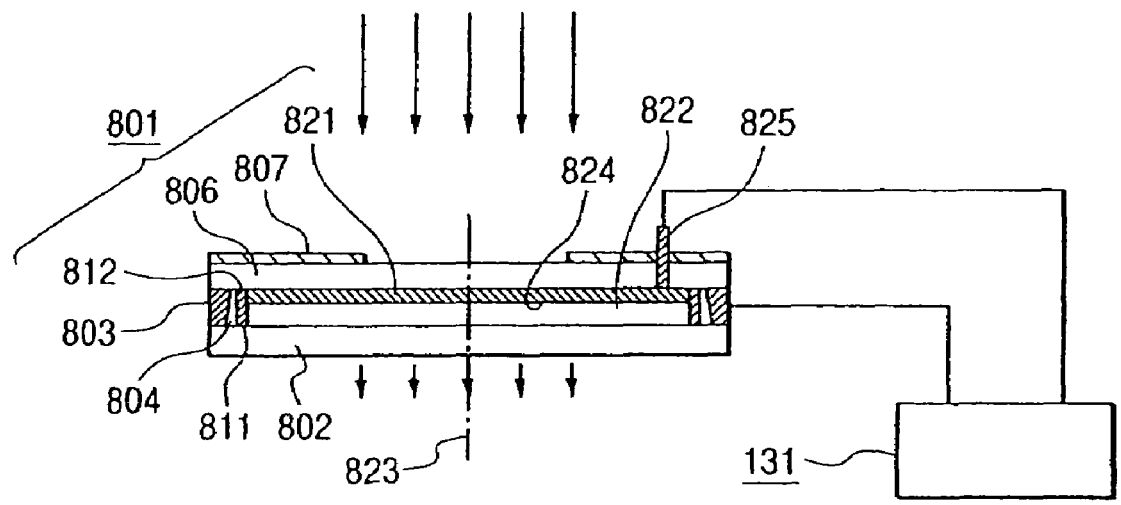
FIGS. 17A and 17B are diagrams describing operation on applying voltage to an optical element in the third embodiment of the present invention respectively.
Figure 17B:
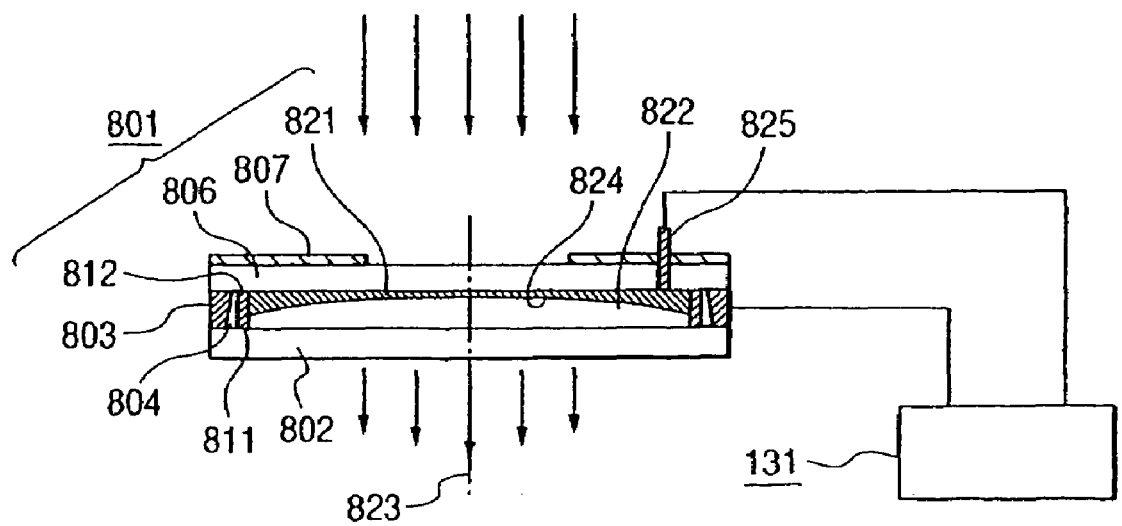

FIG. 16 through FIGS. 21A to 21D are drawings to describe the third embodiment of the present invention, and FIG. 16 and FIGS. 17A and 17B are drawings related to an optical element and power supply means to be used in this embodiment.

In FIG. 16, reference numeral 801 denotes the optical element in its entirety, and reference numeral 802 denotes a disk-like transparent acryl or glass-made first sealing plate.

Reference numeral 803 denotes an electrode ring, and size of its outer diameter is unanimous while the size of its inner diameter gradually changes in the downward direction. That is, in this embodiment, it is a metal ring member the diameter of which gets gradually larger in the downward direction on the size of inner diameter. An insulating layer 804 made of acryl resin, etc. is formed in tight contact with the inner face of the whole periphery of the electrode ring 803. Since the inner size of the insulating layer 804 is unanimous, thickness gradually increases in the downward direction. In addition, to the bottom side of the inner face of the whole periphery of the insulating layer 804, a water-repelling treatment agent is applied so that a water-repelling film 811 is formed and to the upper side of the inner face of the whole periphery of the insulating layer 804, a hydrophilic treatment agent is applied so that a hydrophilic film 812 is formed.

Reference numeral 806 is a disk-like transparent acryl-made or glass-made second sealing place, and a through-hole is opened in a portion thereof, and there a stick-like electrode 825 is inserted and sealed with an adhesive agent.

FIG. 16 is a sectional view to show configuration of an optical element of this embodiment, and a drawing to show configuration of the power supply means to drive this. With reference to FIG. 16, configuration of the optical element will be described.

Reference numeral 807 denotes a diaphragm plate to regulate the diameter of an optical flux to be emitted into the optical element 801, and is fixed-disposed on the upper surface of the second sealing plate 806. In addition, the first sealing plate 802, the metal ring 803 and the second sealing plate 806 are fixed to each other by adhesive treatment, and a box having a sealed space in a predetermined volume enclosed by these members, or a liquid chamber is formed. This box is shaped axially symmetric with respect to light axis 823 other than the portion where the above described stick-like electrode 825 is inserted. In addition, the liquid chamber is filled with two kinds of liquid described below.

At first, on the bottom side of the liquid chamber, the second liquid 822 is dropped with only a quantity so that the height of its liquid pole reaches the same height as the forming portion of the above described water-repelling film 811. As the second liquid 822 silicone oil which is colorless and transparent with specific gravity 1.06, refractive index of 1.38 is used. Subsequently, the remaining space inside the liquid chamber is filled with the first liquid 821. The first liquid 821 is electrolytic solution, which is a mixture of water and ethyl-alcohol at a predetermined ratio and moreover to which a predetermined quantity of salt (sodium chloride etc.) is added, with specific gravity 1.06 and with refractive index 1.38 under a room temperature. Moreover, to the first liquid 821, uncolored water-soluble dye, for example, carbon black or materials in the titan oxide system are added. That is, for the first and the second liquid, liquids which have the same specific gravity and refractive index but have different light beam absorptive powers and are insoluble with each other are selected. There, both liquids form an interface 824 and each of them exists independently without being mixed together. In addition, the shape of this interface 824 is determined by the point where three substances of the inner wall of the liquid chamber, the first liquid and the second liquid are brought into intersection, that is, the balance of three interfacial tensions applied to the outer periphery portion of the interface 824. In this embodiment, the materials for the above-described water-repelling film 811 as well as hydrophilic film 812 are selected so that the contact angle of the first and the second liquids toward the inner wall of the liquid chamber is 90 degrees respectively.

Since reference numeral 131 denotes a member having the same configuration as well as function as in the power supply means described in FIGS. 1A to 1C, detailed description will be omitted. The amplifier 134 of the power supply means 131 is brought into connection with the metal ring 803 and the amplifier 135 with a stick-like electrode 825. In this configuration, voltages are applied to the first liquid 821 via the stick-like electrode 825 and the interface 824 is deformed by electro-wetting effects.

Next, deformation of the above described interface 824 of the optical element 801 and the optical function given rise to by the deformation will be described with reference to FIGS. 17A and 17B.

At first, in the case where no voltages are applied to the first liquid 821, the shape of the interface 824 will be flat as described above (FIG. 17A).

Here, the second liquid is practically transparent, but the first liquid has a predetermined light beam absorptive power due to an added light absorbing material. There, when a light flux is emitted in from the opening of the diaphragm plate 807, the light beam equivalent to the light length of the first liquid is absorbed and the intensity of the light flux emitted out from the second sealing plate 802 decreases uniformly.

On the other hand, when voltages are applied to the first liquid, the shape of the interface 824 will become spherical due to electro-wetting effects (FIG. 17B). There, on the light flux emitted in from the opening of the diaphragm plate 807, the absorption rate changes at a percentage corresponding with changes in the light length in the first liquid, and the intensity of the light flux emitted out from the second sealing plate 802 gradually decreases in the direction from the center toward the periphery with its average intensity being higher than in the case of FIG. 17A. That is, deformation of the interface 824 by the voltage control of the power supply means 131 can realize an optical element which can freely change the transmitting light amount.

In addition, since the refractive indexes for the first and the second liquids are the same and only intensity of the emitted light can be changed without changing the direction of the incident light flux, the element can be used as diaphragm means to adjust the light amount of the incident light flux or an optical shutter to transmit or cut the incident light flux.

Incidentally, principles on the two-liquid interfacial deformation due to electro-wetting is described in the above described international patent WO99/18456, and the interface 824 in this embodiment is equivalent to the positions A and B of the two-liquid interface described in FIG. 6 of the above described patent. In addition, principles on the transmitting light amount adjustment of the incident light flux due to deformation of two-liquid interface and its effects are described in Japanese Patent Application Laid-Open No. 11-169657 made by the present applicant.

Figure 18:
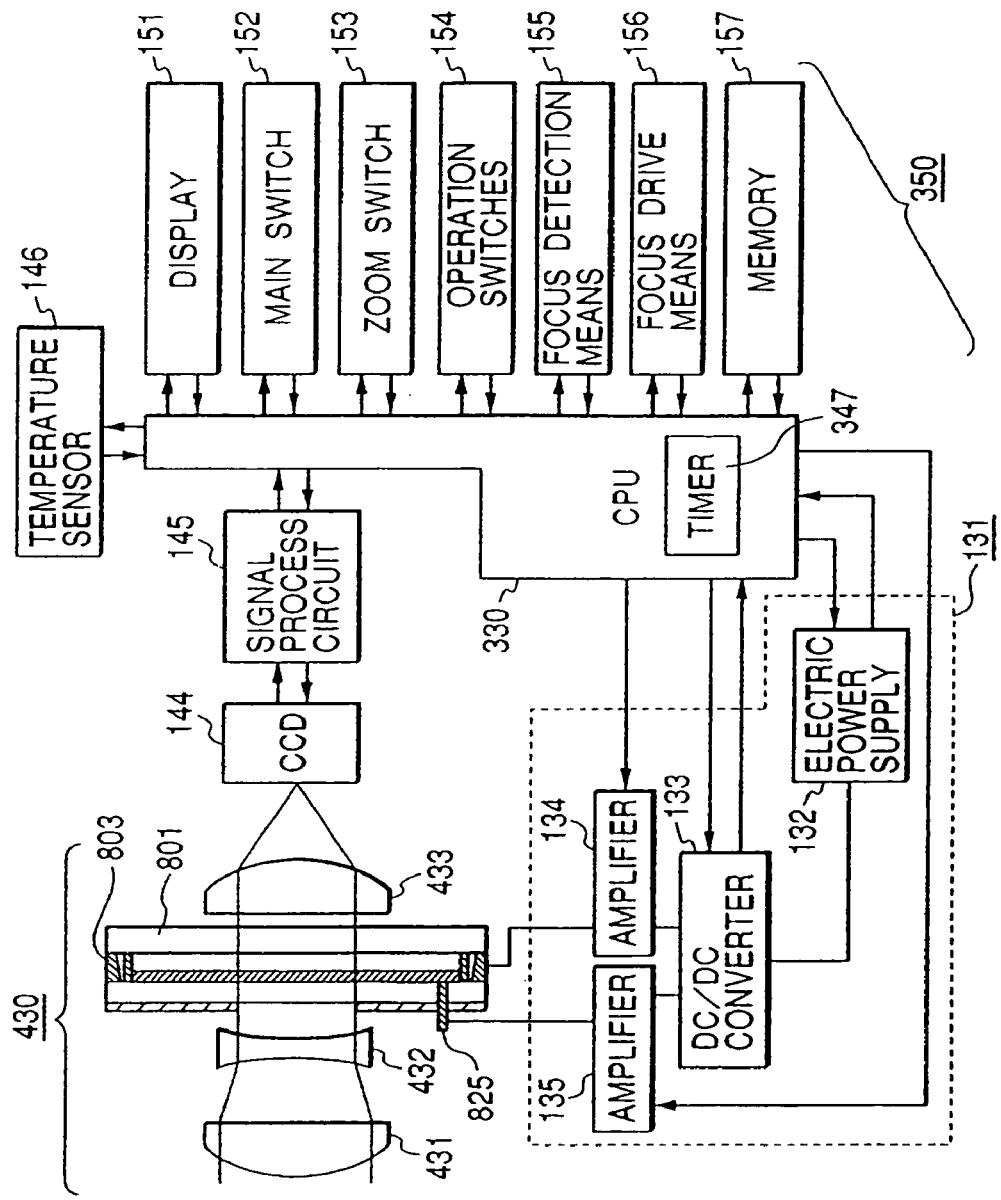
FIG. 18 is a block diagram of an optical apparatus in the third embodiment of the present invention.

FIG. 18 is the one in which the optical element 801 was applied to an optical apparatus. In this embodiment, as in the first embodiment, the optical apparatus 150 will be exemplified, for description, by a so-called digital still camera which converts a still image into electric signals with photo-taking means and records them as digital data. Incidentally, as for those features similar to the ones in the first embodiment, detailed description thereon will be omitted.

In FIG. 18, reference numeral 430 denotes a photo-taking optical system comprising a plurality of lens groups and are configured by first lens group 431, second lens group 432, and the forth lens group 433. Forward and backward movement in the optical axis of the first lens group 431 implements focus adjustment. Forward and backward movement in the optical axis of the second lens group 432 implements zooming. The fourth lens group 433 is a relay lens group without movement. In addition, an optical element 801 is disposed between the second lens group 432 and the fourth lens group 433. In addition, the photo-taking means 144 is disposed in the focusing position (planned image forming surface) of the photo-taking optical system 430.

Next, operation of the optical element 801 in this embodiment will be described.

Dynamic range of luminance of subjects existing in the natural world is extremely large, and in order to limit this within a predetermined range, normally the interior of the photo-taking optical system has a mechanical diaphragm mechanism to adjust light amount of the photo-taking light flux. However, it is difficult to make the mechanical diaphragm mechanism small, and under a state of small diaphragm that the diaphragm opening is small, diffraction phenomena of the light beam due to end surface of diaphragm wings occurs and, the resolution of the subject image decreases. Thus, in this embodiment, the optical element 801 is used as a variable ND filter replacing the above described mechanical diaphragm mechanism so that without giving rise to the above described defects, the light amount passing through the photo-taking optical system is adjusted appropriately.

Figure 19:
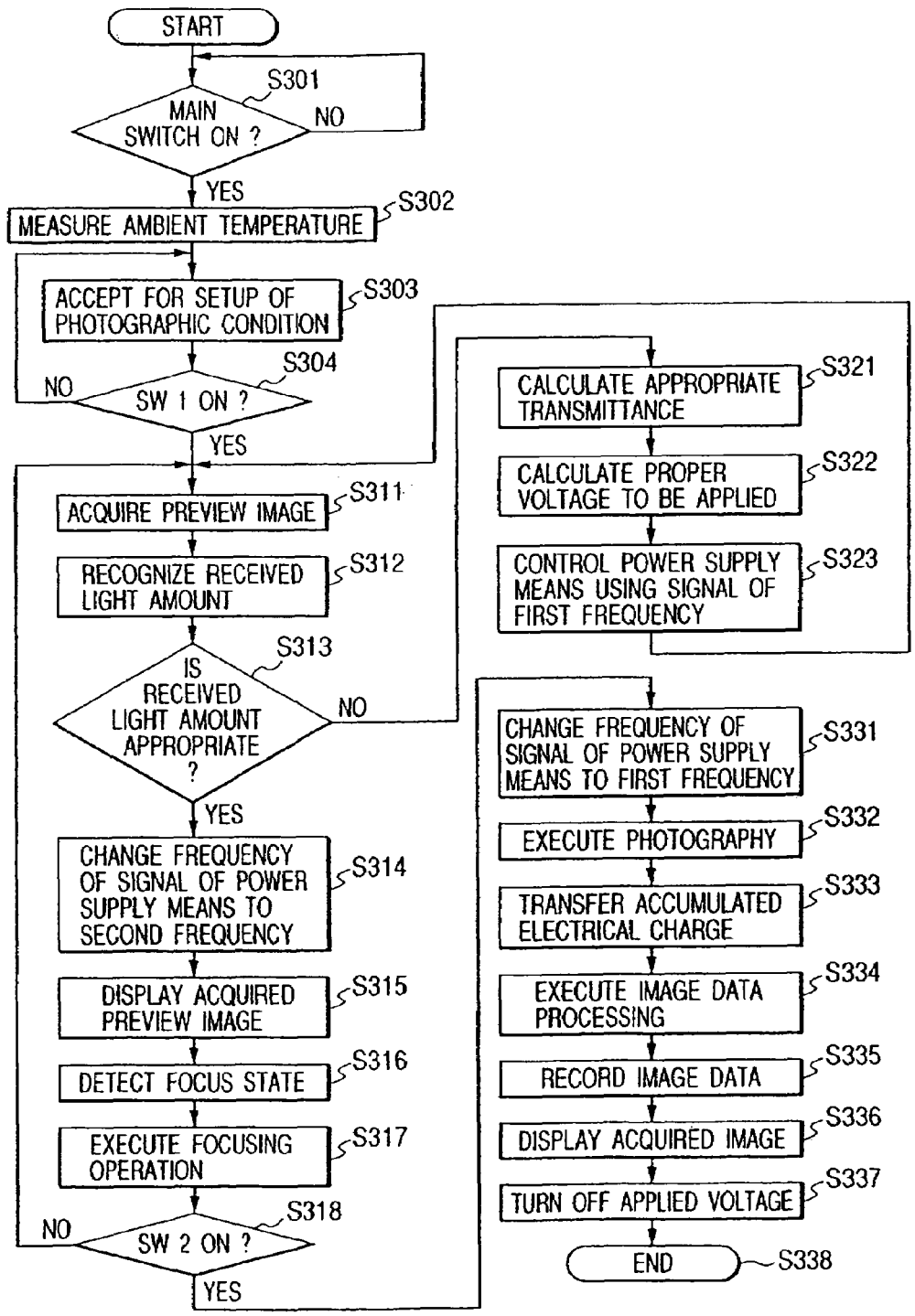
FIG. 19 is a control flow diagram of an optical apparatus in the third embodiment of the present invention.

FIG. 19 is a control flow chart on the CPU 330 which the optical apparatus 350 having been shown in FIG. 18 has. The control flow of the optical apparatus 350 will be described with reference to FIG. 18 as well as FIG. 19 as follows. Incidentally, as for the control flow similar to that in the first embodiment, detailed description thereof will be omitted.

In the step S301, distinction on whether or not on-operation of the main switch 152 is executed by the photographer is implemented and when the on-operation is not yet executed, the state remains in the step S301. In the step S301, when on-switch operation of the main switch 152 is distinguished, the CPU 330 gets out of the sleep state so as to execute the step S302 and onward.

In the step S302, as in the first embodiment, the ambient temperature where the optical apparatus 350 is disposed, that is, the periphery air temperature of the optical apparatus 350 is measured with the temperature sensor 146.

In the step S303, setup of photographic conditions by a photographer is accepted. In the step S304, distinction on whether or not on-operation on the pre-photo-taking switch (indicated as SW1 in the flow chart) has been executed by the photographer is implemented. In the case where the on-operation is not executed, the state returns to S303 so that distinguishing on acceptance for setup of photographic conditions is repeated.

Once the pre-photo-taking switch is determined to have been operated on in the step S304, the process continues to the step S311.

Since steps S311 and S312 are similar to those in the first embodiment, description thereon will be omitted.

In the step S313, distinction on whether or not the received light amount judged in the above described step S312 is appropriate is implemented. In addition, when the present step recognizes its appropriateness, the process continues to the step S314.

On the other hand, when in the step S313 it is distinguished that the received light amount judged in the above described step S312 is not appropriate, the state leaps to the step S321. In the step S321 the actual received light amount is compared with the appropriate received light amount so as to calculate the appropriate transmittance to be given to the optical element 801 inside the photo-taking optical system 430. In the step S322 the voltage to be applied to the optical element 801 is calculated in order to acquire the appropriate transmittance calculated in the step S321. In particular, the ROM of the CPU 330 stores the relationship on the transmittance toward the applied voltage as the form of look-up table 347, the applied voltage $V_3$ directed to the transmittance calculated in the step S321 is acquired with reference to the table. That is, in order to control the interfacial deformation amount of the optical element, the duty ratio of the alternate output from the power supply means in the first embodiment and the frequency in the second embodiment were switched, but in the third embodiment, the peak voltage is switched.

In the step S323, the power supply means applies to the optical element 801 an alternate current voltage with the peak voltage of $\pm V_3$ and the first frequency. Here, in this embodiment, the first frequency is set at 1 kHz. Then, the interface 824 of the optical element 801 is deformed into a predetermined shape corresponding with the effective value of the input voltage, and the light flux transmittance of the element 801 is controlled at the desired value.

After execution of the step S323, the state returns to the step S311, and until the incident light amount into the photo-taking means 144 becomes appropriate, the steps from image signals acquisition in the step S311 to the step 323 are executed repeatedly. In addition, when the incident light amount into the photo-taking means 144 becomes appropriate, the state shifts from the step S313 to the step S314.

In the step S314, the frequency of the alternate signals outputted from the power supply means 131 is switched with the second frequency. In this embodiment, the second frequency is set at 250 Hz, but effects due to this switching will be described with reference to FIG. 20 and FIG. 21 later.

In the step S315, the preview image acquired in the step S311 is displayed in the display 151. Subsequently, in the step S316, with the focus detecting means 155 the focus state of the photo-taking optical system 430 is detected. Subsequently, in the step S317, with the focus drive means 156, the first lens group 431 is caused to move forward and backward toward the optical axis to implement accurate focusing operation. Thereafter, the process continues to the step S318 to distinguish whether or not the on-operation of the photo-taking switch (which is expressed as SW2 in the flow chart FIG. 19) has been implemented. When it does not undergo on-operation, the state goes back to the step S311 and the steps covering from the acquisition of the preview image to the focus drive is repeatedly executed.

As described above, if in the midst of executing the pre-photo-taking operation repeatedly, the photographer implements on-operation of the photo-taking switch, then the state leaps from the step S318 to the step S331. In the step S331, the frequency of the alternate signals outputted form the power supply means 131 is switched with the first frequency. That is, the frequency is made to get back to 1 kHz from 250 Hz.

In the step S332, photo-taking session is implemented. That is, the subject image having been formed on the photo-taking means 144 undergoes photoelectric conversion, and the electrical charges in proportion to intensity of the optical image are accumulated in the electrical charge accumulating portion in the vicinity of each light receiving portion. In the step S333, the electrical charges accumulated in the step S131 are read out via accumulated electrical charge transfer line, and the read-out analog signals are inputted into the signal process circuit 145. In the step S334, in the signal process circuit 145, the analog image signals are inputted into A/D conversion, and image processing such as AGC control, white balance, γ correction, and edge emphasis, etc. are executed, and moreover if there arises any necessity, JPEG compression, etc. is implemented with image compression program stored inside the CPU 330. In the step S335 the image signals acquired in the above described step S334 are recorded into the memory 157. In the step S336, at first the preview image displayed in the step S315 is erased, and the image signals acquired in the step S334 is again displayed on the display 151. In the step S337, power supply outputs from the power supply means 131 is stopped so that a series of photo-taking operations come to an end in the step 338.

Next, influence and effects in switching of the frequency of the power supply means output will be described with reference to FIGS. 20A to 20D and FIGS. 21A to 21D. FIG. 20 is explanatory views describing control method of the power supply means and its effects in the case where the output of the power supply means 131 is with the first frequency, that is, 1 kHz.

Figure 20A:
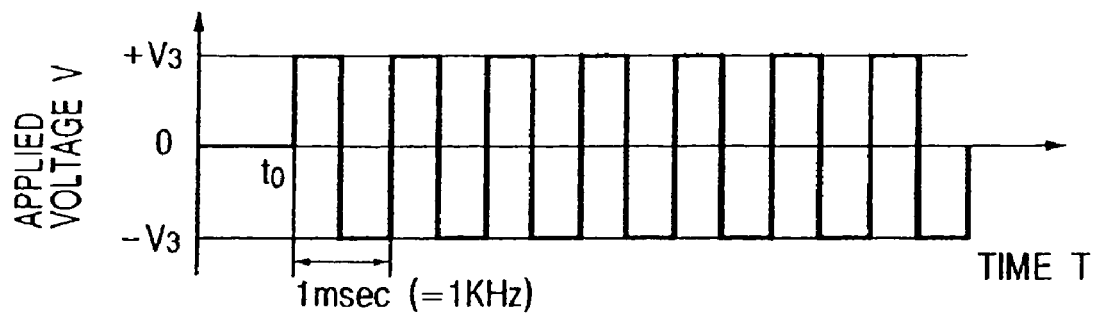
FIGS. 20A, 20B, 20C and 20D are diagrams describing power supply controlling methods in the third embodiment of the present invention respectively.
Figure 20B:
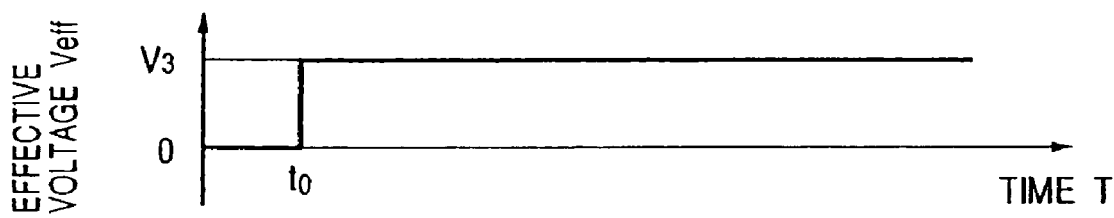
Figure 20C:
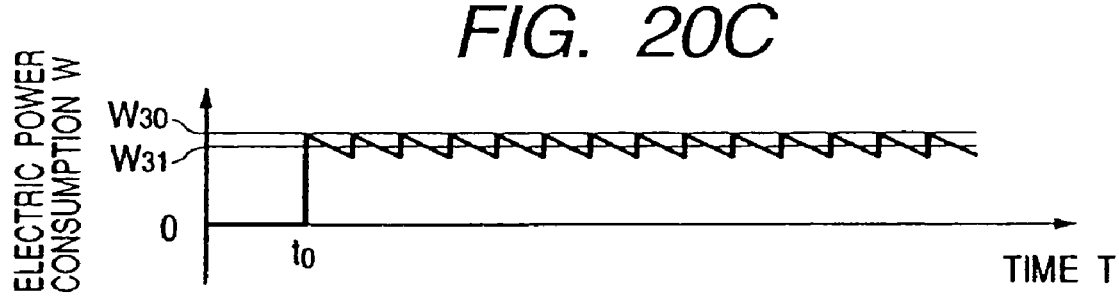
Figure 20D:
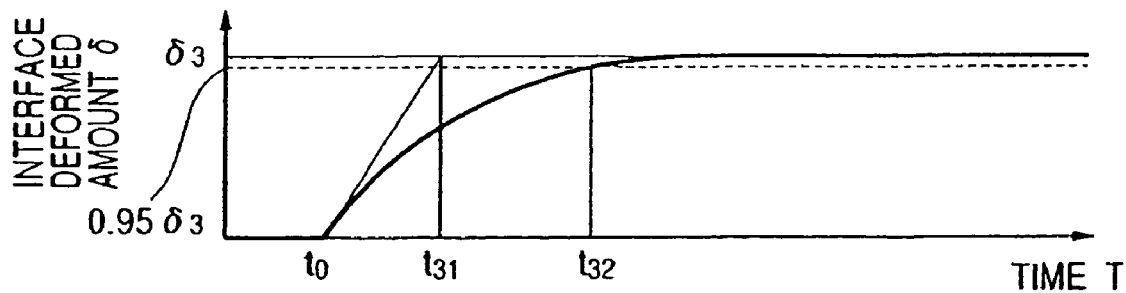

FIG. 20A shows voltage waveform outputted from the power supply means 131 and applied to the optical element 101, and its definition is similar to the one having been described in FIG. 8D. This waveform represents an alternate current voltage of a rectangular wave with the peak voltage of $\pm V_3$ [V], frequency of 1 kHz, and duty ratio of 100%. The frequency 1 kHz here is equivalent to $f_3$ in FIG. 6. At this time, the effective voltage applied to the optical element 101 will be $V_3$ as in FIG. 20B, and the electric power consumption in the power supply means 131 will be shown in FIG. 20C. That is, since the optical element 801 is structured as a capacitor, after application of a constant voltage, in-flow current decreases as electrical charges are accumulated, and therefore, the electric power consumption repeats minute variations in synchronization with switching on polarity of the voltage of the electric power supply as shown in FIG. 20C. The peak value of the electric power consumption at this time is assumed to be W30 and the average value to be W31 respectively. In addition, the interface 824 is deformed with waveform shown in FIG. 20D.

FIGS. 21A to 21D are explanatory views describing control method of the power supply means and its effects in the case where the output of the power supply means 131 is with the second frequency, that is, 250 kHz, and respective waveforms constitute the same meaning as in FIGS. 20A to 20D.

Figure 21A:
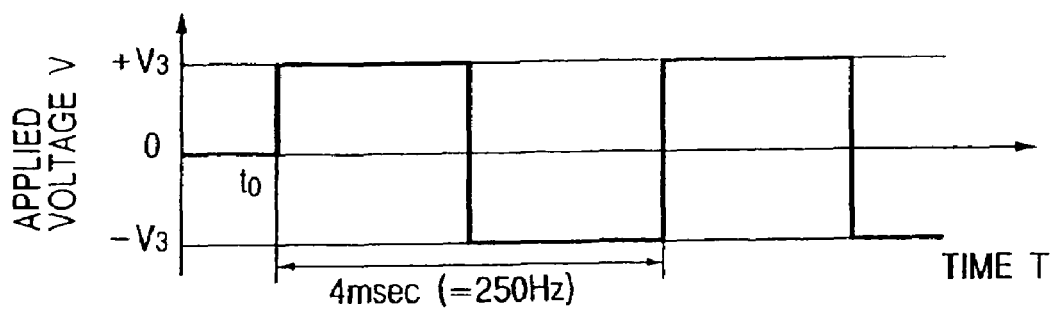
FIGS. 21A, 21B, 21C and 21D are diagrams describing power supply controlling methods in the third embodiment of the present invention respectively.
Figure 21B:
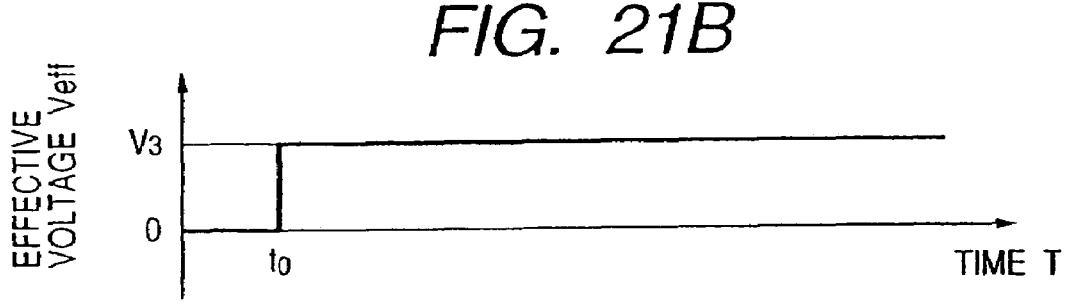
Figure 21C:
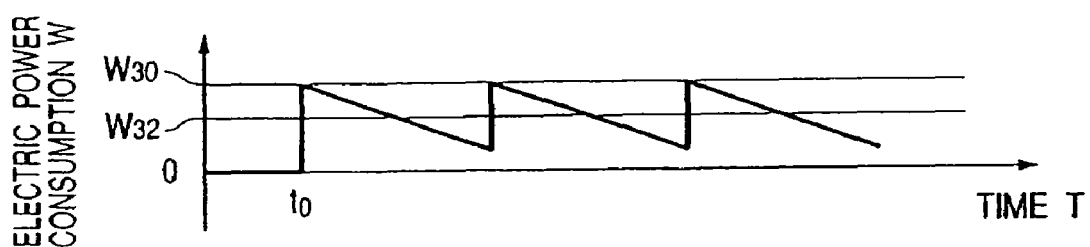
Figure 21D:
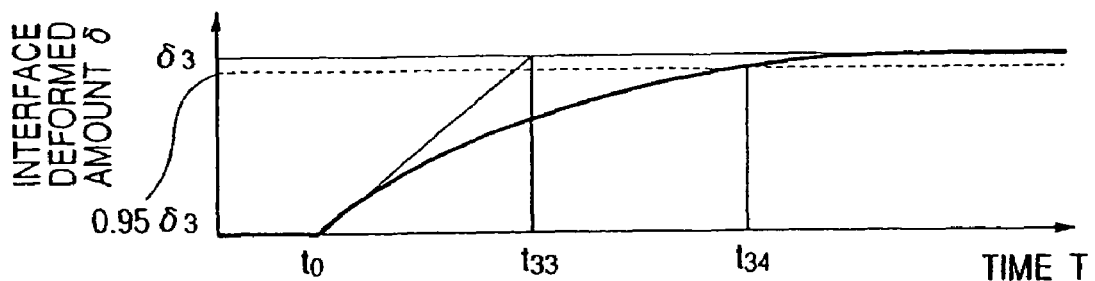

FIG. 21A shows voltage waveform outputted from the power supply means 131 and applied to the optical element 101, and is an alternate current voltage of a rectangular wave with the peak voltage of $\pm V_3$ [V] the same as in FIGS. 20A to 20D, and duty ratio of 100% also the same as in FIGS. 20A to 20D while the frequency is 250 Hz. The frequency 250 Hz here is equivalent to $f_2$ in FIG. 6. At this time, the effective voltage applied to the optical element 101 will be $V_3$ as in FIG. 21B, and the electric power consumption in the power supply means 131 will be shown in FIG. 21C. That is, since the frequency of the signals of power supply to the optical element 801 has decreased, the electric power consumption varies more significantly than that having been shown in FIG. 20C. Accordingly, the electric power consumption average value $W_{32}$ is lower than in the case of FIGS. 20A to 20D. In addition, the interface 824 is deformed with waveform shown in FIG. 21D, but the interfacial deformation velocity at this time is slower than in the case of FIG. 20D. However, after the interfacial deformation amount becomes still with a predetermined value δ3, the interfacial shape gets stable.

According to descriptions so far, with alternate signals with high frequencies to be applied to the optical element 801, the electric power consumption gets larger but the response velocity of the interface gets faster while with the signals with low frequencies the response gets slower but the electric power consumption may be less. Accordingly, in this embodiment, as having been shown in the step S323 in FIG. 19, in the case where the interface shape of the optical element is deformed, application of high frequency makes swift deformation possible. On the other hand, as having been shown in the step S314 in FIG. 19, in the case where deformation comes to an end and a predetermined shape is maintained, the drive frequency is switched to a low frequency so as to attain power saving. In this case, deformation of the interface 824 is already over, and therefore slowness in response velocity of the interface will not become any obstacle.

In addition, in this embodiment, as having been shown in the step S331 in FIG. 19, immediately prior to photo-taking operation, the drive frequency is caused to get back to a high frequency. This serves to strengthen the interface constraint power of the optical element at the time of a photo-taking session, and reduce variation in optical characteristics due to external disturbances during a photo-taking session. In addition, since photo-taking time period is short, increase in electric power consumption will not become any serious obstacles.

According to the above-described third embodiment:

(1) The frequency of the drive signals outputted from the power supply means are switched appropriately corresponding with the state of the optical apparatus so that without sacrificing the deformation velocity of the optical element energy saving on the power supply means can be planned; and (2) At the time when high stability is required in the optical element a high frequency drive signal is supplied and at the time when low stability is tolerable a low frequency drive signal is supplied so that without reducing performance of the optical apparatus energy saving on the power supply means can be planned, and the like will be attained.

Incidentally, in this embodiment, as an example of the optical element, a digital still camera was taken, but it goes without saying that also a video camera or a silver halide film camera, etc. other than that can be taken likewise without spoiling the effects. In addition, the power supply control method of the optical element 801 of this embodiment may be applied to the first embodiment and the second embodiment to attain similar effects, and the power supply control method of the first embodiment and the second embodiment may be applied to the third embodiment to attain similar effects.

Fourth Embodiment

Figure 22:
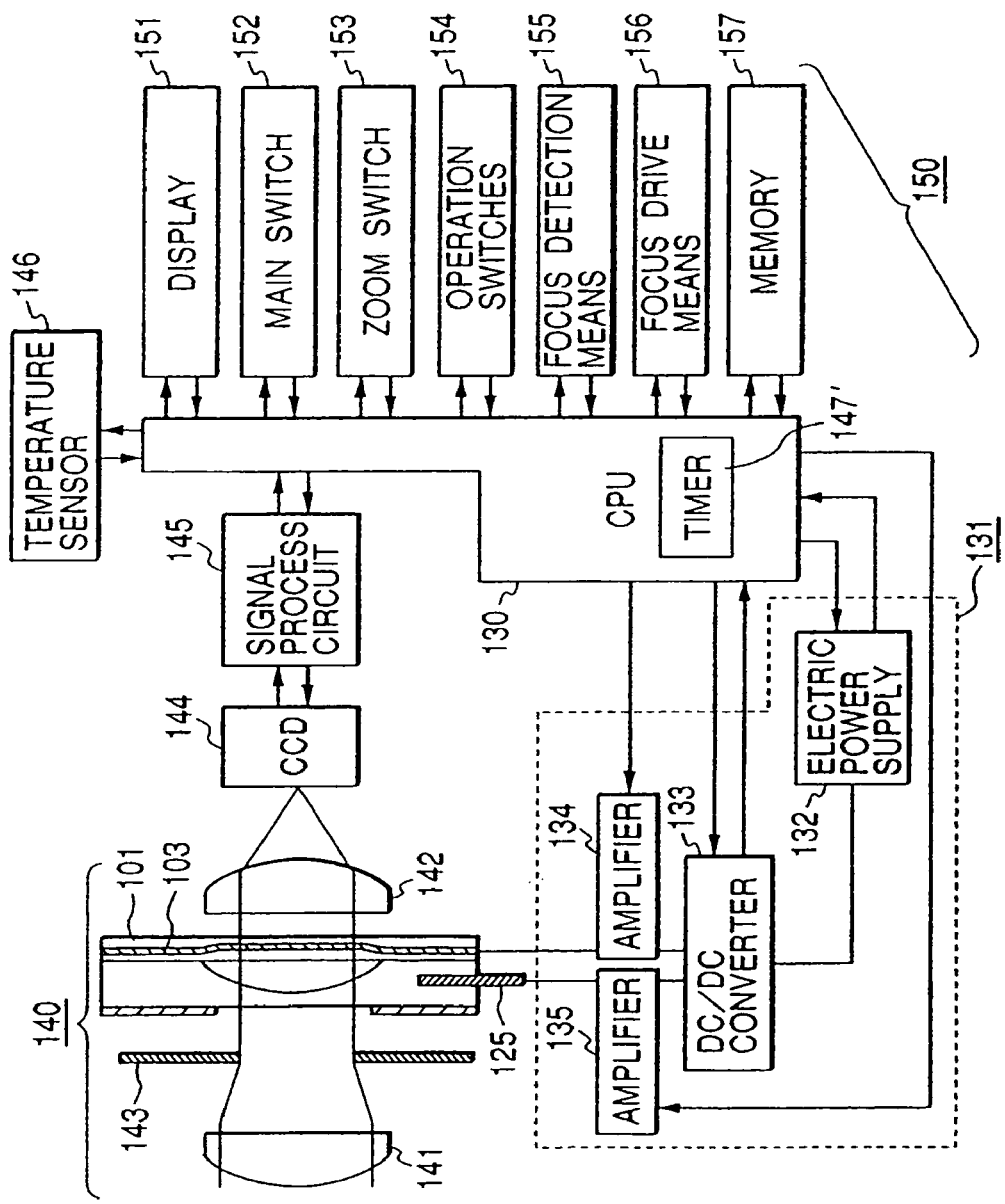
FIG. 22 is a block diagram of an optical apparatus in the fourth embodiment of the present invention.

FIG. 22 shows another example in which the optical element 101 shown in FIG. 2 has been applied to an optical apparatus. In this embodiment, the same symbols are given for the same configuration as in the configuration having been shown in FIG. 9. A timer 147' provided in the CPU 130 is provided to this embodiment, and time set by the CPU 130 is counted.

Figure 23:
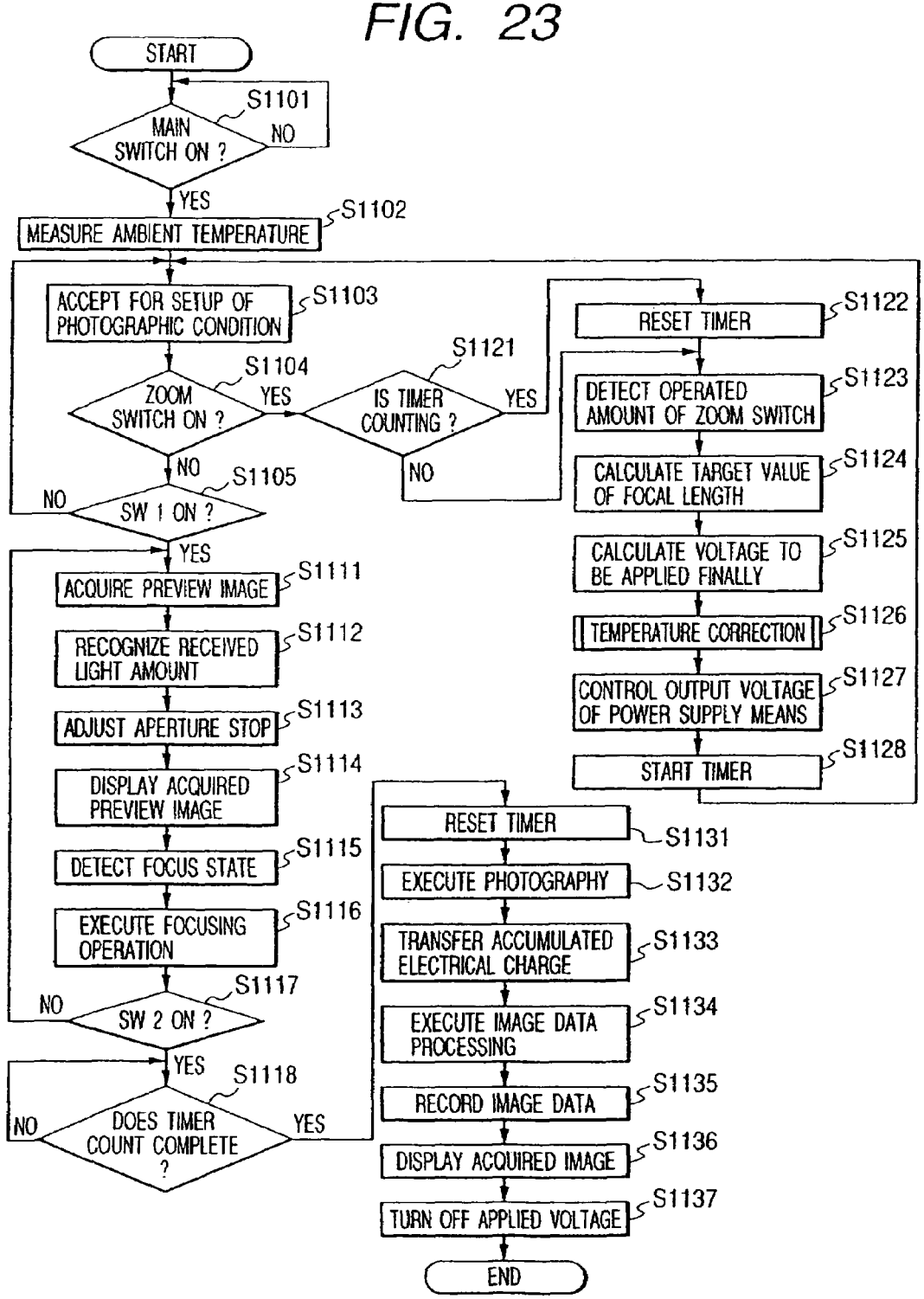
FIG. 23 is a main control flow diagram of an optical apparatus in the fourth embodiment of the present invention.
Figure 24:
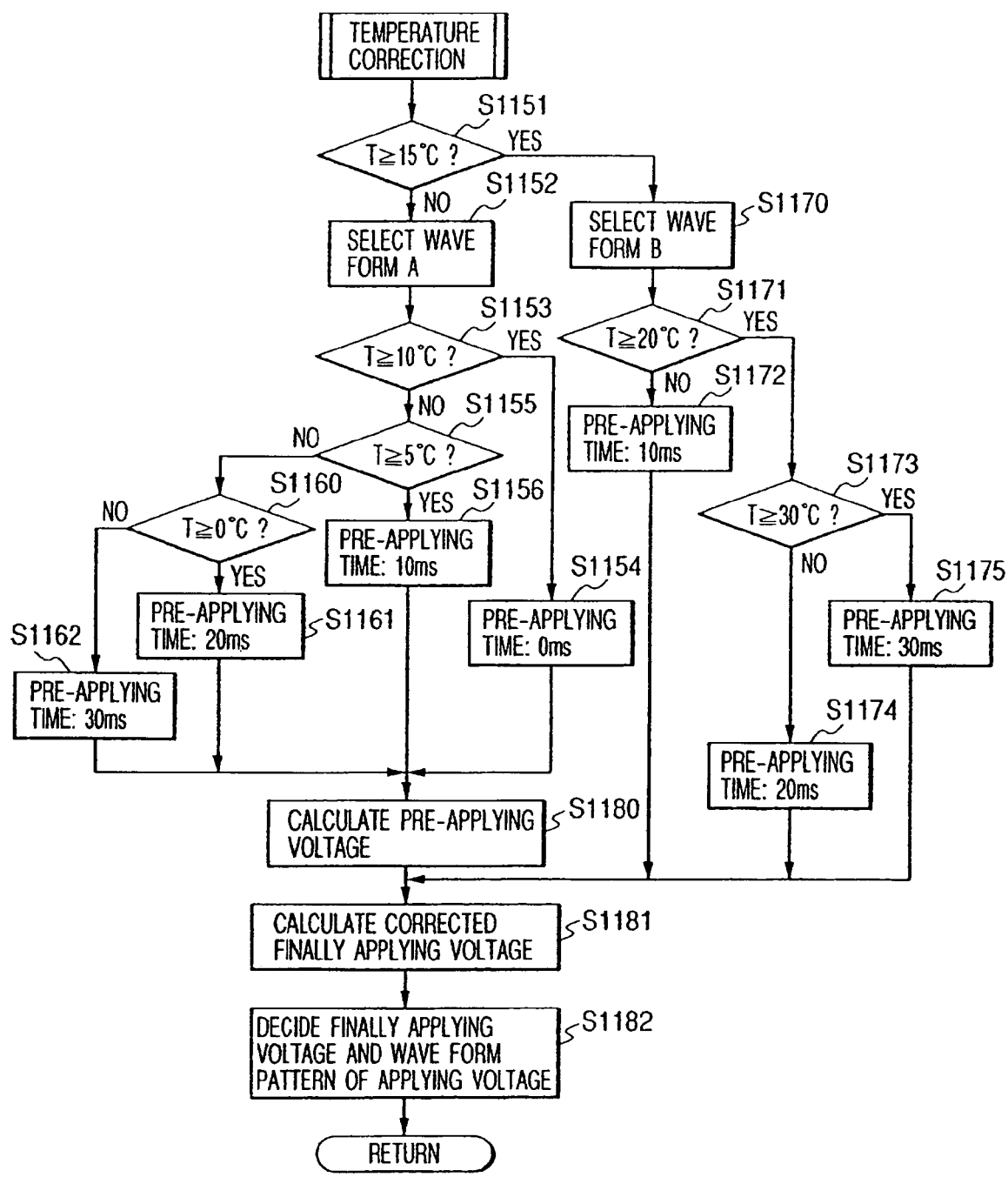
FIG. 24 is a sub-control flow diagram of an optical apparatus in the fourth embodiment of the present invention.

FIG. 23 is a control flow chart of the CPU 130 which the optical apparatus 150 having been shown in FIG. 22 has. The control flow of the optical apparatus 150 will be described with reference to FIG. 22 as well as FIG. 23 as follows.

In the step S1101, distinction on whether or not on-operation of the main switch 152 is executed is implemented and when the on-operation is not yet executed, a waiting mode state in which operation of various switches is waited for remains. In the step S1101, when on-switch operation of the main switch 152 is distinguished, the waiting mode will be overridden and thereafter the process continues to the subsequent step S1102.

In the step S1102, the ambient temperature where the optical apparatus 150 is disposed, that is, the periphery air temperature of the optical apparatus 150 is measured with the temperature sensor 146.

In the step S1103 setup of photographic conditions by a photographer is accepted. For example, setup such as setup on exposure control mode (shutter priority AE and program AE, etc.), image quality mode (size in the number of recording pixels and size of image compression rate, etc.), and the electronic flash mode (compulsory flash and flash prohibition, etc.), etc. is implemented.

In the step S1104 distinction on whether or not the zoom switch 153 has been operated by the photographer is implemented. In the case no on-operation has been executed, the process continues to the step S1105. Here, in the case where the zoom switch 153 has been operated, the process continues to the step S1121.

In the step S1121 distinction on whether or not the timer 147' is in the midst of counting is implemented. If counting is not going on, the process continues to the step S1123, and in the case where counting is going on, after resetting the counter value (S1122), the state continues to the step S1123.

In the step S1123, the operation quantity of the zoom switch 153 (operation direction and on-time period, etc.) is detected, and the corresponding varied amount of focal length is calculated based on that operate amount (S1124). As the result of that calculation, the reference voltage value to be applied finally $V_0$ to the optical element 101 is determined (S1125), and the process continues to the subroutine of "temperature correction" to correct standard voltage value to be applied finally in terms of temperature and decide the waveform of applying voltage (the details will be described later). The power supply means 131 are controlled with the corrected finally applying voltage value and applying waveform pattern to be applied to the optical element 101 decided in the subroutine so that a voltage is applied to the optical element (S1127). Concurrently therewith, counting of the timer 147' is started (S1128). And the state goes back to the step S1103. That is, in the case where operation of the zoom switch 153 goes on, the step S1103 to the step S1128 are repeatedly executed so that the process continues to the step S1105 at the time point when on-operation of the zoom switch 153 is over.

In the step S1105 distinction on whether or not on-operation on the pre-photo-taking switch (indicated as SW1 in the flow chart in FIG. 23) among the operation switches 154 has been executed by the photographer is implemented. In the case where the on-operation is not executed, the state returns to the step S1103 so that acceptance for setup of photographic conditions and distinguishing on operation of zoom switch 153 are repeated. Once the pre-photo-taking switch is determined to have been operated on in the step S1105, the process continues to the step S1111.

In the step S1111, the photo-taking means 144 as well as the signal process circuit 145 is driven to acquire the preview image. The preview image refers to an image to be acquired prior to photo-taking session in order to appropriately set up the photo-taking conditions on the image for final recording as well as to make the photographer understand the photo-taking construction.

In the step S1112 the received light level of the preview image acquired by the step S1111 is recognized. In particular, in the image signals which the photo-taking means 144 output, the output signal levels of maximum, minimum and average are calculated so that the light amount emitted into the photo-taking means 144 is precieved.

In the step S1113, based on the received light amount recognized by the above described step S1112, the aperture stop unit 143 provided in the photo-taking optical system 140 is driven so that the aperture diameter of the aperture stop unit 143 is adjusted so as to obtain a proper light amount.

In the step S1114, the preview image acquired in the step S1111 is displayed in the display 151. Subsequently, in the step S1115, with the focus detecting means 155 the focus state of the photo-taking optical system 140 is detected. Subsequently, in the step S1116, with the focus drive means 156, the first lens group 141 is caused to move forward and backward toward the optical axis to implement accurate focusing operation. Thereafter, the process continues to the step S1117 to distinguish whether or not the on-operation of the photo-taking switch (which is expressed as SW2 in the flow chart FIG. 23) has been implemented. When it does not undergo on-operation, the state goes back to the step S1111 and the steps covering from the acquisition of the preview image to the focus drive is repeatedly executed.

As described above, if in the midst of executing the pre-photo-taking operation repeatedly, when the photographer implements on-operation of the photo-taking switch, whether or not counting of the timer 147' is completed is distinguished (S1118). In the case where counting is not yet completed, distinction will go on as is, and at the time point when counting of the timer 147' is completed, the state leaps from the step S1118 to the step S1131, and after the counted value of the timer 147' is reset (S1131), the process continues to the step S1132.

In the step S1132, photo-taking session is implemented. That is, the subject image having been formed on the photo-taking means 144 undergoes photoelectric conversion, and the electrical charges in proportion to intensity of the optical image are accumulated in the electrical charge accumulating portion in the vicinity of each light receiving portion. In the step S1133 the electrical charges accumulated in the step S132 are read out via accumulated electrical charge transfer line, and the read-out analog signals are inputted into the signal process circuit 145. In the step S1134, in the signal process circuit 145, the analog image signals are inputted into A/D conversion, and image processing such as AGC control, white balance, γ correction, and edge emphasis, etc. are implemented, and moreover if there arises any necessity, JPEG compression, etc. is implemented with image compression program stored inside the CPU 130. In the step S1135, the image signals acquired in the above described step S1134 are recorded into the memory 157, and at the same time, in the step S1136 the preview image is erased once, and afterwards the image signals acquired in the step S1134 is again displayed on the display 151. Thereafter, the power supply means 131 is controlled to stop voltage application to the optical element 101 (S1137) so that a series of photo-taking operations come to an end.

Figure 25A:
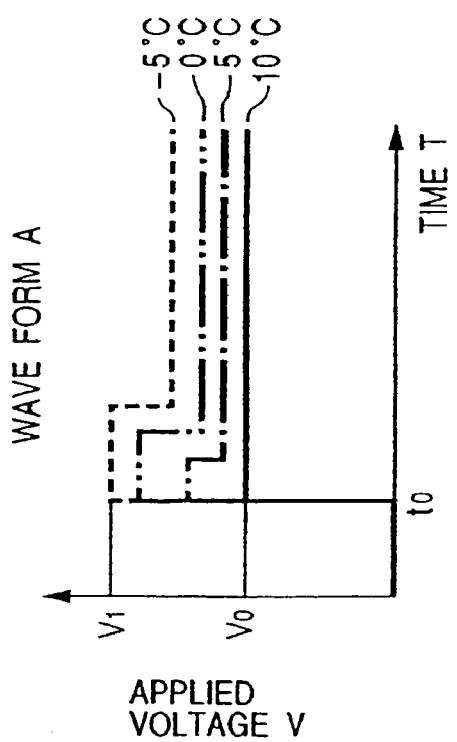
FIGS. 25A, 25B, 25C and 25D are diagrams describing relationship between applied voltage and change of interface form of an optical element in the fourth embodiment of the present invention respectively.

Next, the case where temperature correction is implemented will be described with reference to FIG. 24 and FIGS. 25A to 25D. In the step S1151, distinction on whether or not the air temperature measured with the temperature sensor 146 is not less than 15° C. is implemented. In the case where the air temperature is not more than 15° C., the waveform of applying voltage A having been shown in FIG. 25A is selected (S1152). At the time of low temperature, viscosity of the liquids 121 and 122 in the optical element 101 becomes high to lengthen the time period until the interface completes deformation, and therefore by applying voltage higher than a predetermined final voltage reference value $V_0$ at the startup after the electric power supply is switched on, the interfacial deformation amount at the time of startup is made to increase so that the completion time period of the interfacial deformation is planned to be short.

In this waveform pattern, for a predetermined time period prior to the first voltage to be applied to the optical element 101, that is, the final voltage reference value $V_0$ is applied (hereinafter to be referred to as pre-applying time), the second voltage higher than the final voltage reference value $V_0$, that is, the prevoltage value $V_1$ is applied to the optical element 101, and after the pre-applying time lapses the final voltage reference value $V_0$ is applied to the optical element 101.

In the case where the measured air temperature is not less than 10° C. and less than 15° C. (S1153), the pre-applying time is set at 0 ms (S1154), and the process continues to the S1180 where the prevoltage value $V_1$ is calculated.

In the case where the measured air temperature is not less than 5° C. and less than 10° C. (S1155), the pre-applying time is set at 10 ms (S1156), and the process continues to the S1180 where the prevoltage value $V_1$ is calculated.

In the case where the measured air temperature is not less than 0° C. and less than 5° C. (S1160), the pre-applying time is set at 20 ms (S1156), and the process continues to the S1180 where the prevoltage value $V_1$ is calculated.

In the case where the measured air temperature is less than 0° C. (S1160), the pre-applying time is set at 30 ms (S1156), and the process continues to the S1180 where the prevoltage value $V_1$ is calculated.

The prevoltage value $V_1$ calculated in the step S1180 is given by for example an equation as follows:

Prevoltage value $V_1$=(correction constant 1)×(reference temperature−measured temperature)    Equation (1-1)

That is, the value obtained by multiplying (correction constant 1) to the temperature difference against the reference temperature, that is, 15° C. will be the prevoltage value $V_1$. After the prevoltage value $V_1$ is given, the process continues to the step S1181 so that correction amount of the final voltage reference value $V_0$ is calculated and the final voltage applying time is given. The final voltage reference value $V_0$ is already given in the step S1125, but is also corrected using correction expressed, for example, by the following equation.

$$\text{Corrected final voltage value } V_0' = \text{(final voltage reference value } V_0) + \text{(correction constant 2)} \times \begin{pmatrix} \text{reference temperature}- \\ \text{measured temperature} \end{pmatrix} \quad \text{Equation (1-2)}$$

That is, the final voltage reference value $V_0$ given in the step S1125 is added to the value obtained by multiplying (correction constant 2) to the temperature difference against the reference temperature, that is, 15° C., resulting in the corrected final voltage value $V_0'$.

Figure 25B:
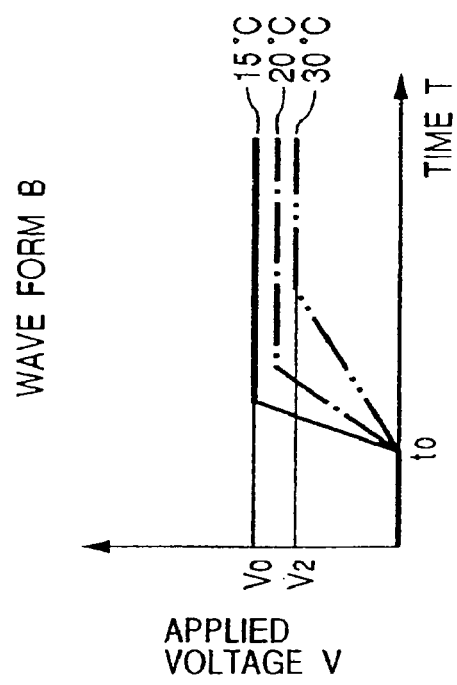
Figure 25C:
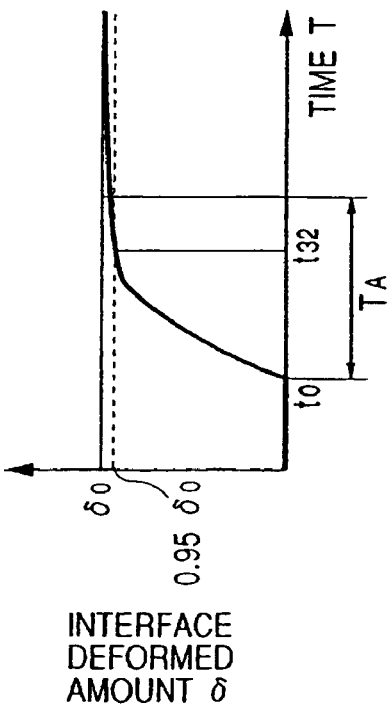

Controlling as described so far is implemented so that the applying voltage waveform is delicately altered as having been shown in FIG. 25A corresponding with temperature, and consequently the interface response waveform will approximately constant regardless of temperatures as in FIG. 25C, and deformation is completed at the time point $t_{32}$. Under the circumstances, the waiting time period of the timer 147' to be regarded as the reference of completion of deformation is made $T_A$ slightly longer than $t_{32}$, and $T_A$ is stored in the memory of the CPU 130 in advance. In addition, in the step S1118 in FIG. 23 this $T_A$ is treated as a judgment value of timer completion so that execution of flow of and after the step S1131 is permitted after the interface gets still.

On the other hand, in the case where in the step S151 the measured temperature is not less than 15° C., the waveform of applying voltage B having been shown in FIG. 25B is selected (S1170). In this relation, at the time of high temperature, viscosity of the liquids 121 and 122 in the optical element 101 becomes low to result in occurrence of oscillating phenomena before the interface completes deformation sometimes, and therefore by applying voltage gradually increasing to reach a predetermined final voltage reference value $V_0$ at the startup after the electric power supply is switched on, the interface oscillation phenomena at the time of startup is planned to be suppressed.

In this waveform pattern, for a predetermined time period before the final voltage reference value $V_0$ to be applied to the optical element 101 is applied (also hereinafter to be referred to as pre-applying time), the voltage control is implemented so as to gradually reach the final voltage reference value $V_0$.

In the case where the measured air temperature is not less than 15° C. and less than 20° C. (S1171), the pre-applying time is set at 10 ms (S1172), and the process continues to the S1181 where the corrected finally applying voltage value $V_0'$ is calculated and time period of the finally applying voltage is calculated.

In the case where the measured air temperature is not less than 20° C. and less than 30° C. (S1173), the pre-applying time is set at 20 ms (S1174), and the process continues to the S1181 where the corrected finally applying voltage value $V_0'$ is calculated and time period of the finally applying voltage is calculated.

In the case where the measured air temperature is not less than 30° C. (S1173), the pre-applying time is set at 30 ms (S1175), and the process continues to the S1181 where the corrected finally applying voltage value $V_0'$ is calculated and time period of the finally applying voltage is calculated.

Figure 25D:
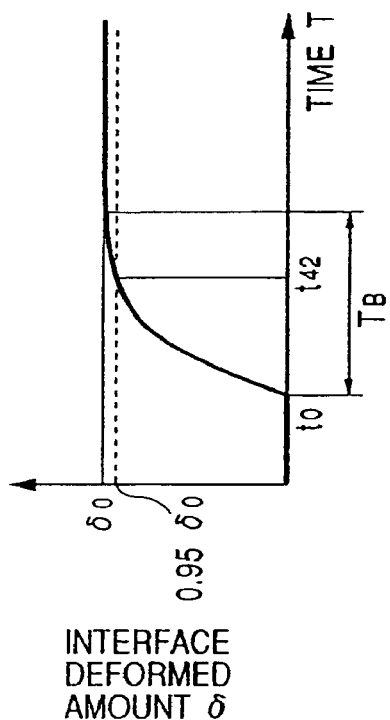

Controlling as described so far is implemented so that the applying voltage waveform is delicately altered as having been shown in FIG. 25B corresponding with temperature, and consequently the interface response waveform will be approximately constant regardless of temperatures as in FIG. 25D, and deformation is completed at the time point $t_{42}$. Under the circumstances, the waiting time period of the timer 147' to be regarded as the reference of completion of deformation is made $T_B$ slightly longer than $t_{42}$, and $T_B$ is stored in the memory of the CPU 130 in advance. In addition, in the step S1118 in FIG. 23 this $T_B$ is treated as a judgment value of timer completion so that execution of flow of and after the step S1131 is permitted after the interface gets still.

As described so far, the finally applying voltage value and the waveform pattern of applying voltage corresponding to temperatures are decided (S1182), and thus the state is returned to the step 1127.

In addition, it is possible to implement optimum drive control for respective temperatures by controlling the finally applying voltage value and the waveform pattern of applying voltage depending on temperature.

According to the above described fourth embodiment:

(1) The finally applying voltage value and the waveform pattern of applying voltage to the optical element are controlled corresponding with temperatures so that an optical apparatus that can shorten the time period of deformation completion of the optical element can be made available;

(2) Since the time period to drive the optical element could be shortened actually, electric power consumption can be reduced; and, (3) Since exposure is prohibited until the deformation of the optical element gets still, such a case that the photo-taking operation of the optical apparatus is influenced is annulled, and the like will be attained.

Incidentally, in this embodiment, the reference temperature for switching the waveform pattern of the applying voltage is set at 15° C. and the pre-applying time is set for respective temperatures, similar effects can be attained by setting the reference temperature as well as the pre-applying time by configuration of the optical element and the kinds and combination of liquids thereof, etc.

In addition, the voltage was applied to the optical element in two stages, but with a multi-stage arrangement involving more stages similar effects can be attained.

Moreover, the corrected amount of the finally applying voltage value as well as the pre-applying voltage value for respective temperatures were given by calculation, but effects similar to those in this embodiment can be attained as well by storing, as having been shown in FIG. 26, for example, a table decided by the temperature of the desired focal length and using it as respective correction amounts.

Incidentally, in this embodiment, as an example of the optical element, a digital still camera was taken, but it goes without saying that also a video camera or a silver salt camera, etc. other than that can be taken likewise without spoiling the effects.

Fifth Embodiment

The above described fourth embodiment was an embodiment in the case where voltages are applied to the optical element without anything being applied thereto. On the contrary hereto, the fifth embodiment to be shown as follows is a configuration example in which in the case where a voltage is applied to the optical element and interface thereof is still an operation to alter its interface shape was executed.

Figure 27:
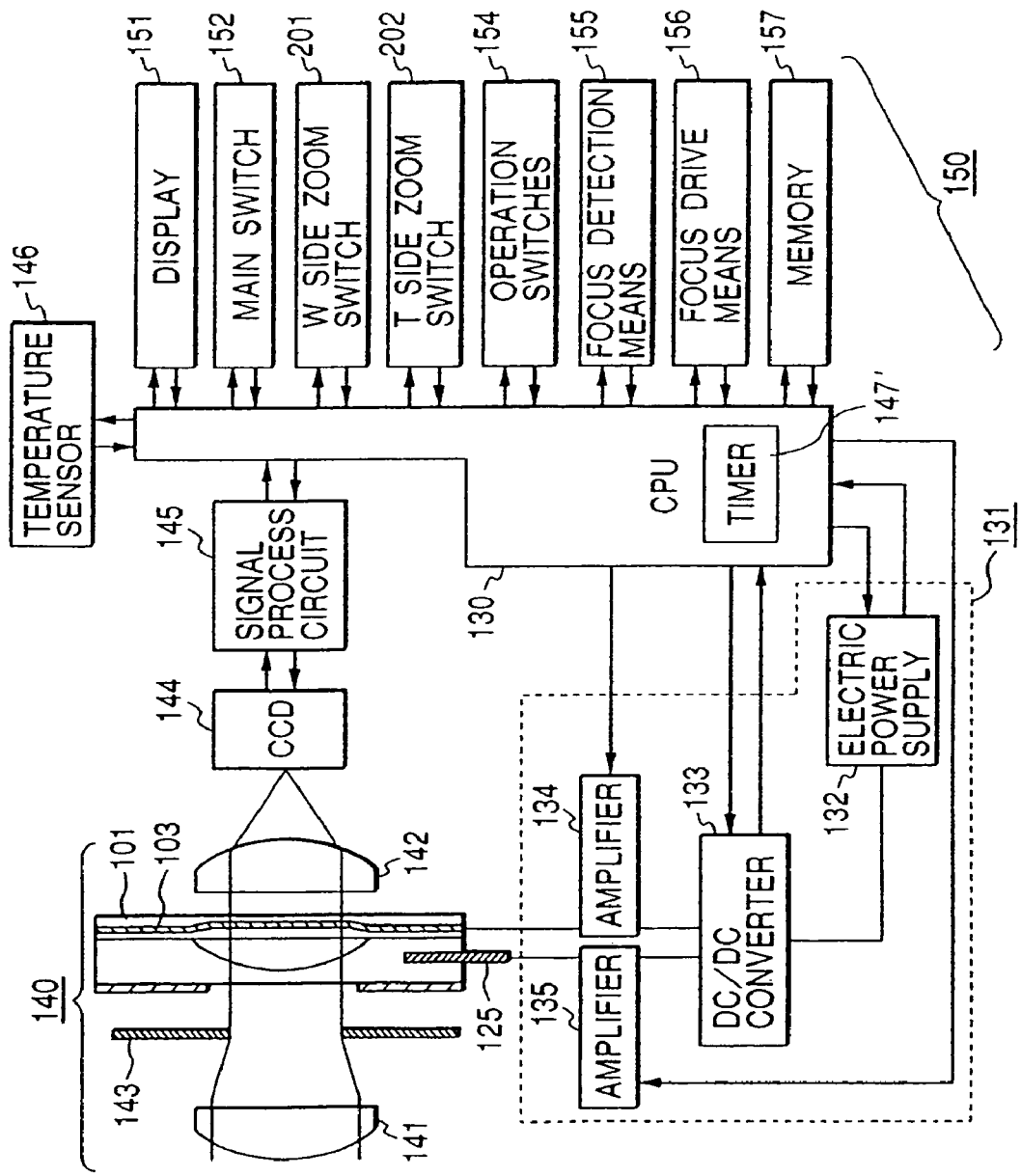
FIG. 27 is a block diagram of an optical apparatus in the fifth embodiment of the present invention.

FIG. 27 and FIG. 30 are drawings related to the fifth embodiment of the present invention.

FIG. 27 is the one in which a digital still camera as an example of the optical element 101 as in the fourth embodiment was applied to the optical apparatus. As for those similar to the ones in the fourth embodiment, description thereon will be omitted.

In the above described drawing, the optical apparatus 150 has a W side zooming switch 201 for making respective optical systems such as photo-taking optical systems and observation optical systems such as a finder, etc. and the like zoom to the wide-angle side and a T side zooming switch 202 for making the above-described optical systems zoom to the telephotographic side.

Figure 28:
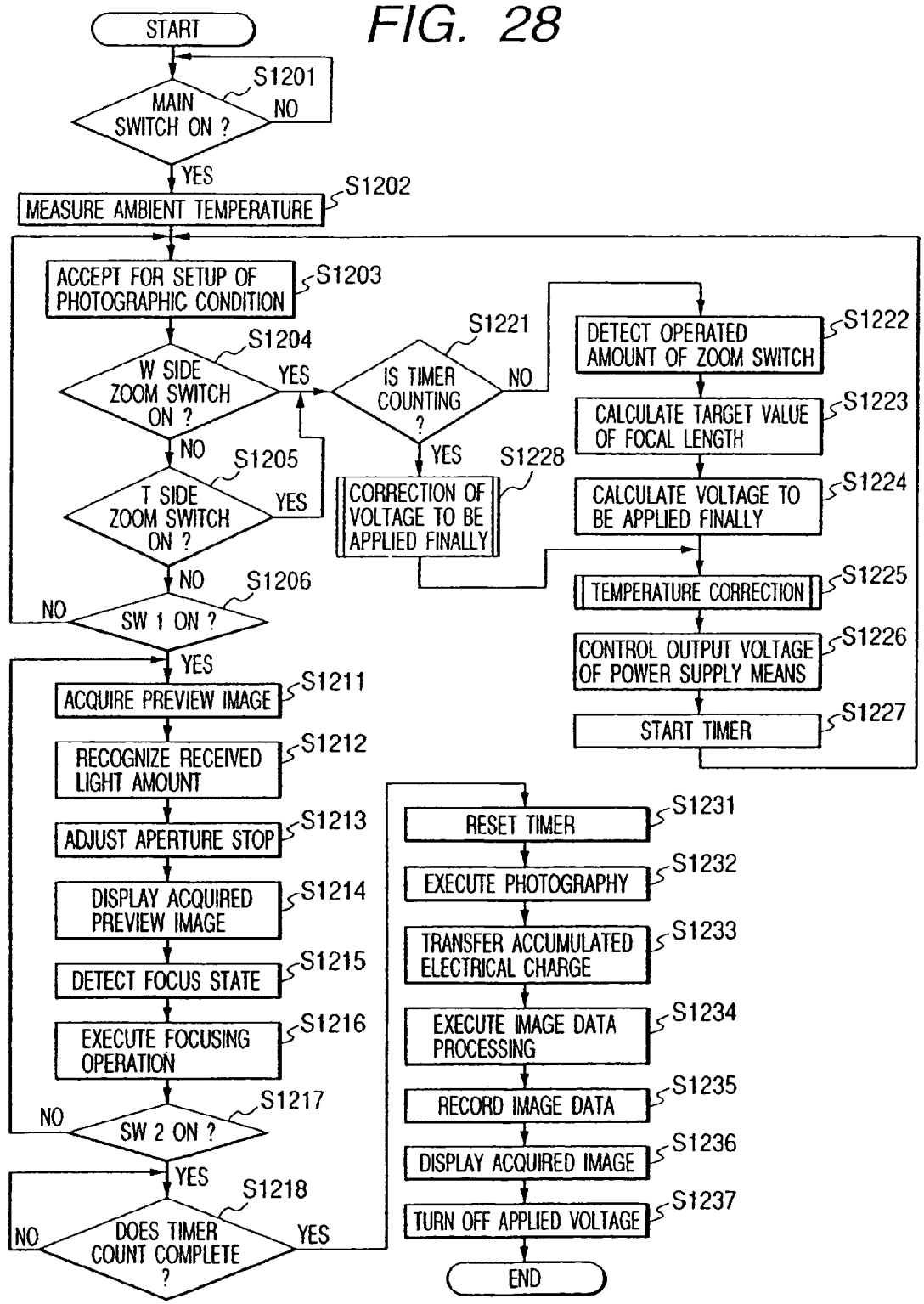
FIG. 28 is a main control flow diagram of an optical apparatus in the fifth embodiment of the present invention.
Figure 29:
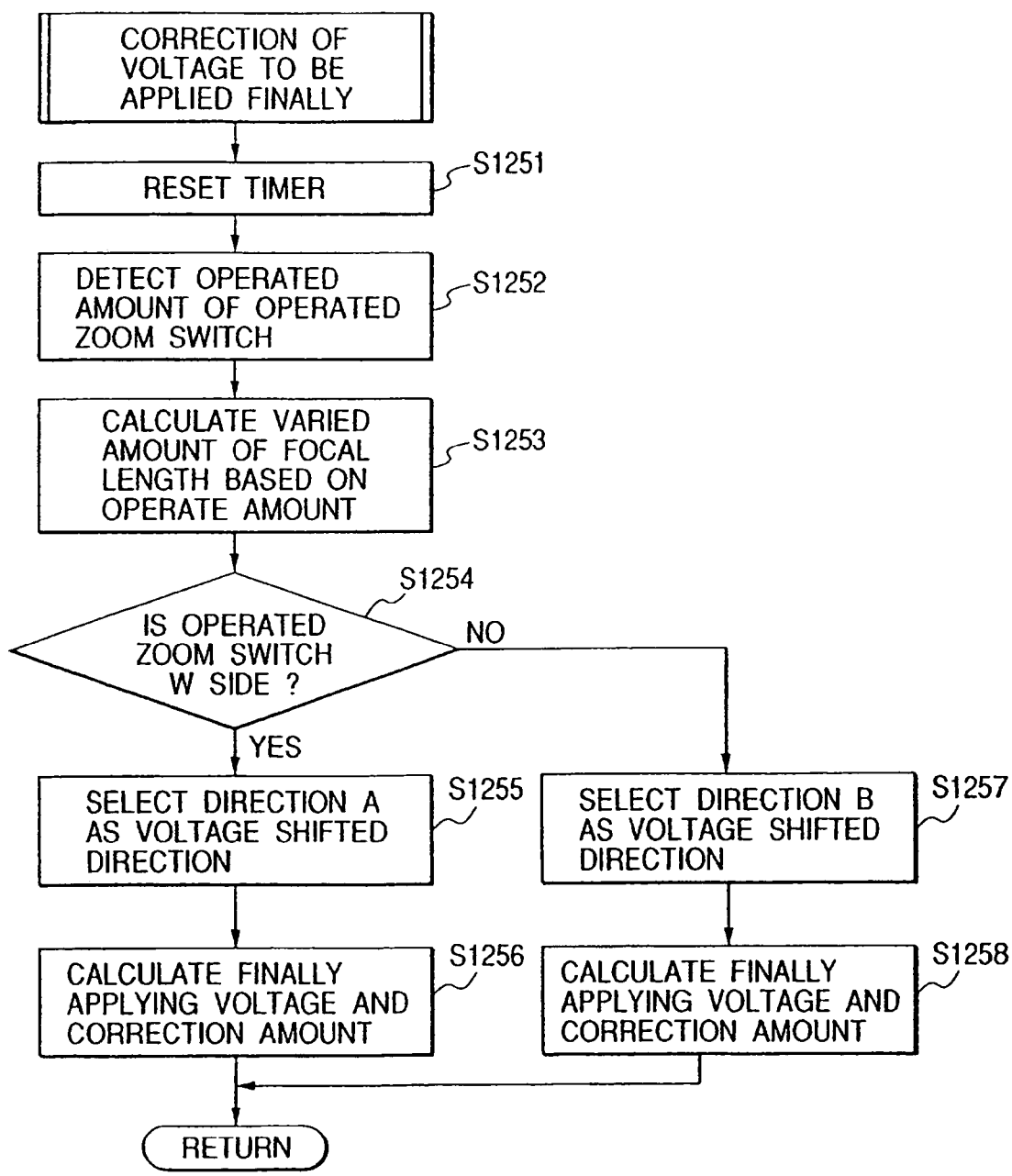
FIG. 29 is a sub-control flow diagram of an optical apparatus in the fifth embodiment of the present invention.

FIG. 28 and FIG. 29 are a control flow chart of the optical apparatus 150 having been shown in FIG. 27. The control flow of the optical apparatus 150 will be described with reference to FIG. 28 as well as FIG. 29 as follows.

Since the state from the step S1201 to the step S1203 up to acceptance for setup of photographic conditions is similar to those in the fourth embodiment, descriptions thereon will be omitted.

In the step S1204, distinction on whether or not the photographer has operated the W side zoom switch 201 is implemented. In the case no on-operation has been executed, the process continues to the step S1205. Here, in the case where the W side zoom switch 201 has been operated, the process continues to the step S1221.

In the step S1205, distinction on whether or not the T side zoom switch 202 has been operated by the photographer is implemented. In the case no on-operation has been executed, the process continues to the step S1206. Here, in the case where the T side zoom switch 202 has been operated, the process continues to the step S1221.

In the step S1206, distinction on, as in the fourth embodiment, whether or not on-operation on the pre-photo-taking switch (indicated as SW1 in the flow chart in FIG. 28) among the operation switches 154 has been executed by the photographer is implemented. In the case where the on-operation is not executed, the state returns to the step S1203 so that acceptance for setup of photographic conditions and distinguishing on operation of respective zoom switches is repeated. Once the pre-photo-taking switch is determined to have been operated on in the step S1206, the process continues to the step S1211.

Since the control flow from the step S1211 to the step S1237 is similar to those in the fourth embodiment, descriptions thereon will be omitted.

In the step S1221, to which the process continues in the case where the W side zoom switch 201 or the T side zoom switch 202 was operated in the step S1204 or in the step S1205, distinction on whether or not the timer 147' is in the midst of counting is implemented. In the case where counting is not going on, the process continues to the step S1222 and as in the fourth embodiment a series of control flow from "detection of operated amount of zoom switch" in the step S1222 to "timer start" in the step S1227 is implemented, and therefore description thereon will be omitted.

On the other hand, in the case wherein the step S1221 it is distinguished that the timer 147' is counting, that is, a predetermined amount of voltage is applied to the optical element 101, the process continues to the subroutine of "finally applied voltage correction" in the step S1228.

Next, correction on finally applied voltage will be described with reference to FIG. 29 and FIG. 30.

In the step S1251, the counter value of the timer 147' is reset. Next, in the step S1252, the operation quantity of the zoom switch which has been operated is detected, and the corresponding varied amount of focal length is calculated based on that operate amount (S1253).

In the step S1254, which zoom switch has been operated is distinguished. In the case where the W side zoom switch 201 has been operated, the process continues to the step S1255, and in the case where the T side zoom switch 202 has been operated, the process continues to the step S1257.

Figure 30A:
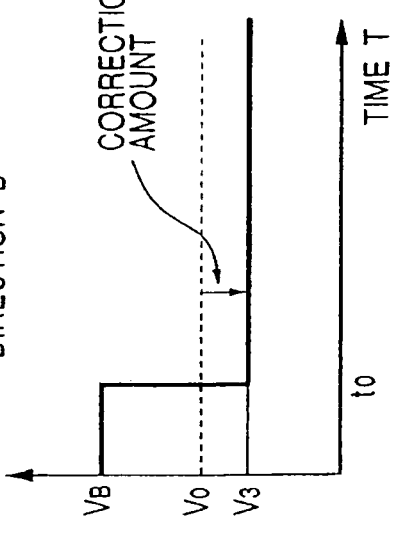
FIGS. 30A, 30B, 30C and 30D are diagrams describing relationships between applied voltage and change of interface form of an optical element in the fifth embodiment of the present invention, respectively.

The result that the W side zoom switch 201 has been operated in the distinction in the step S1254 means that the voltage value applied to optical element 101 is caused to increase to further deform the interface 124 so that the focal length of the optical element 101 is shortened, and therefore in the step S1255, the direction in which finally applied voltage value is corrected as in the direction indicated in FIG. 30A. In addition, from the voltage value $V_A$ applied to the optical element 101, value $V_2$ which is obtained by adding the correction value to the finally applying voltage reference value $V_0$ to be given by the varied amount of focal length is decided as the corrected finally applied voltage value in the case where the W side zooming switch 201 has been operated, and therefore, $V_0$ as well as its correction amount is calculated in the step S1256.

Figure 30C:
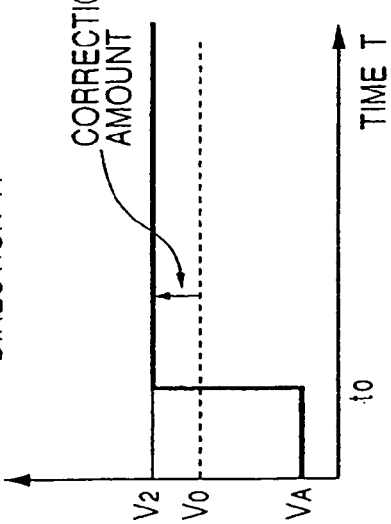

Incidentally, the correction amount at this time may be decided by calculation, or may be a table value in the memory in the CPU 130 decided corresponding to the finally applied voltage reference value $V_0$. Thus, as shown in FIG. 30C, with $V_0$ being the finally applied voltage value, the interface 124 of the optical element 101 changes as shown in a broken line in accordance with lapse of time, and deformation takes place only to an optically unacceptable deformation amount, for example, $0.90\delta_A$ with respect of the desired deformation amount $\delta_A$ at the final stage, but with $V_2$ being the finally applied voltage value, the interface 124 changes as shown in a bold line in accordance with lapse of time, and deformation reaches finally the desired amount $\delta_A$. That is, the desired focal length changes of the optical element 101 will have been given.

Figure 30B:
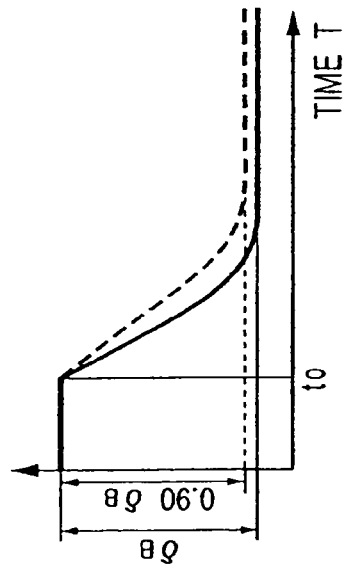

On the other hand, the result that the T side zoom switch 202 has been operated in the distinction in the step S1254 means that the voltage value applied to optical element 101 is caused to decrease deformation amount of the interface 124 of the optical element 101 so that the focal length of the optical element 101 is lengthened, and therefore in the step S1257, the direction in which finally applied voltage value is corrected as in the direction indicated in FIG. 30B. In addition, from the voltage value $V_B$ applied to the optical element 101, value $V_3$ which is obtained by adding the correction value to the finally applying voltage reference value $V_0$ to be given by the varied amount of focal length is decided as the corrected finally applied voltage value in the case where the T side zooming switch 201 has been operated, and therefore, $V_0$ as well as its correction amount is calculated in the step S1258.

Incidentally, the correction amount at this time may be decided by calculation, or may be a table value in the memory in the CPU 130 decided corresponding to the finally applied voltage reference value $V_0$.

Figure 30D:
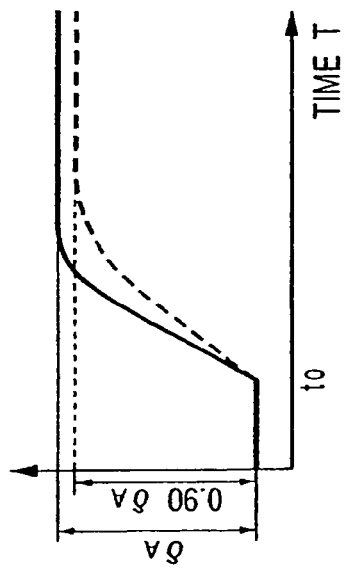

Thus, as shown in FIG. 30D, with $V_0$ being the finally applied voltage value, the interface 124 of the optical element 101 changes as shown in a broken line in accordance with lapse of time, and deformation takes place only to an optically unacceptable deformation amount, for example, $0.90\delta_B$ with respect to the desired deformation amount $\delta_B$ at the final stage, but with $V_3$ being the finally applied voltage value, the interface 124 changes as shown in a bold line in accordance with lapse of time, and deformation reaches finally the desired amount $\delta_B$.

That is, the desired focal length changes of the optical element 101 will have been given.

When calculation of the finally applied voltage value as well as its correction amount is completed in the step S1256 and in the step S1258, the process continues to the "temperature correction" subroutine in the step S1225.

At this time, with $V_2$ or $V_3$ being the finally applied voltage value, the temperature correction toward the finally applied voltage value described in the fourth embodiment is implemented, but detailed description thereof will be omitted.

As having been described so far, when, in the case where the optical element 101 is still in the midst of voltage application, an operation to alter its interface shape was executed, since the correction amounts and the correction directions are respectively set for the case in which alteration takes place from the wide-angle side and for the case in which alteration takes place from the telephotographic side even if the finally applied voltage value directed to the desired focal length is $V_0$, the finally applied voltage value will differ. Thus, even in the case where hysteresis has taken place in deformation of the interface 124 with respect to the voltage shift to be applied to the optical element 101, setup of appropriate correction amount as well as the correction direction can cancel its influence.

According to the above described fifth embodiment:

(1) Since the finally applied voltage value is respectively decided according to applied voltage shifted direction to the optical element, changes in optical characteristics of the optical element become possible without being influenced by hysteresis; and, (2) since the optical element can be controlled canceling influence of hysteresis, correct operation reflecting intention of the photographer becomes possible, and the like will be attained.

Sixth Embodiment

Figure 31:
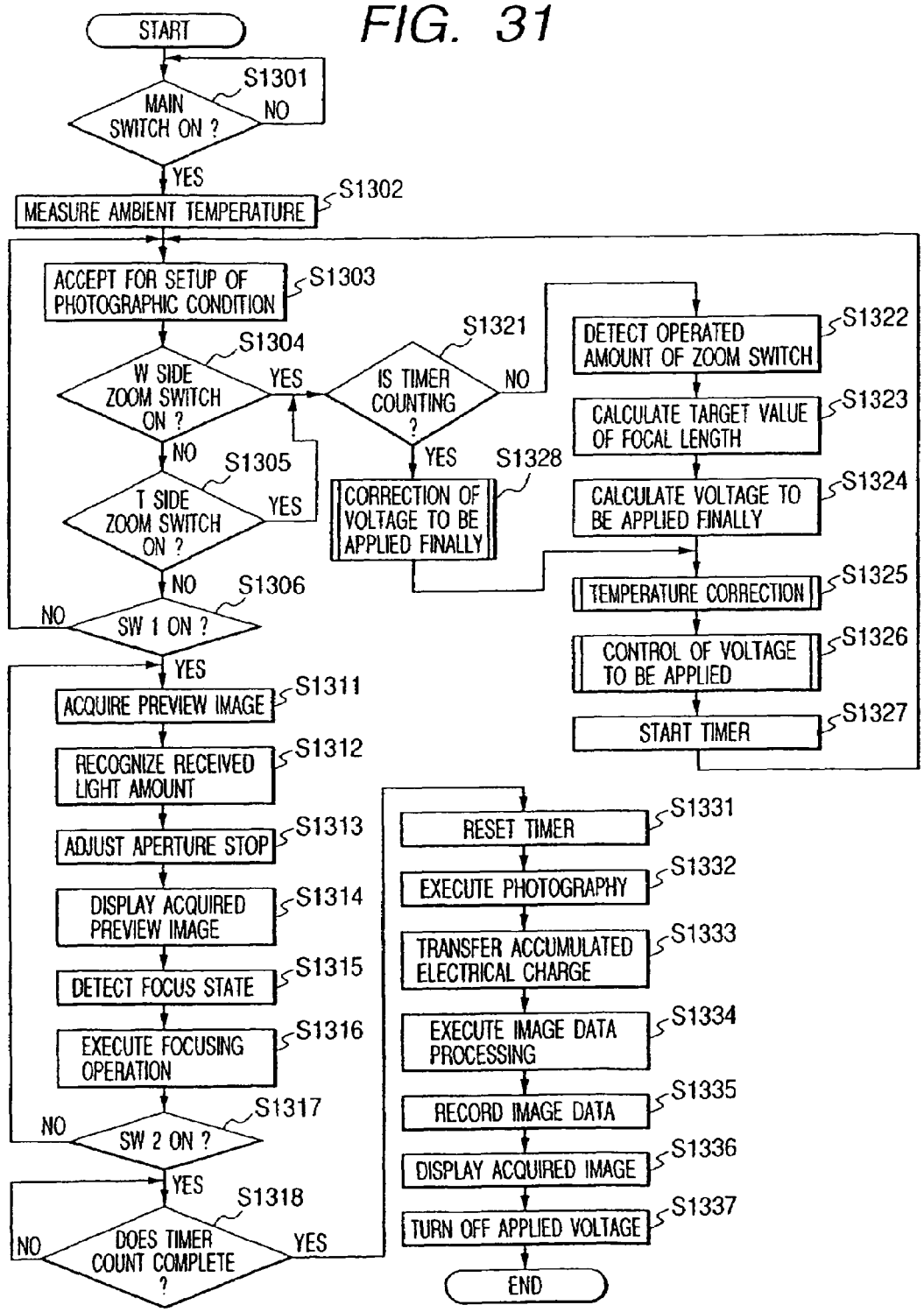
FIG. 31 is a main control flow diagram of an optical apparatus in the sixth embodiment of the present invention.
Figure 32:
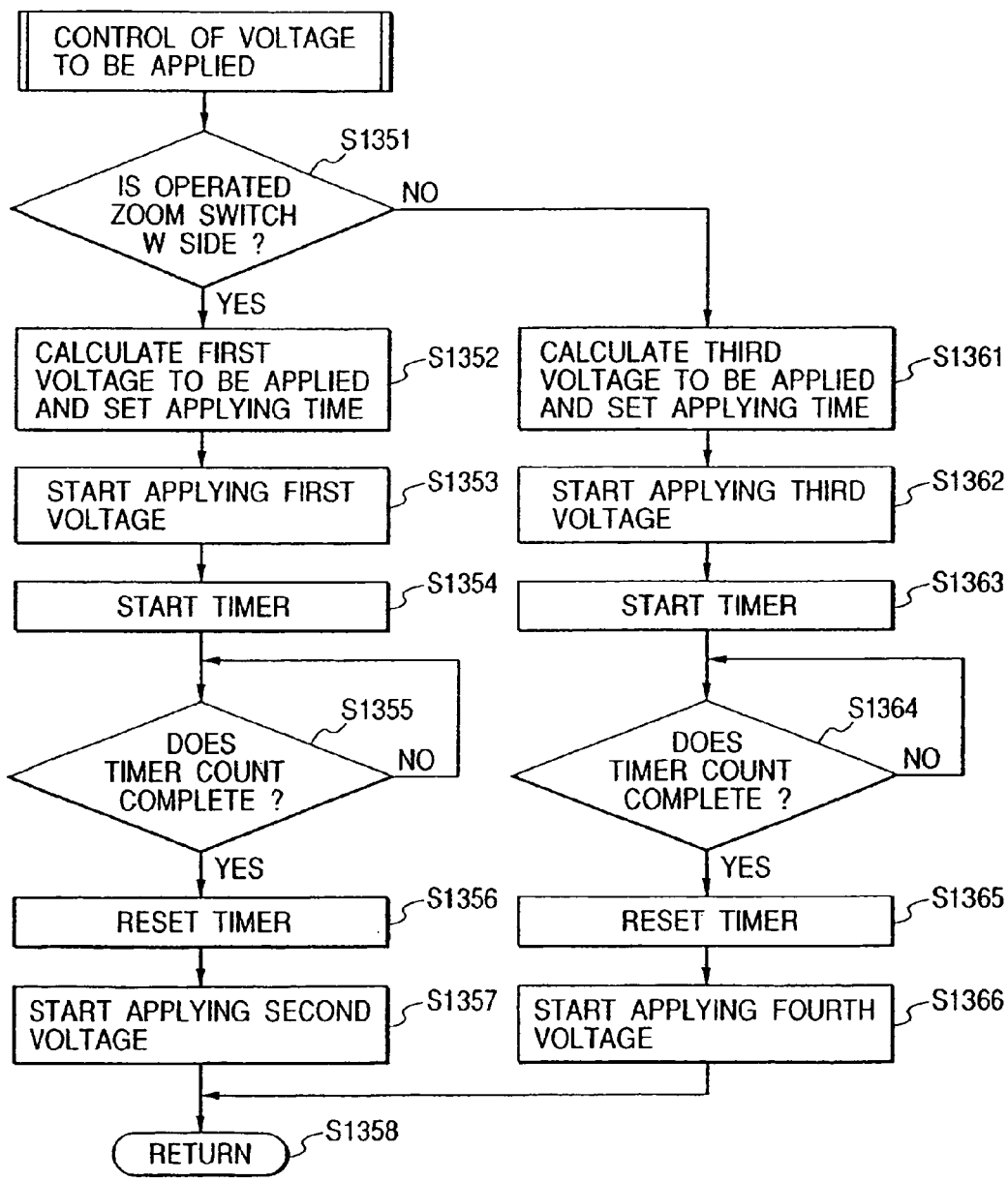
FIG. 32 is a sub-control flow diagram of an optical apparatus in the sixth embodiment of the present invention.

FIG. 31 and FIG. 32 are flow charts related to a sixth embodiment of the present invention. Incidentally, the optical apparatus of this embodiment shall be similar to the fifth embodiment.

FIG. 31 and FIG. 32 are control flow charts on the optical apparatus of this embodiment. The control flow on the optical apparatus will be described with reference to FIG. 31 and FIG. 32 as follows.

As for the common control flow between FIG. 28 being the control flow chart of the fifth embodiment and FIG. 31 being the control flow chart of this embodiment, descriptions thereon will be omitted. Here, the voltage application control method to the optical element 101 after temperature correction was implemented in the step S1325 (reference should be made to the following description on "control of voltage to be applied" of the step S1326) is different.

Figure 33B:
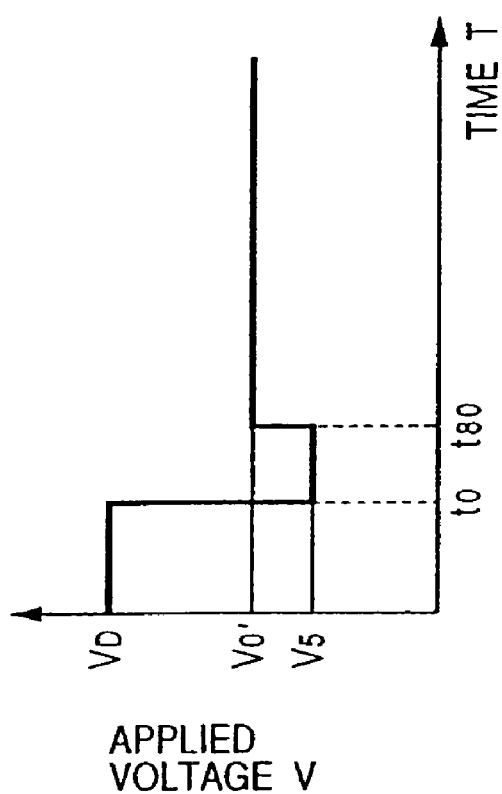
FIGS. 33A and 33B are diagrams describing applied voltage control in the sixth embodiment of the present invention respectively.
Figure 33A:
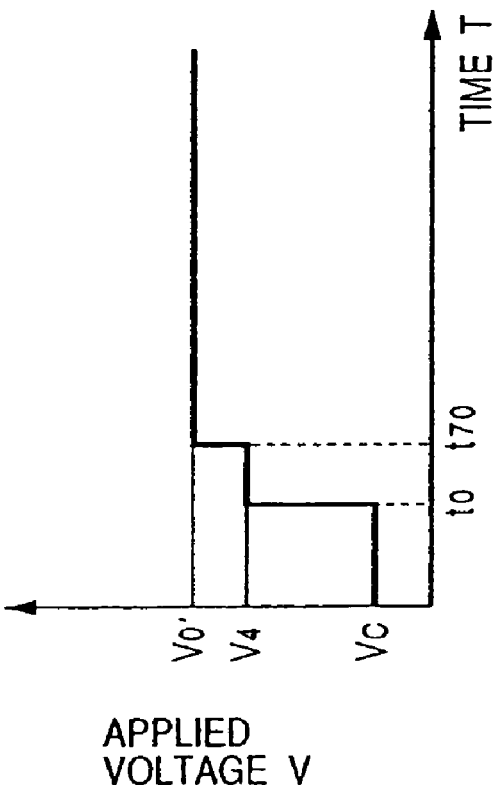

Under circumstances, in order to clear this issue, control of voltage to be applied will be described with reference to FIG. 32 and FIG. 33.

In the step S1351, distinction on whether or not the zoom switch operated by the photographer is the W side zoom switch 201 is implemented. In the case where the W side zoom switch 201 has been operated, the process continues to the step S1352, and in the case where the T side zoom switch 202 has been operated, the state goes forward to the step S1361.

In the step S1352, the first applying voltage value $V_4$ for the corrected finally applied voltage value $V_0'$ given in the step S1325 is calculated and its applying time $t_{70}$ is set. This first applying voltage value $V_4$ is given by for example the following equation:

$$\text{First applying voltage value } V_4 = \text{(corrected finally applied voltage value } V_0') - \text{(constant)} \quad \text{Equation (3-1)}$$

"Constant" and application time in this equation (3-1) may be those either read out from a memory stored in the CPU 130 or given by an equation performed on the correction finally applied voltage value $V_0'$.

Thus, after the first applying voltage value $V_4$ and its applying time $t_{70}$ are given, in the step S1353 applying the first applying voltage value $V_4$ is started, and concurrently therewith the timer 147' starts counting (S1354). After counting for the applying time set in the step S1352 is completed (S1355), counting of the timer 147' is completed and application of corrected finally applied voltage value $V_0'$ being the second applying voltage starts (S1356 and S1357). And the state returns to the step S1327.

In the step S1361, the third applying voltage value $V_5$ for the corrected finally applied voltage value $V_0'$ given in the step S1325 is calculated and its applying time $t_{80}$ is set. This third applying voltage value $V_5$ is given by for example the following equation:

$$\text{Third applying voltage value } V_5 = \text{(corrected finally applied voltage value } V_0') - \text{(constant)} \quad \text{Equation (3-2)}$$

"Constant" and application time $t_{80}$ in this equation (3-2) may be those either read out from a memory stored inside the CPU 130 or given by an equation performed on the correction finally applied voltage value $V_0'$.

Thus, after the third applying voltage value $V_5$ and its applying time $t_{80}$ are given, in the step S1362 applying the third applying voltage value $V_5$ is started, and concurrently therewith the timer 147' starts counting (S1363). After counting for the applying time set in the step S1361 is completed (S1364), counting of the timer 147 is completed and application of corrected finally applied voltage value $V_0'$ being the fourth applying voltage starts (S1365 and S1366). And the state returns to the step S1327.

As having been described so far, regardless of the direction of changes in focal length of the optical element 101, application of voltage lower than the corrected finally applied voltage value $V_0'$ for a predetermined time before the corrected finally applied voltage value $V_0'$ is applied to the optical element 101 will make the direction to which the interface 124 of the optical element 101 is made stable be the direction to which the radius of curvature of the interface 124 is made small. That is, even in the case where hysteresis has taken place in deformation of the optical element 101, with voltage applying direction toward the optical element 101 at the time when the interface 124 is made stable being constant, consideration on only one direction of the influence of hysteresis will become necessary and its correction will become easy.

Incidentally, in the above-described description, voltage applying direction toward the optical element 101 at the time when the interface is made stable should be the voltage value increasing direction, but without being limited hereto, adoption of the voltage value increasing direction can direct the influence of hysteresis to a direction so that similar effects can be attained.

Accordingly, to the above-described sixth embodiment, voltage application is made in a constant direction when the interface of the optical element is made stable so that it will become possible to implement correction on the portion influenced by hysteresis of the optical element easily.

Seventh Embodiment

The above-described fourth embodiment and sixth embodiment were modes of embodiment in the case where the optical element was incorporated into the photo-taking optical system of the optical apparatus. In contrast, the seventh embodiment described as follows is an example of configuration in the case where the optical element was incorporated into the optical system other than the above described one.

Figure 34:
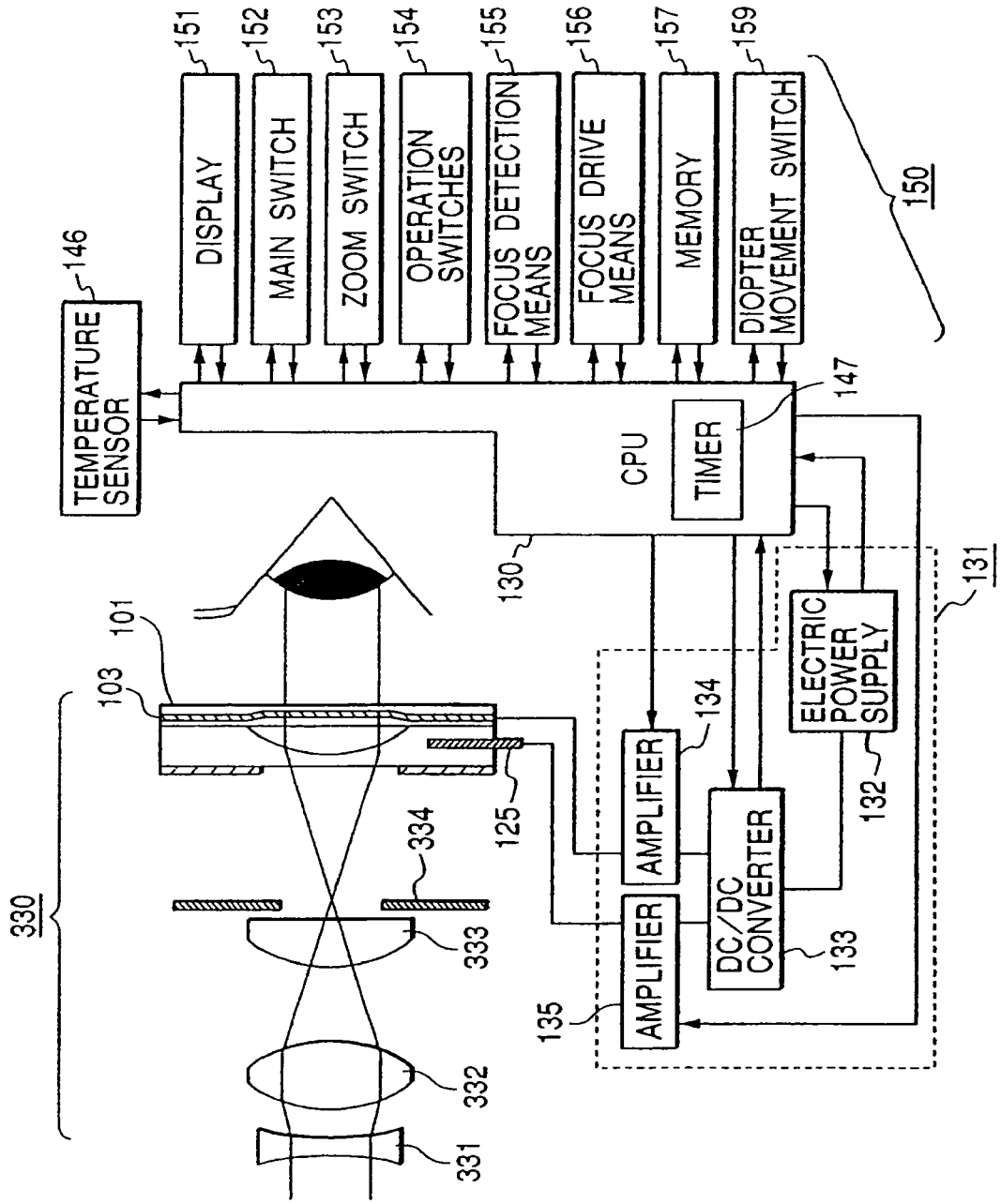
FIG. 34 is a block diagram of an optical apparatus in the seventh embodiment of the present invention.
Figure 35:
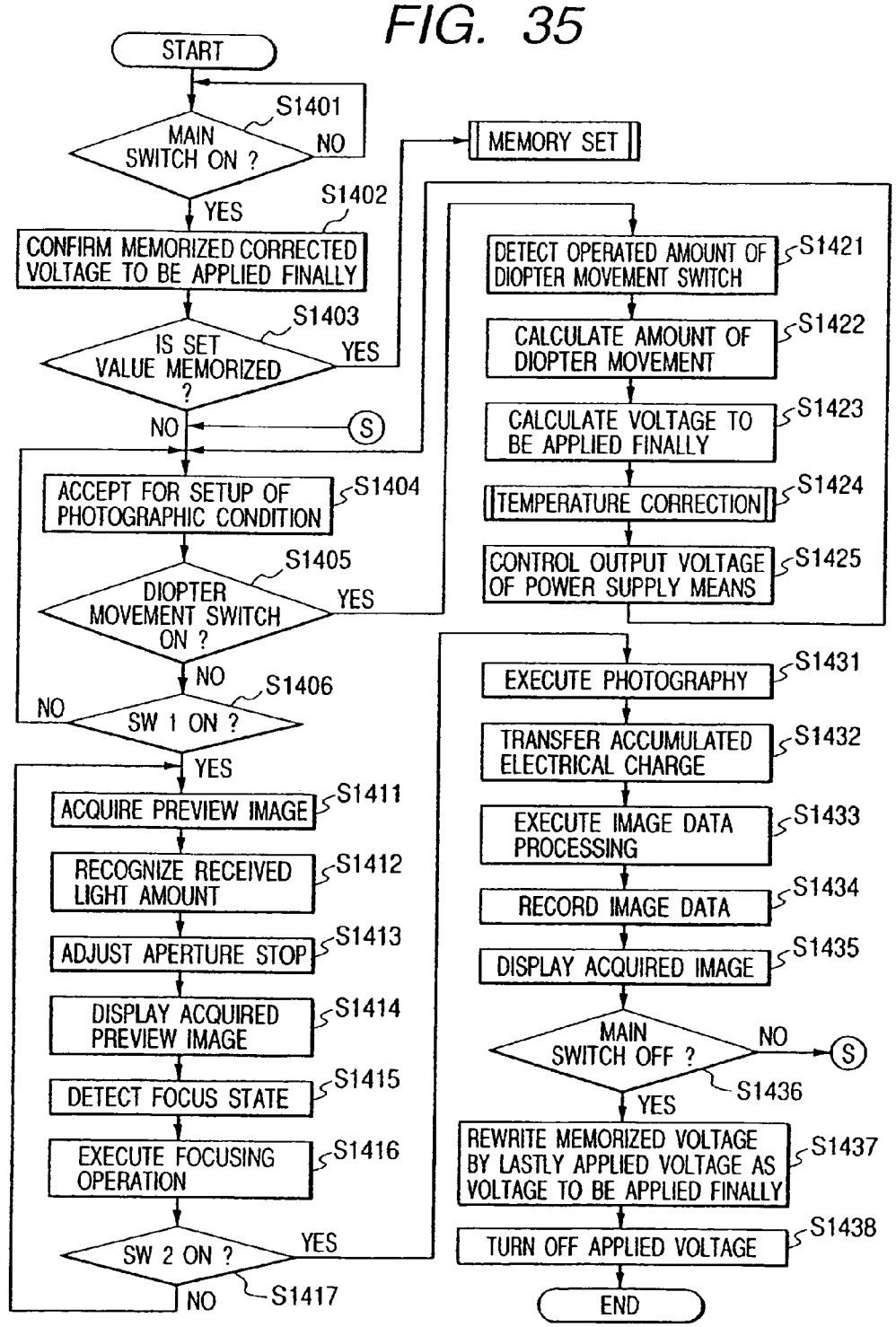
FIG. 35 is a main control flow diagram of an optical apparatus in the seventh embodiment of the present invention.
Figure 36:
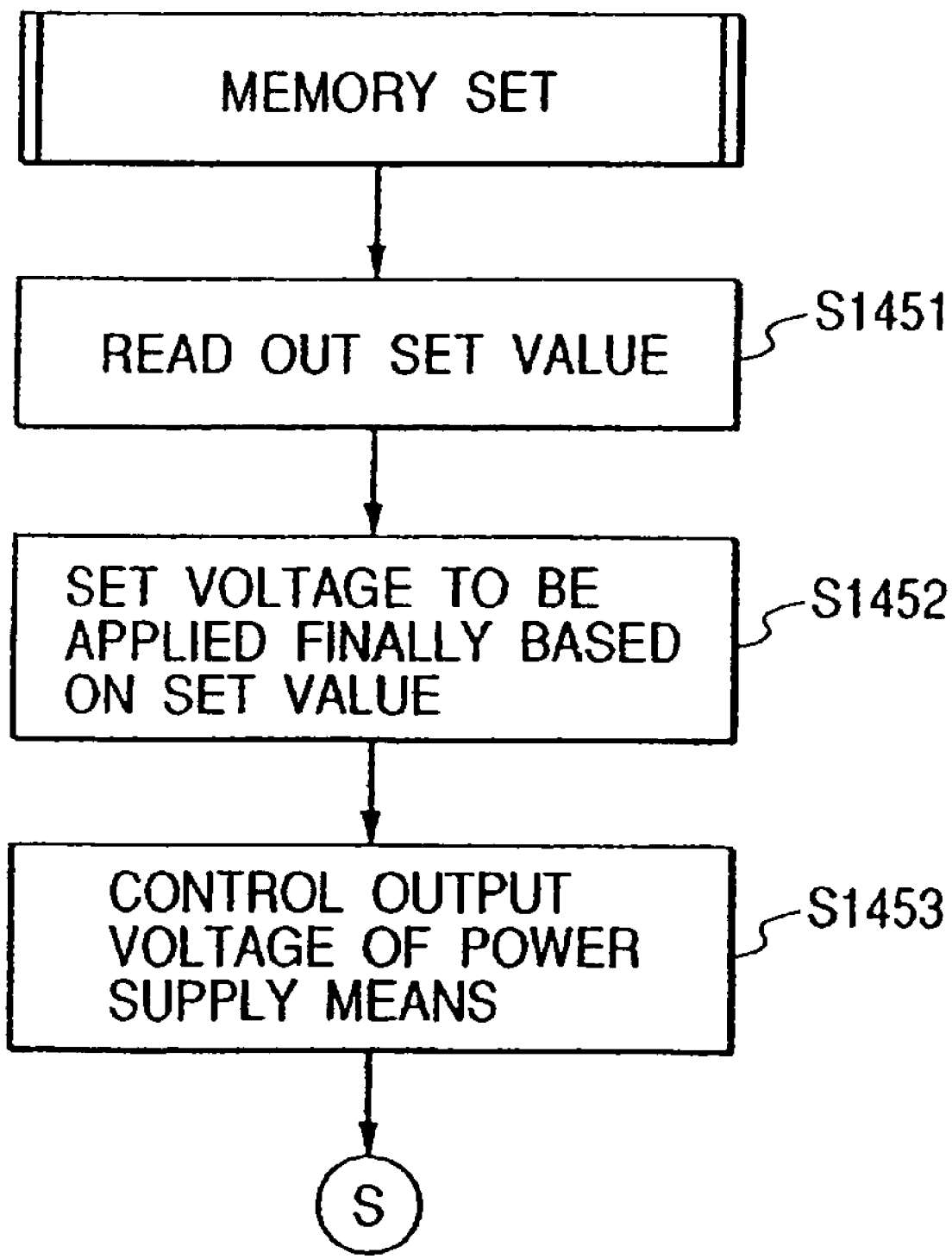
FIG. 36 is a sub-control flow diagram of an optical apparatus in the seventh embodiment of the present invention.

FIG. 34 through FIG. 36 are drawings related to the seventh embodiment of the present invention.

FIG. 34 is the one when the optical element 101 was incorporated into the observatory optical system 330 of the optical apparatus. As for those similar to the ones in the fourth embodiment and the fifth embodiment, description thereon will be omitted.

In the above-described drawing, the optical apparatus 150 has an eyesight adjustment switch 159. This eyesight adjustment switch 159 may be either a lever-type one or push-button-type one, and with operation thereof, the CPU 130 controls the power supply means to alter the applying voltage to the optical element 101. That is, operation of the eyesight adjustment switch 159 changes focal length of the optical element 101 so that the focus of the observed image can be matched with the diopter of the photographer.

Reference numeral 330 denotes a observatory optical system comprising a plurality of lens groups and are configured by first lens group 331, second lens group 332, third lens group 333, vision frame 334 disposed in the approximate focal position of this optical system, and the optical element 101. Forward and backward movement in the optical axis of the second lens group 332 implements zooming. In addition, the third lens group 333 is a relay lens group without movements. Thereby, the observer can observe the observatory image formed in the focal position through the optical element 101.

FIG. 35 and FIG. 36 are control flow charts on the CPU 130 which the optical apparatus 150 having been shown in FIG. 34 has. The control flow of the optical apparatus 150 will be described with reference to FIG. 35 through FIG. 36 as follows.

In the step S1401, distinction on whether or not on-operation of the main switch 152 is executed is implemented and when the on-operation is not yet executed, a waiting mode state in which operation of various switches is waited for remains. On the other hand, in the step S1401, when on-switch operation of the main switch 152 is distinguished, the waiting mode is overridden and the process continues to the subsequent step S1402.

In the step S1402, the corrected finally applied voltage value $V_0'$ of the optical element 101 stored in the CPU 130 is confirmed. Incidentally, in the case where the optical apparatus 150 is used for the first time, the corrected finally applied voltage value $V_0'=0V$ is set in the CPU 130.

In the step S1403, based on the result of the above-described step S1402, in the case where there is a set value in the CPU 130, the process continues to the subroutine of "memory set" while in the case where there is no memory value the process continues to the step S1404. In the case where there is a set value in the CPU 130, that set value is read out again (S1451), based on that set value the corrected finally applied voltage value $V_0'$ to the optical element 101 is set (S1452), and thereafter the power supply means 144 is controlled to apply the voltage to the optical element 101, and the state goes back to the original state (S1453).

In the step S1404, setup of photographic conditions by a photographer is accepted. For example, setup such as setup on exposure control mode (shutter priority AE and program AE, etc.), image quality mode (size in the number of recording pixels and size of image compression rate, etc.), and the electronic flash mode (compulsory flash and flash prohibition, etc.), etc. is implemented.

In the step S1405, distinction on whether or not the eyesight adjustment switch 159 has been operated by the photographer is implemented. In the case no on-operation has been executed, the process continues to the step S1406. Here, in the case where the eyesight adjustment switch 159 has been operated, the process continues to the step S1421.

In the step S1421, the operation quantity of the eyesight adjustment switch 159 (operation direction and on-time period, etc.) is detected, and the corresponding eyesight adjustment amount is calculated based on that operate amount (S1422). As per that calculation outcome, the finally applied voltage value $V_0$ to the optical element 101 is determined (S1423), "temperature correction" described in the fourth embodiment is implemented (S1424), and thereafter the output voltage of the power supply means 131 is controlled so that the corrected finally applied voltage value $V_0'$ is applied to the optical element 101 (S1425). And the state goes back to the step S1404. That is, in the case where operation of the eyesight adjustment switch 159 goes on, the step S1404 to the step S1425 are repeatedly executed so that the process continues to the step S1406 at the time point when on-operation of the eyesight adjustment switch 159 is over.

In the step S1406, distinction on whether or not on-operation on the pre-photo-taking switch (indicated as SW1 in the flow chart in FIG. 35) among the operation switches 154 has been executed by the photographer is implemented. In the case where the on-operation is not executed, the state returns to the step S1404 so that acceptance for setup of photographic conditions and distinguishing on operation of eyesight adjustment switch 159 is repeated. In addition, once the pre-photo-taking switch is determined to have been operated on in the step S1406, the process continues to the step S1411.

Since the step S1411 to the step S1417 are similar to the step S1111 to the step S1117 in the fourth embodiment, and the step S1431 to the step S1435 are similar to the step S1132 to the step S1136 in the fourth embodiment, descriptions thereon will be omitted.

After the photographed image in the step S1435 is displayed in the display 151, in the step S1436 distinction on whether or not the off-operation of the main switch 152 is implemented. In the case where the off-operation is not yet implemented on the main switch 152, the process continues to the step 1404, and a series of photo-taking operations from S1404 to S1435 are repeatedly implemented.

In addition, in the case the off-operation was implemented on the main switch 152 in the step S1436, the process continues to the step S1437 to rewrite the corrected finally applied voltage value $V_0'$ to the optical element 101 stored in the CPU 130 to the corrected finally applied voltage value $V_0'$ immediately prior to the off-operation of the main switch 152, and thereafter the process continues to the step S1438 to stop voltage application to the optical element 101 so that a series of photo-taking operations come to an end.

As described so far, also when the optical element was incorporated in the observatory optical system, it will become possible to control the finally applied voltage value and the waveform pattern of applying voltage to the optical element corresponding with temperature. That is, the optical element may be incorporated into any optical system so that similar effects can be attained.

Eighth Embodiment

Figure 37:
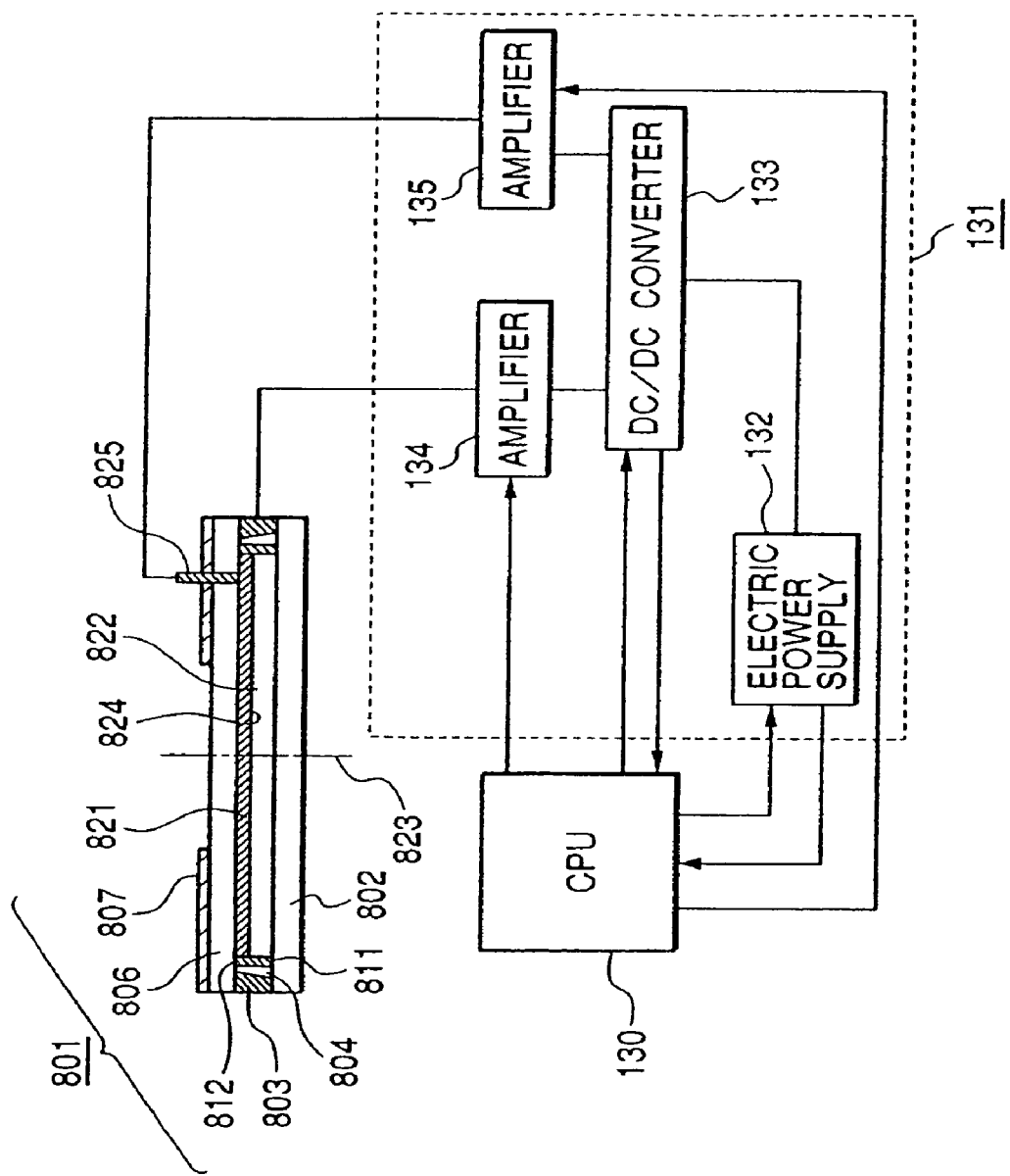
FIG. 37 is a block diagram of an optical element in the eighth embodiment of the present invention.
Figure 38A:
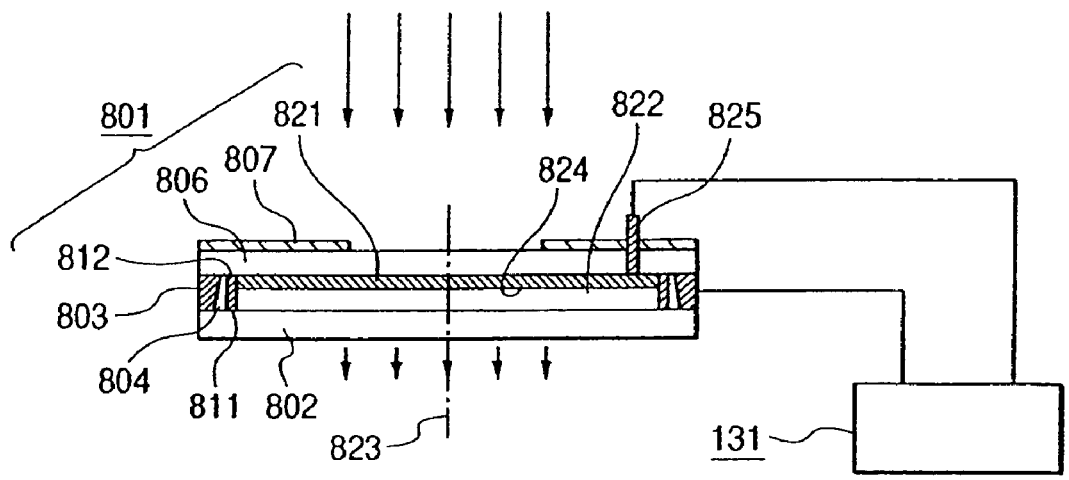
FIGS. 38A and 38B are diagrams describing operation on applying voltage to an optical element in the eighth embodiment of the present invention respectively.
Figure 38B:
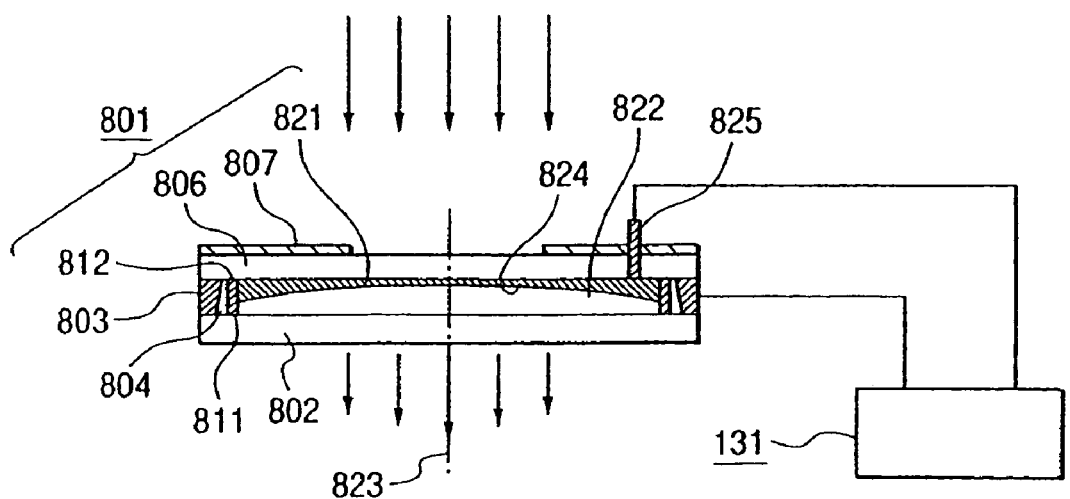

FIG. 37 through FIG. 40 are drawings related to the eighth embodiment of the present invention. Since configurations in FIGS. 37, 38 and 39 are the same as those in FIGS. 16, 17 and 18, descriptions will be omitted.

Figure 40:
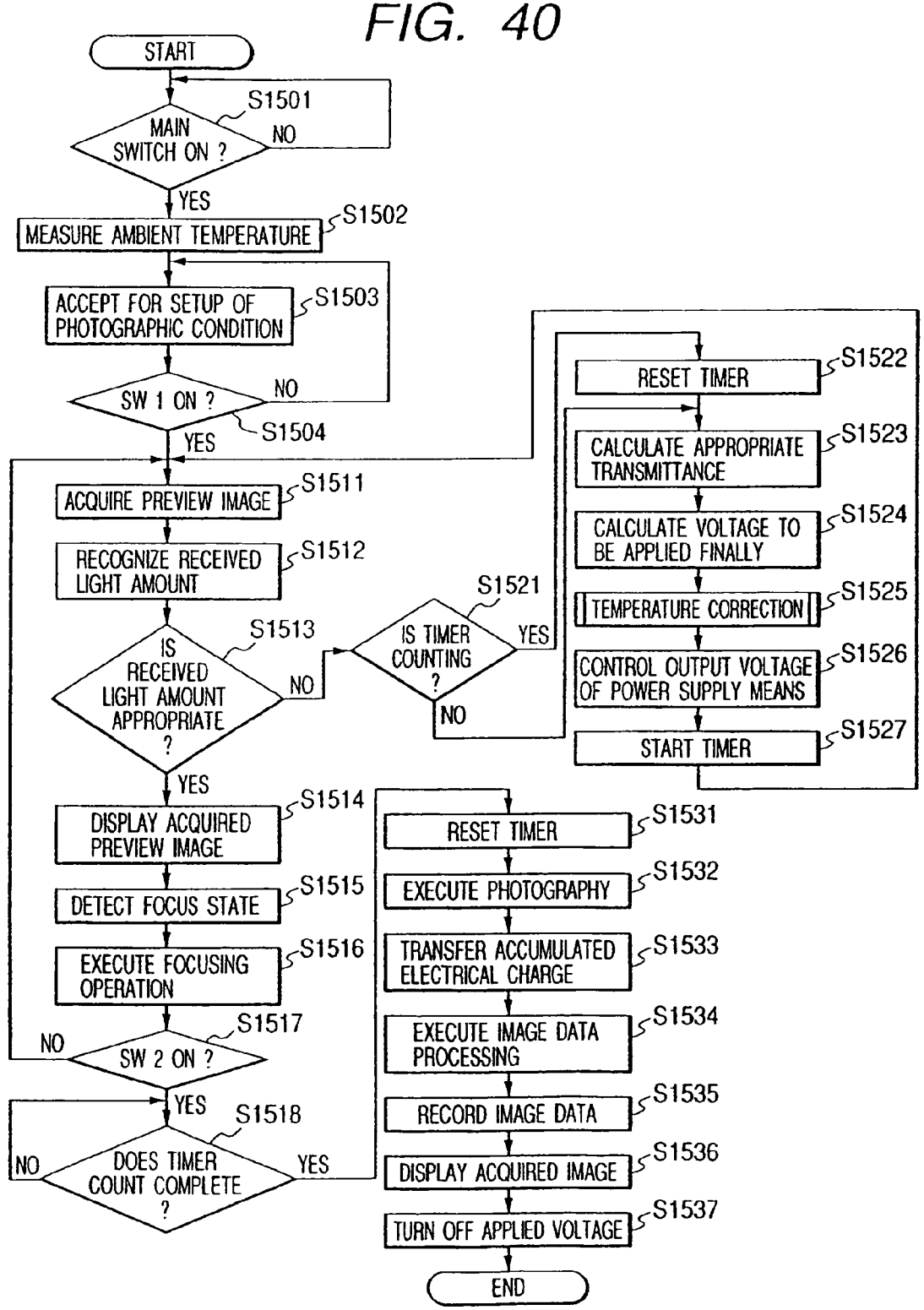
FIG. 40 is a block diagram of an optical apparatus in the eighth embodiment of the present invention.

FIG. 40 is a control flow chart on the CPU 130 which the optical apparatus 150 having been shown in FIG. 39 has. The control flow of the optical apparatus 150 will be described with reference to FIG. 39 and FIG. 40 as follows. Incidentally, as for the control flow similar to that in the fourth embodiment, detailed descriptions thereon will be omitted.

In the step S1501, distinction on whether or not on-operation of the main switch 152 is executed by the photographer is implemented and when the on-operation is not yet executed, the state remains in the step S1501. In the step S1501, when on-switch operation of the main switch 152 is distinguished, the CPU 130 gets out of the sleep state so as to execute the step S1502 and onward.

In the step S1502, as in the fourth embodiment, the ambient temperature where the optical apparatus 150 is disposed, that is, the periphery air temperature of the optical apparatus 150 is measured with the temperature sensor 146.

In the step S1503, setup of photographic conditions by a photographer is accepted.

In the step S1504, distinction on whether or not on-operation on the pre-photo-taking switch (indicated as SW1 in the flow chart) has been executed by the photographer is implemented. In the case where the on-operation is not executed, the state returns to S1503 so that distinguishing on acceptance for setup of photographic conditions is repeated.

Once the pre-photo-taking switch is determined to have been operated on in the step S1504, the process continues to the step S1511.

Since the step S1511 as well as the step S1512 are similar to those in the fourth embodiment, description thereon will be omitted.

In the step S1513, distinction on whether or not the received light amount judged in the above-described step S1512 is appropriate is implemented. In addition, when in the present step its appropriateness is recognized, the process continues to the step S1514.

On the other hand, when in the step S1513 it is distinguished that the received light amount judged in the above described step S1512 is not appropriate, the state leaps to the step S1521. Since the step S1521 as well as the step S1522 are similar to those in the fourth embodiment, description thereon will be omitted. In the step S1523, the actual received light amount is compared with the appropriate received light amount so as to calculate the appropriate transmittance of the optical element 801 in the photo-taking optical system 430. In the step S1524 the control voltage (finally applied voltage value $V_0$) is calculated in order to acquire the appropriate transmittance calculated in the above-described step S1523. In particular, the ROM of the CPU 130 stores the relationship on the transmittance toward the applied voltage in the form of look-up table, the finally applied voltage value $V_0$ with respect to the transmittance calculated in the step S1523 is acquired with reference to the table.

In the step S1525, temperature correction with respect to the finally applied voltage value $V_0$ is implemented as in the fourth embodiment while in the step S1526 the power supply means 131 are controlled with the finally applying voltage reference value and applying waveform pattern to be applied to the optical element 801 decided in the subroutine of the above-described "temperature correction" so that a voltage is applied to the optical element 801. Concurrently therewith, counting of the timer 147 is started (S1527). After the step S1527 is executed, the state goes back to the step S1511, and the steps from acquisition of the image signals of the step S1511 to the step S1527 are repeated until the incident light amount into the photo-taking means 144 becomes appropriate. And when the incident light amount into the photo-taking means 144 become appropriate, the process continues from the step S1513 to the step S1514.

Since the step S1514 to the step S1537 are similar to those in the fourth and the fifth embodiments, description thereon will be omitted.

Ninth Embodiment

Figure 41:
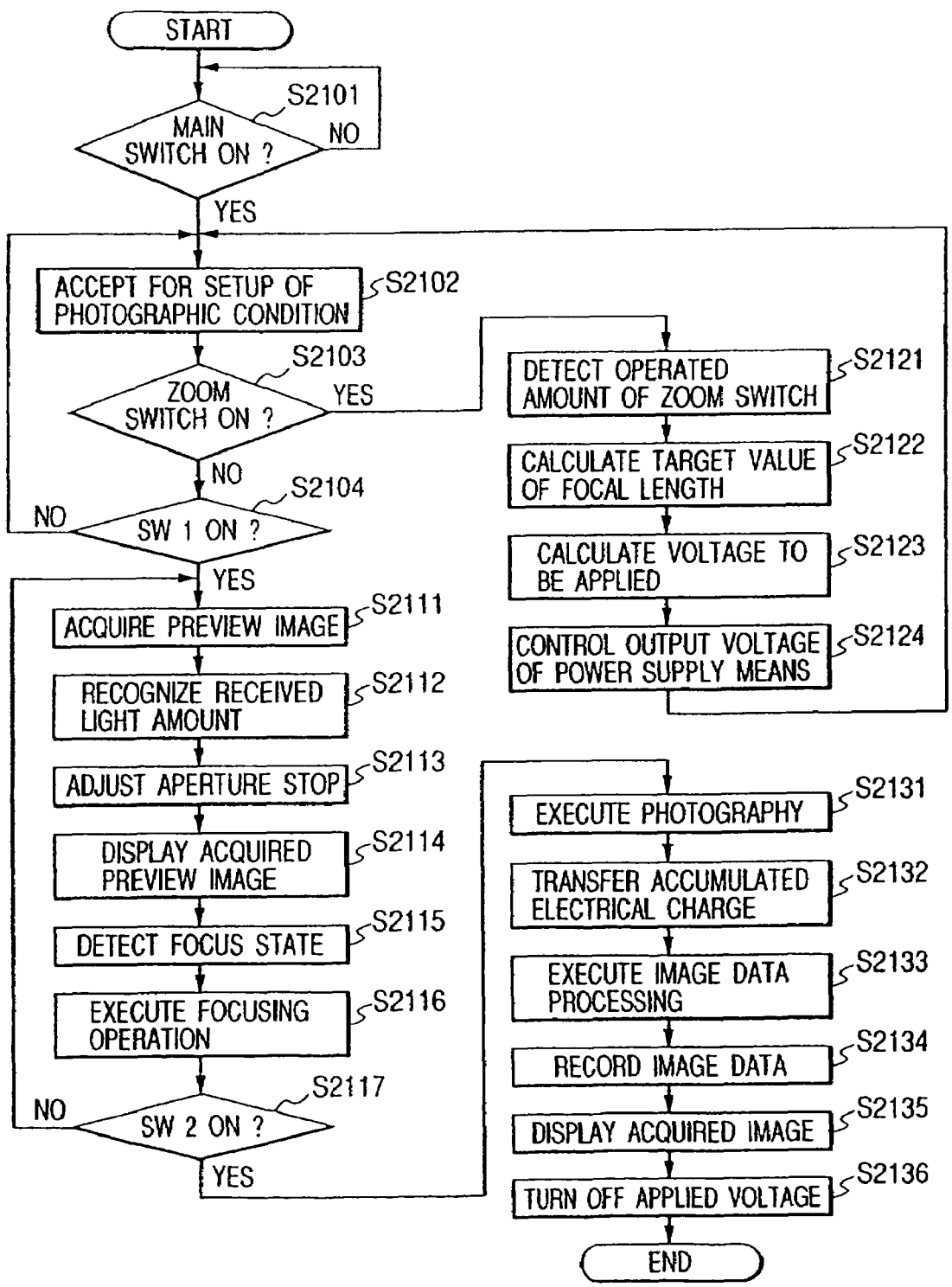
FIG. 41 is a control flow diagram of an optical apparatus in the ninth embodiment of the present invention.

FIG. 41 shows another control flow chart when the above-described optical element 101 (shown in FIG. 2) was applied to the optical apparatus 150 (in FIG. 9). Since this flow has the step 2123 deciding the applying voltage although the step 123 decides the duty ratio in FIG. 10, representing only difference, descriptions on other points will be omitted.

Tenth Embodiment

The above-described ninth embodiment was a mode of embodiment in which immediately after completion of photo-taking operation power supply to the optical element is switched off. Here, the case where the photographer can set the time for putting off power supply to the optical element will be described as the tenth embodiment of the present invention as follows with reference to FIG. 42 to FIG. 44.

Figure 42:
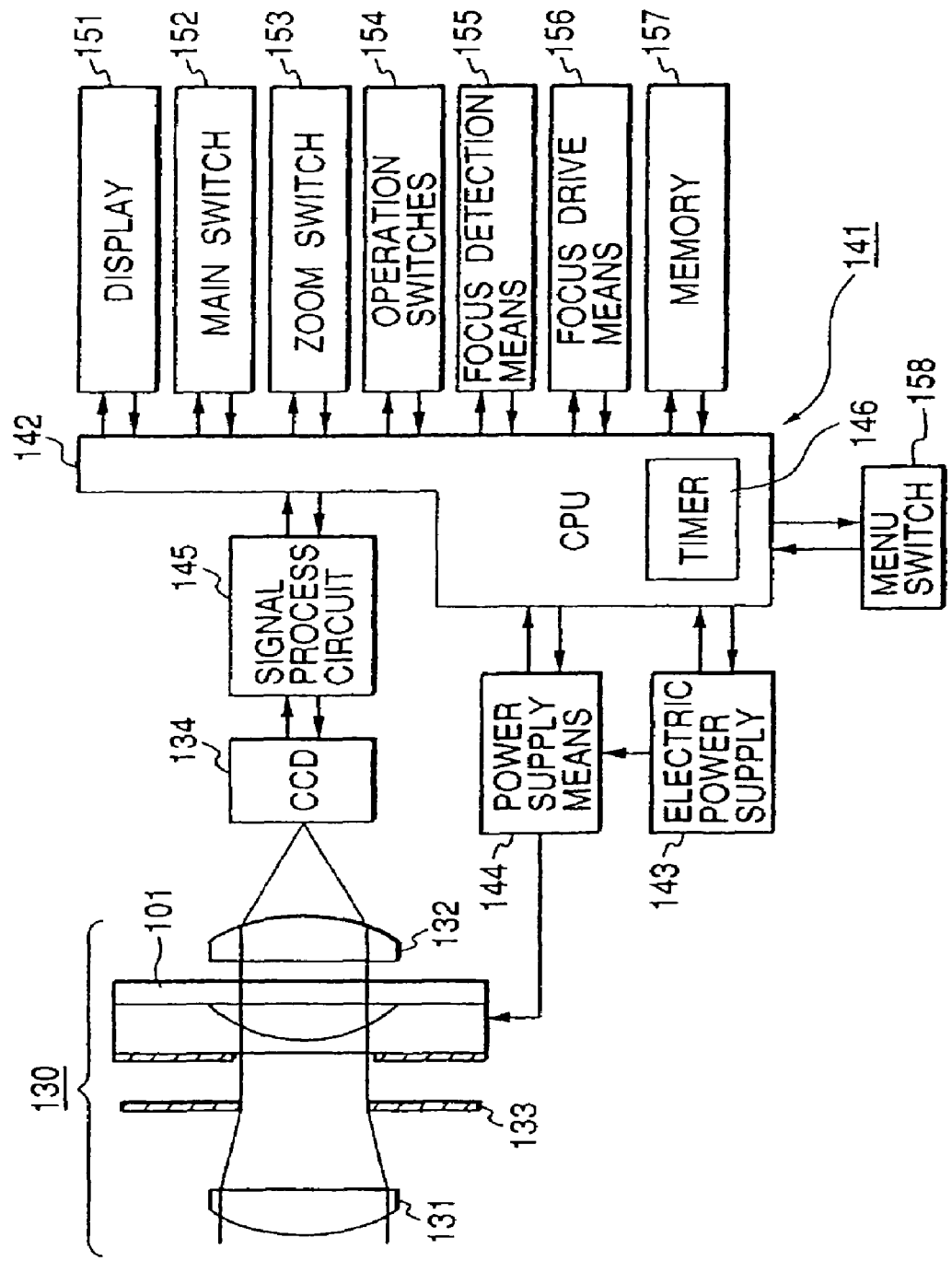
FIG. 42 is a block diagram of an optical apparatus in the tenth embodiment of the present invention.

FIG. 42 is the one in which the optical element 101 was applied to an optical apparatus equivalent to a digital still camera as in the ninth embodiment. As for those similar to the ones in the above-described ninth embodiment, description thereon will be omitted.

In FIG. 42, the CPU 142 has a timer 146 in its interior. The timer 146 is for counting set time as described later. The optical apparatus 141 has a menu switch 158. This menu switch 158 is to implement respective settings such as brightness adjustment of the display 151 and setting on photo-taking date and time, etc. and has among those setting items an item to set the time for power supply to the optical element 101 after completion of photography. In addition, as for those setting items, at least two kinds of setting, for example, the setting to put off power supply immediately after completion of photography and the setting to put off power supply in ten seconds after completion of photography shall be feasible.

Figure 43:
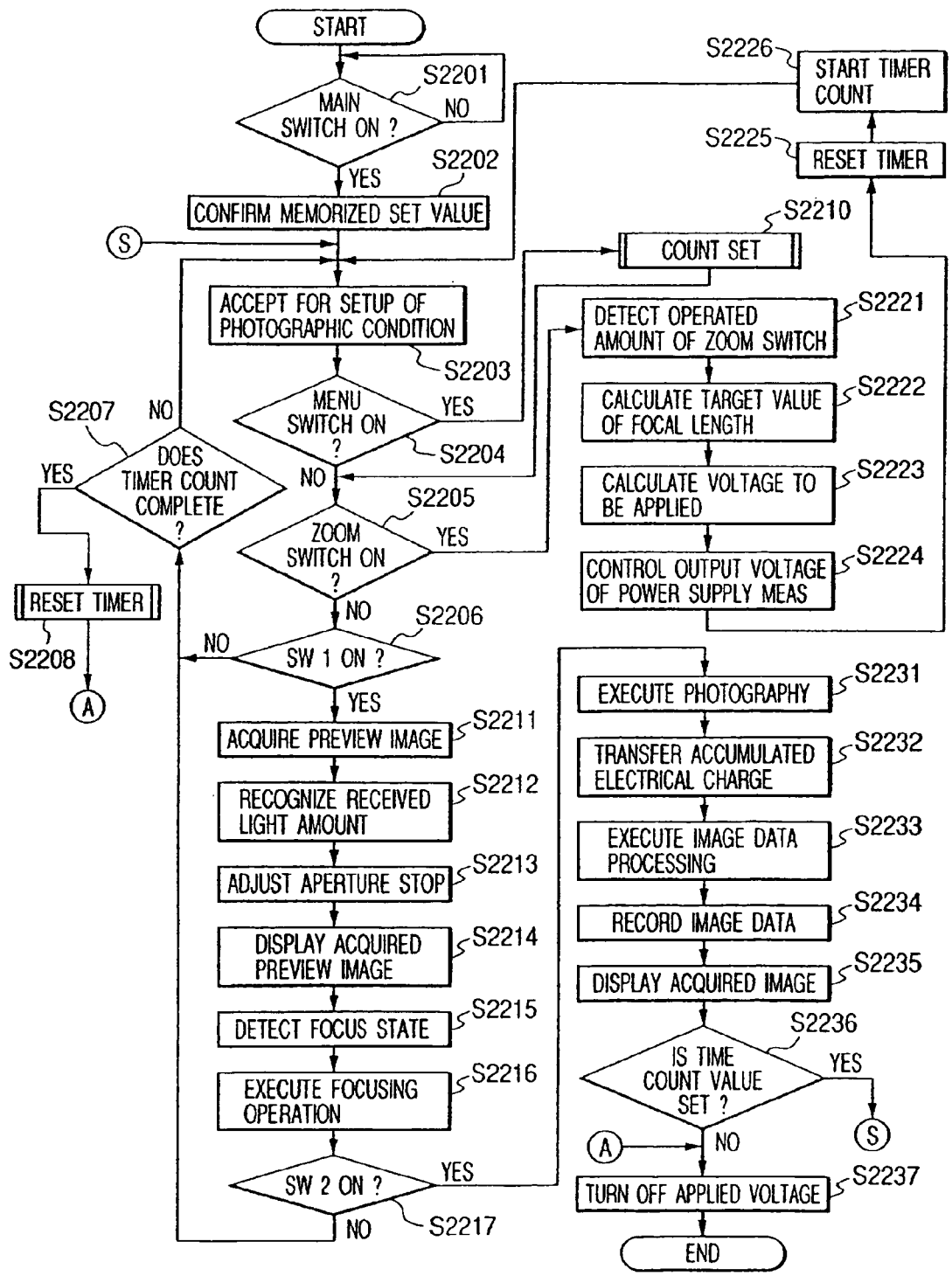
FIG. 43 is a flowchart showing main control of an optical apparatus in the tenth embodiment of the present invention.
Figure 44:
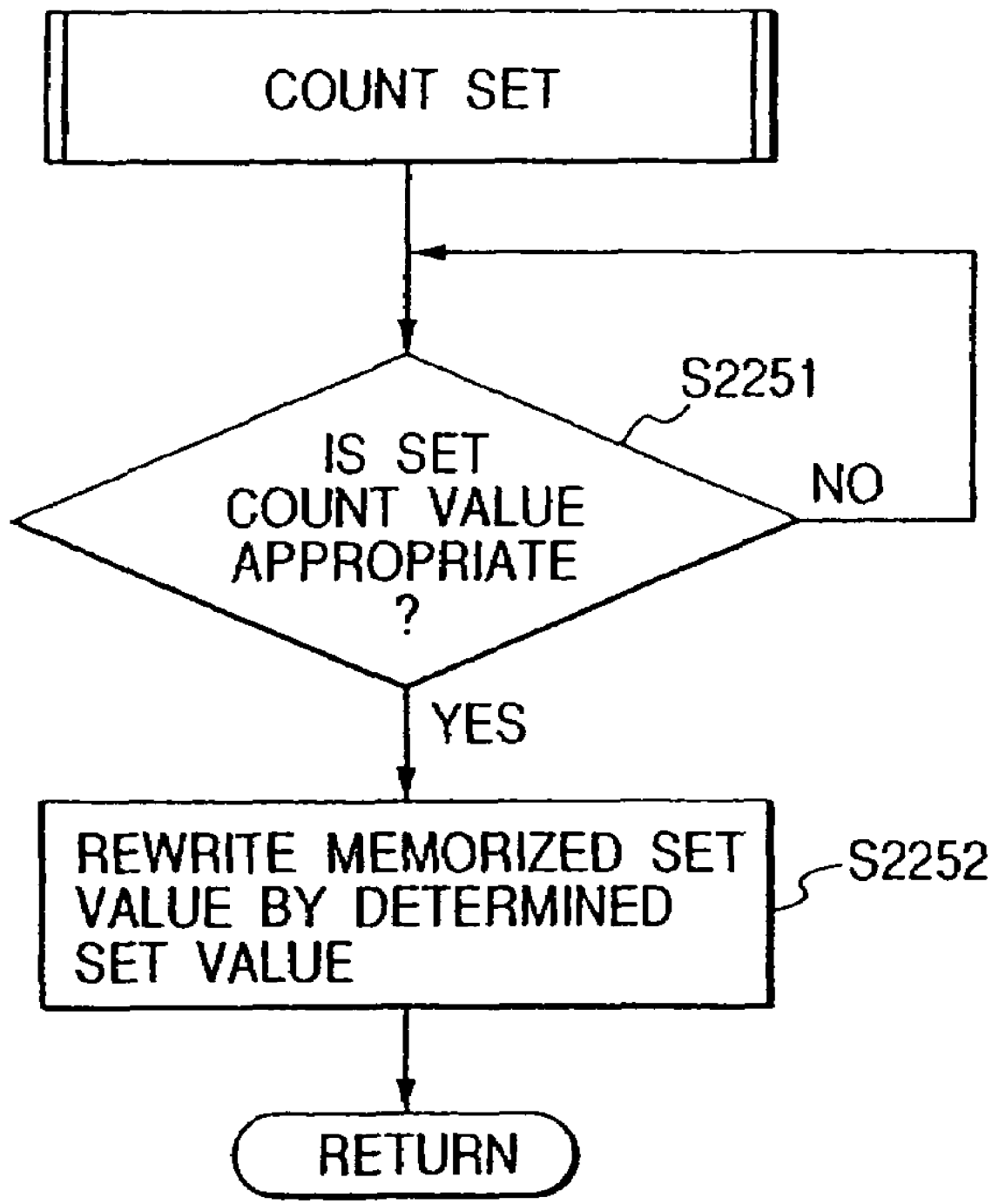
FIG. 44 is a flowchart showing a subroutine of an optical apparatus in the tenth embodiment of the present invention.

FIG. 43 and FIG. 44 are control flow charts on the CPU 142 which the optical apparatus 141 having been shown in FIG. 42 has, which will be described with reference to FIG. 42 to FIG. 44 as follows.

At first, in the step S2201, distinction on whether or not on-operation of the main switch 152 is executed is implemented and when the on-operation is not yet executed, the state enters a waiting mode state in which operation of various switches is waited for. Thereafter, when on-switch operation of the main switch 152 is distinguished, the waiting mode is overridden and the process continues to the step S2202. In addition, in this step S2202 set values of the timer 146 stored in the CPU 142 is confirmed. Incidentally, in the case where the optical apparatus 141 is used for the first time, a certain set value (for example counted value=0) is stored in the CPU 142.

In the next step S2203, setup of photographic conditions by a photographer is accepted. For example, setup such as setup on exposure control mode (shutter priority AE and program AE, etc.), image quality mode (size in the number of recording pixels and size of image compression rate, etc.), and the electronic flash mode (compulsory flash and flash prohibition, etc.), etc. is implemented. In addition, in the next step S2204 it is judged whether or not the menu switch 158 has been operated by the photographer, and in the case no on-operation has been executed, the process continues to the step S2205. In addition in the case where the menu switch 158 has been operated, the process continues to the subroutine of the step S2210. This sub-routine will be described with reference to FIG. 44 as follows.

In the step S2251, in FIG. 44 it is judged to which the count value of the timer 146 is set by the menu switch 158, and in the next step S2252 that setup value is replaced with the setup value stored in the CPU 142, and thereafter the process continues to the step S2205 in FIG. 43.

Incidentally, operation of the menu switch 158 implements brightness adjustment of the display 151 and setting on photo-taking date and time, etc., but since the flow is similar to the above-described one, description thereon will be omitted here.

Back to FIG. 43, in the step S2205 it is judged whether or not the zoom switch 153 was operated by the photographer, and in the case no on-operation has been implemented, the process continues to the step S2206. In addition, in the case where the zoom switch 153 is operated, the process continues to the step S2221.

Since operations from the step S2221 to the step S2224 are similar to the above described ones, descriptions thereon will be omitted.

In the next step S2224, a voltage is applied to the optical element 101, and thereafter, in the next step S2225, in the case where the timer 146 has started counting, that count value is reset, and in the subsequent step S2226 the timer 146 is made to start counting again so that the state goes back to the step S2203.

That is, in the case where operation of the zoom switch 153 goes on, the step S2205 to the step S2226 are repeatedly executed so that the process continues to the step S2206 at the time point when on-operation of the zoom switch 153 is over. That is, while the zoom operation is going on, the timer is not practically caused to start counting.

In the step S2206, it is judged whether or not on-operation on the pre-photo-taking switch among the operation switches 154 has been executed by the photographer. In the case no on-operation has been executed, the process continues to the step S2207 and when the timer 146 has started counting it is judged here whether or not the value counting is completed, or the state returns to the step S2203 in the case where the counting is not completed so that acceptance for setup of photographic conditions and judgment on operation of the menu switch 158 and the zoom switch 153 are repeated. On the other hand, in the case where value counting of the timer 146 is completed in the step S2207, the process continues to the step S2208, and after the counted value of the timer 146 is reset, the process continues to the step S2237 (the flow thereafter will be described later).

In addition, in the case where in the above-described step S2206 it is judged that on-operation on the pre-photo-taking switch has been executed, the process continues to the step S2211.

In the case where the on-operation of the photo-taking switch is executed in the step S2217, since the step S2211 to the step S2234 are similar to those in the above-described ninth embodiment, descriptions thereon will be omitted.

When the process continues to the next step S2235, the photographed image is displayed in the display 151 here, and in the next step S2236 it is judged whether or not the counting value of the timer 146 is set. In the case where the counting value of the timer 146 is not set, the process continues to the step S2237 to control the power supply means 144 and to switch off the voltage application to the optical element 101 so that a series of photo-taking operation comes to an end.

In addition, in the case where in the above-described step S2236 a counting value of the timer 146 is set, the state returns to the step S2203 again.

Hereafter, in the case where various kinds of switches are not operated during counting, until that counting value is completed, each step of step sequence of S2203 to S2204 to S2205 to S2206 to S2207 to S2203 is repeated, but when the counting is completed, the process continues from the step S2207 to the step S2208, the counting value of the above-described timer 146 is reset, and the process continues to the step S2237 to switch off the voltage application to the optical element 101 so that a series of photo-taking operation comes to an end. Incidentally, when on-operation on the photo-taking switch is not executed in the above-described step S2217, the process continues to the step S2207. Since configuration is made like this, voltage application to the optical element 101 is suspended automatically when photography is not implemented for a set time after zoom operation is executed. In addition, when photo-taking operation is executed within the set time, and photography is completed, but the set time has not yet lapsed, suspension of voltage application is executed after the set time has lapsed thereafter.

According to the above described tenth embodiment, effects as described below will be attained:

1) Regardless of the photo-taking operation, in the case where operation on various operation switch group is not executed, the voltage application to the optical element 101 can be switched off, and therefore power saving of the optical apparatus in its entirety will become feasible.

2) Since the photographer himself/herself can set the voltage applying time to the optical element 101, power saving operation reflecting the photo-taking situation and the photographer's intention, etc. will become possible.

Eleventh Embodiment

The tenth embodiment was a mode of embodiment in the case where the optical element was applied to focal length alterations of various optical systems of the optical apparatus. Here, the case of application as an optical filter previously applied by the present applicant will be described as the eleventh embodiment of the embodiments in the present invention with reference to FIGS. 45A to 45C through FIG. 48.

Figure 45A:
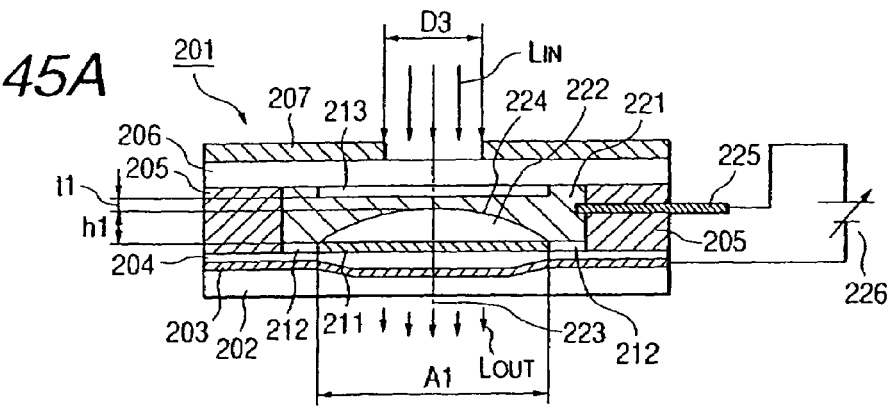
FIGS. 45A, 45B and 45C are detail drawings describing operation of an optical element in the eleventh embodiment of the present invention respectively.
Figure 45B:
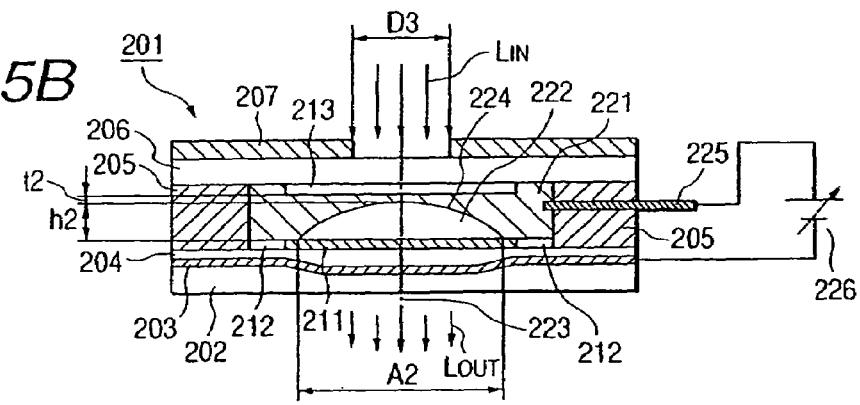
Figure 45C:
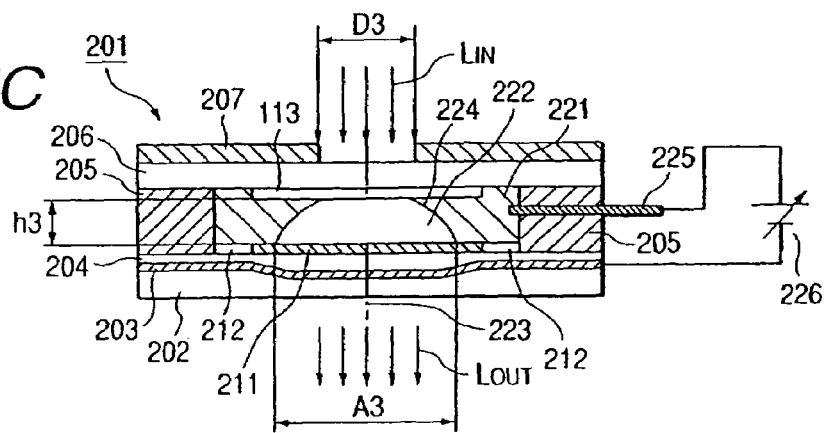

FIGS. 45A to 45C are sectional views to describe configuration of the optical element 201 related to the eleventh embodiment of the present invention and drawings to describe operations in the case of using it as an optical filter. The optical element is configured similar to the one shown in the above described FIG. 2, that is, reference numeral 202 corresponds with the transparent substrate 102, reference numeral 203 does with transparent electrode (ITO) 103, reference numeral 204 does with the insulating layer 104, reference numeral 205 does with the container 105, reference numeral 206 does with the cover plate 106, reference numeral 207 does with the diaphragm plate 107, reference numeral 211 does with the water-repelling film 111, reference numeral 212 does with the hydrophilic film 112, reference numeral 213 does with the hydrophilic film 113, reference numeral 223 does with the optical axis 123, reference numeral 225 does with the stick-like electrode 125, and reference numeral 226 does with the power supply means 126 respectively.

The points and the configuration of the optical element 201 that are difference from the optical element 101 are as follows.

The liquid chamber of the optical element 201 will be filled with two kinds of liquids as described below. At first, onto the water-repelling film 211 on the insulating layer 204 a predetermined quantity of a second liquid 222 is dripped. The second liquid 222 is colorless and transparent, and silicone oil which has specific gravity of 0.85 and a refractive index of 1.38 in a room temperature will be used. On the other hand, the remaining space inside the liquid chamber is filled with the first liquid 221. This first liquid 221 is electrolytic solution, which is a mixture of water and ethyl-alcohol at a predetermined ratio and moreover to which a predetermined quantity of sodium chloride is added, with specific gravity 0.85 and with refractive index 1.38 under a room temperature. Moreover, to the first liquid 221, uncolored water-soluble dye, for example, carbon black or materials in the titan oxide system are added. That is, for the first and the second liquid, liquids which have the same specific gravity and refractive index but have different light beam absorptive powers and are insoluble with each other are selected. There, the both liquids form an interface 224 and each of them exists independently without being mixed together.

Next, the shape of the above described interface will be described.

At first, in the case where no voltage is applied to the first liquid, the shape of the interface 224 is determined by interfacial tension between the both liquids, interfacial tension between the first liquid and the water-repelling film 211 or the hydrophilic film 212 on the insulating layer 204, interfacial tension between the second liquid and the water-repelling film 211 or the hydrophilic film 212 on the insulating layer 204, and volume of the second liquid. In this mode of embodiment selection of materials is implemented so that interfacial tension between silicone oil being material for the second liquid 222 and the water-repelling film 211 becomes relatively small. That is, wet-aptness is high between the both materials and therefore the outer periphery of lens-shaped drops which the second liquid 222 form tends to expand and is stabilized where the outer periphery corresponds with the application region of the water-repelling film 211. That is, the diameter A1 of the bottom surface of the lens which the second liquid 222 forms is equal to the diameter D1 of the water-repelling film 111. On the other hand, since the specific gravity of the both liquids is the same as described above, gravity are not influential. Then the interface 224 becomes spherical, and the radius of curvature as well as the height h1 thereof are determined by the volume of the second liquid 222. In addition, thickness of the first liquid on the optical axis will be t1.

Here, the second liquid 222 is practically transparent, but the first liquid 221 has a predetermined light beam absorptive power due to an added light absorbing material. There, when a light flux is emitted in from the opening of the diaphragm plate 207, the light beam equivalent to the light length of the first liquid 221 is absorbed and the intensity of the light flux emitted out from the transparent substrate 202 decreases. That is, since reducing rate in the light intensity is in proportion to thickness on the optical axis of the first liquid 221 (t1 in FIG. 11), deformation of the interface 224 by the voltage control of the power supply means 226 can realize an optical element which can freely change the transmitting light amount. In addition, the refractive indexes for the first and the second liquids are made to be the same and only intensity of the emitted light can be changed without changing the direction of the incident light flux.

FIGS. 45A to 45C are drawings to describe, in further detail, operations in the case where the optical element 201 is used as a variable ND filter.

FIG. 45A shows the case where the output voltage of the power supply means 226 brought into connection with the optical element 201 is zero or extremely low V1.

As for the shape of the interface 224 at this time, the bottom surface of the lens forming the second liquid 222 has a diameter being A1 and a height being h1. In addition, thickness on the optical axis of the first liquid 221 is t1. $L_{IN}$ is a light flux irradiated from above the optical element 201 and emitted into the opening of the diaphragm 207, and $L_{OUT}$ is a light flux emitted from the optical element 201. In addition, the ratio $L_{OUT}$ against the light flux $L_{IN}$ will be the transmittance of the optical element 201, but since the thickness t1 on the optical axis of the first liquid 221 is large, the transmittance will become low. In addition, as for the light amount distribution of the emitted light flux $L_{OUT}$, larger the distance from the optical axis, that is, the incident height is, the light amount will be decreased, but since the opening diameter D3 of the diaphragm 207 is made small against the diameter A1 of the bottom surface of the lens which the liquid 222 forms, the light amount distribution of the emitted light flux $L_{OUT}$ can be regarded as approximately unanimous.

FIG. 45B shows the case of the output voltage of the power supply means 226 being V2 larger than V1.

At this time, the diameter of the bottom surface of the lens which the second liquid 222 forms is A2, and the height thereof is h2. In addition, thickness of the first liquid 221 on the optical axis is t2 smaller than t1 in FIG. 45A. There, the transmittance of the light flux will become larger than in the case of FIG. 45A.

FIG. 45C shows the case of the output voltage of the power supply means 226 being V3 larger than V2.

At this time, the diameter of the bottom surface of the lens which the second liquid 222 forms will shrink to A3, and the top of the interface 224 will be brought into contact with the hydrophilic film 213 formed on the lower surface of the cover plate 206 to become flat. In addition, the diameter of this flat portion is equal to the diameter D3 of the opening of the diaphragm 207 or larger than D3. Consequently, the thickness on the optical axis of the first liquid 221 becomes zero, as the transmittance will become further larger than in the case of FIG. 45B. Thereafter, even if the output voltage of the power supply means 226 is made to increase further, the interface 224 inside the opening of the diaphragm 207 is not deformed, and therefore, the transmittance in the case where the optical element was used as a variable ND filter will remain constant. The transmittance at this time is expressed by multiplication of transmittances of the transparent substrate 202, the transparent electrode 203, the insulating layer 204, water-repelling film 211, the second liquid 222, the hydrophilic film 213, and the cover plate 206.d Incidentally, when the applying voltage of the power supply means 226 is returned from the state in FIG. 45C to V1, the interface tension of both liquids will go back to the original state. At this time, wet-aptness is good between the first liquid 221 and the hydrophilic film 213 while wet-aptness is poor between the second liquid 222 and the hydrophilic film 213, and therefore the second liquid 222 leaves the hydrophilic film 213 to come back to the state in FIG. 45A. That is, deformation of the interface 224 of the present optical element is reversible on changes in the applying voltage.

Figure 46:
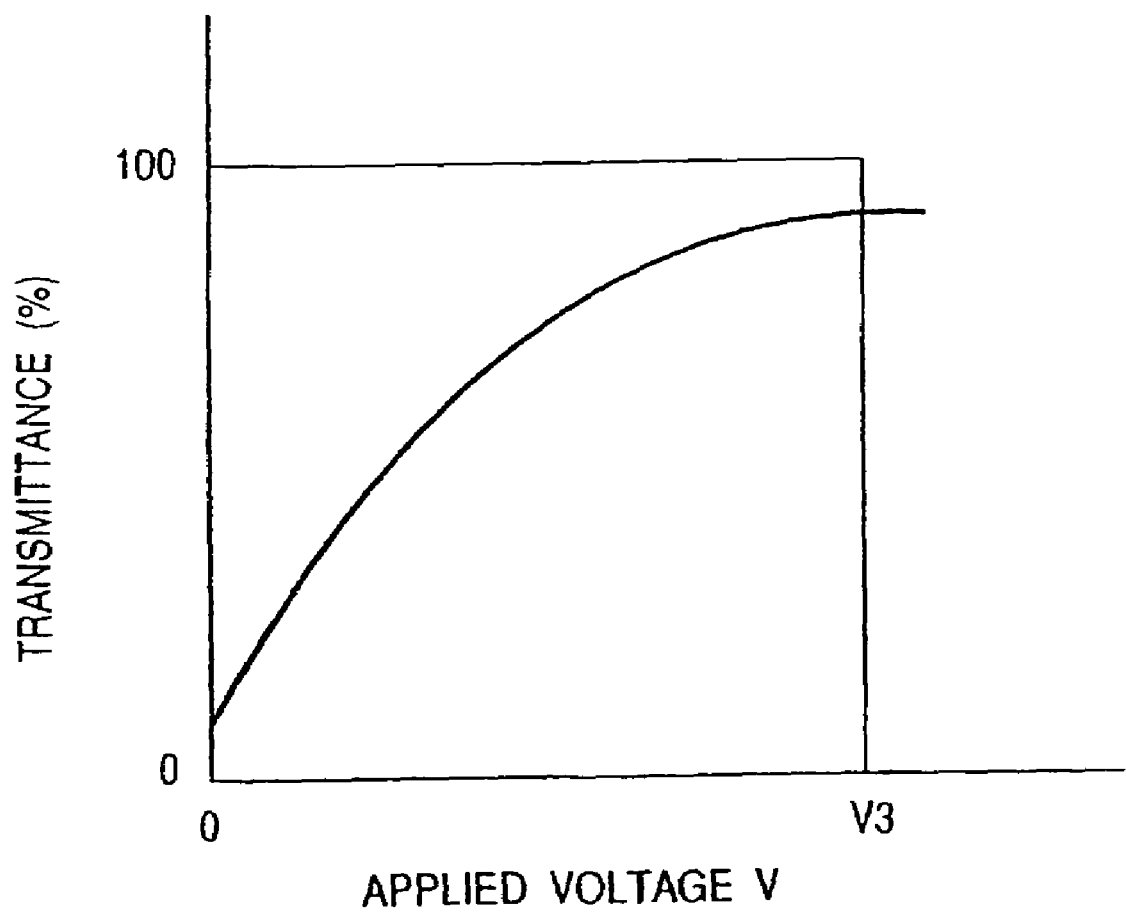
FIG. 46 is a diagram describing transmittance distribution of an optical element in the eleventh embodiment of the present invention.

FIG. 46 is a graph showing relationship on the light transmittance of the optical element 201 for the voltage to be applied to the optical element 201, and as the applying voltage increases, the transmittance rises up and, at the level where the applying voltage reaches $V_3$, the transmittance becomes saturated.

Figure 47:
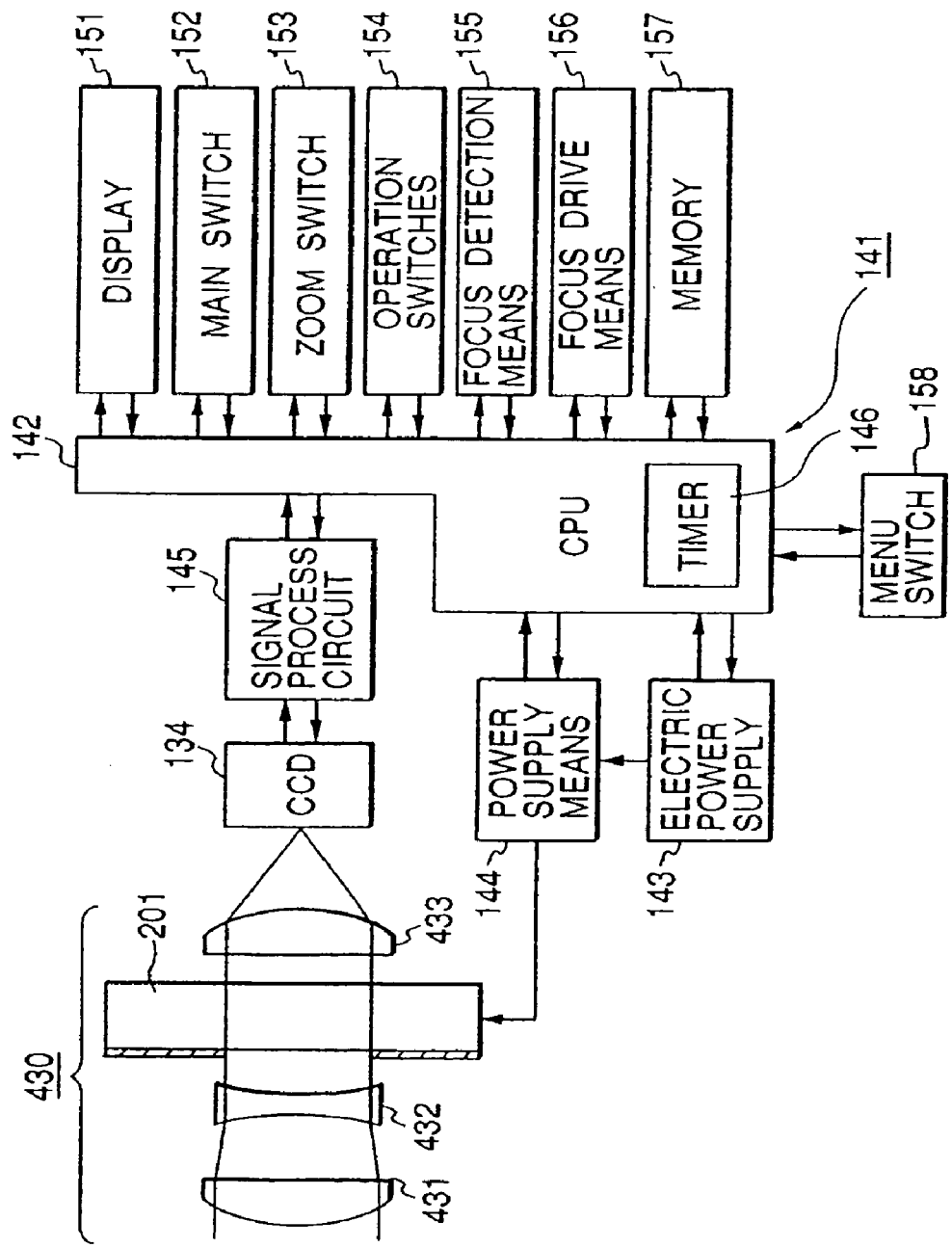
FIG. 47 is a block diagram of an optical apparatus in the eleventh embodiment of the present invention.

FIG. 47 is the one in which the optical element 201 was applied to an optical apparatus. In this embodiment, the optical apparatus 141 will be exemplified, for description, by so-called digital still camera which converts a still image into electric signals with photo-taking means and records them as digital data.

Reference numeral 430 denotes a photo-taking optical system comprising a plurality of lens groups and is configured by first lens group 431, second lens group 432, and the third lens group 433 so that forward and backward movement in the direction of optical axis of the above-described first lens group 431 implements focus adjustment while forward and backward movement in the direction of optical axis of the above-described second lens group 432 implements zooming. The above described third lens group 433 is a relay lens group without movements. In addition, the optical element 201 is disposed between the second lens group 432 and the third lens group 433. The photo-taking means 134 is disposed in the focal position (planned image forming surface) of the photo-taking optical system 430.

Next, operation of the optical element 201 in this eleventh embodiment will be described.

Dynamic range of luminance of subjects existing in the natural world is extremely large, and in order to limit this within a predetermined range, normally the interior of the photo-taking optical system has a mechanical diaphragm mechanism to adjust light amount of the photo-taking light flux. However, it is difficult to make the mechanical diaphragm mechanism small, and under a state of small diaphragm that the diaphragm opening is small, by diffraction phenomena of the light beam due to end surface of diaphragm wings, the resolution of the subject image decreases.

Thus, in this eleventh embodiment, the optical element 201 is used as a variable ND filter replacing the above-described mechanical diaphragm mechanism so that without giving rise to the above-described defects, the light amount passing through the photo-taking optical system is adjusted appropriately.

Figure 48:
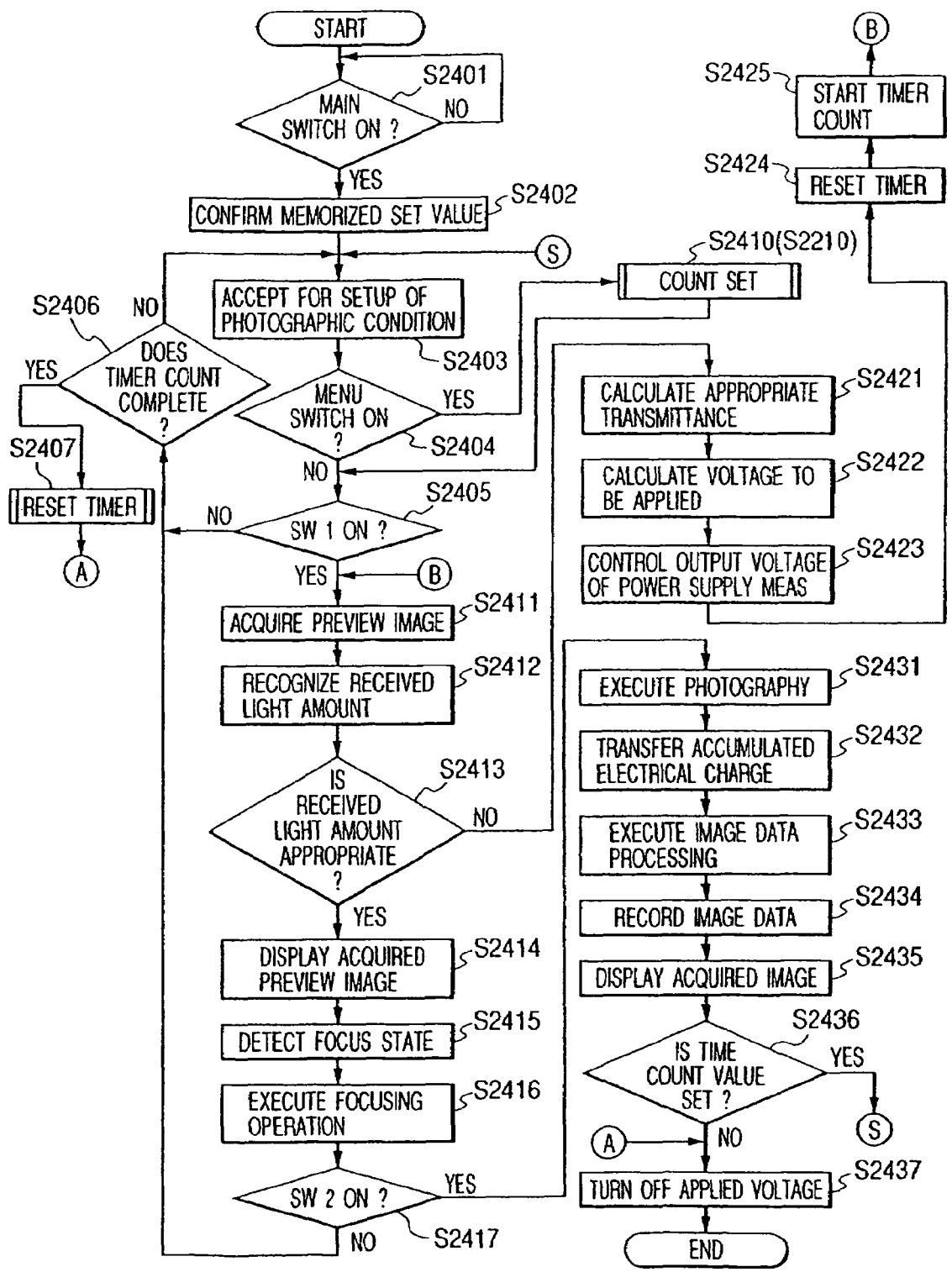
FIG. 48 is a flowchart showing control of an optical apparatus in the eleventh embodiment of the present invention.

FIG. 48 is a control flow chart on the CPU 142 which the optical apparatus 141 having been shown in FIG. 47 has, and the chart will be described with reference to FIG. 47 and FIG. 48. Incidentally, as for the control portions similar to those in the above-described FIG. 43, detailed description thereof will be omitted.

At first, in the step S2401, distinction on whether or not on-operation of the main switch 152 is executed by the photographer is implemented and when the on-operation is not yet executed, the state remains in the step S2401. On the other hand, when on-switch operation of the main switch 152 is distinguished, the CPU 142 gets out of the sleep state so as to execute the step S2402 and onward.

In the step S2402, the set values of the timer 146 stored in the CPU 142 are confirmed. In addition, in the next step S2403 setup of photographic conditions by a photographer is accepted, and in the subsequent step S2404 it is judged whether or not on-operation of the menu switch 158 has been executed by the photographer, and in the case no on-operation has been executed, the process continues to the step S2405. Here, in the case where the menu switch 158 has been operated, the process continues to the subflow of the step S2410 (similar to the step S2210).

When the process continues to the step S2405, judgment as to whether or not on-operation on the pre-photo-taking switch has been executed by the photographer, and in the case no on-operation has been executed, the process continues to the step S2406, and when the timer 146 has started counting it is judged whether or not the value counting is completed, or the state returns to the Step S2403 in the case where the counting is not completed so that acceptance for setup of photographic conditions and judgment on operation of the menu switch 158 are repeated. On the other hand, in the case where value counting of the timer 146 is completed in the step S2206, the process continues to the step S2407, the set value of the timer 146 is reset, and thereafter the process continues to the step S2437.

In addition, in the case where in the above-described step S2405 is judged that on-operation on the pre-photo-taking switch has been executed, the process continues to the step S2411.

Since the step S2411 and step S2412 are similar to the control in the above-described FIG. 43, descriptions thereon will be omitted.

The process continues to the next step S2413 to judge here whether or not the received light amount judged in the above-described step S2412 is appropriate. In addition, when in the present step its appropriateness is recognized, the process continues to the step S314.

On the other hand, when in the step S2413 it is judged that the received light amount judged in the above-described step S2412 is not appropriate, the state leaps to the step S2421, in which the actual received light amount is compared with the appropriate received light amount so as to calculate the appropriate transmittance of the optical element 201 inside the photo-taking optical system 430. In addition, in the next step S2422 the control voltage is calculated in order to acquire the appropriate transmittance calculated in the above-described step S2421. In particular, since the ROM of the CPU 142 stores the relationship on the transmittance toward the applied voltage shown in FIG. 46 as the form of look-up table, the applied voltage toward the transmittance calculated in the step S421 is acquired with reference to the table.

In the next step S2423, the output voltage of the power supply means 144 is controlled so that the voltage acquired in the above-described step S2422 is applied to the optical element 201. Thereafter, the state returns to the step S2411, and until the incident light amount into the photo-taking means 134 becomes appropriate, the steps from preview image acquisition to the control on the power supply means 144 are executed repeatedly. In addition, when the incident light amount into the photo-taking means 134 becomes appropriate, the state shifts from the step S2413 to the step S2414.

Since the step S2414 to the step S2434 are similar to the control in the above described FIG. 43, descriptions thereon will be omitted.

In the next step S2435, the photographed image is displayed in the display 151, and thereafter the process continues to the step S2436, in which it is judged whether or not the counting value of the timer 146 is set. In the case where the counting value of the timer 146 is not set, the process continues to the step S2437 to control the power supply means 144 and to switch off the voltage application to the optical element 101 so that a series of photo-taking operation comes to an end.

In addition, in the case in the step S2436 a counting value of the timer 146 is set, the state returns to the step S2403 again.

Hereafter, in the case where various kinds of switches are not operated during counting, until that counting value is completed, each step of step sequence of S2403 to S2404 to S2405 to S2406 to S2403 is repeated, but when the counting is completed, the process continues from the step S2406 to the step S2407, the counting value of the timer 146 is reset here, and then the process continues to the state S2437 to switch off the voltage application to the optical element 201 so that a series of photo-taking operation comes to an end.

According to the above-described eleventh embodiment, effects as described below will be attained:

1) Regardless of the photo-taking operation, in the case where operation on various operation switch group is not executed, the voltage application to the optical element 201 can be switched off, and therefore power saving of the optical apparatus in its entirety will become feasible.

2) Since the photographer himself/herself can set the voltage applying time to the optical element 201, power saving operation reflecting the photo-taking situation and the photographer's intention, etc. will become possible. That is, regardless of the mode of use of the optical element, similar effects can be made attainable.

Twelfth Embodiment (This embodiment is the one which detects on capacitance of the optical element 101 and utilizes its detection outcome to control the optical apparatus and detect failures.)

Prior to describing the twelfth embodiment, additional descriptions on the optical element shown in FIG. 2 will be made. In the configuration shown in the above described FIG. 2, the optical element 101 has a capacitor structure with the first liquid 121 being one electrode and with the transparent electrode 103 being the other electrode. Here, since thicknesses of the water-repelling film 111 and the hydrophilic film 112 are extremely thin, their existence is ignored, and if area of the portion where the first liquid 121 and the insulating layer 104 are brought into contact is assumed as S1 and thickness of the insulating layer 104 is also assumed as d, the optical element 101 is a capacitor with electrode plate area of S1 and the inter-electrode gap d, and as the interface shape 124 is deformed to give rise to changes in the area S1, the capacitor's capacitance alters.

Here, when the switch 127 (in FIG. 2) is operated to close so that a voltage is applied to the first liquid 121, electric capillary phenomenon causes the interfacial tension between the first liquid 121 and the hydrophilic film 112 to decrease and the first liquid trespasses the interface between the hydrophilic film 112 and the water-repelling film 111 to penetrate into the water-repelling film 111. Consequently, as in FIG. 3, the diameter of the bottom surface of the lens which the second liquid forms decreases from A1 to A2 while its height increases from h1 to h2 and the area increases from S1 to S2.

In addition, thickness of the first liquid on the optical axis will be t2. Thus, application of voltage to the first liquid 121 changes balance in the interfacial tensions of the two kinds of liquid so that the interface between the two liquids is deformed.

In addition, the first as well as the second liquid have different refractive indexes to provide with a power as an optical lens and therefore the optical element 101 will be a variable focul lens with deformation of the interface 124.

As a result thereof, as in FIG. 3, the optical element 101 is equivalent to a capacitor in terms of energy, and its capacitance is proportional to the area where the first liquid 121 and the insulating layer 104 are in contact. Accordingly, the optical element 101 of the present invention, in which deformation of the interface 124 gives rise to change in capacitance, has a characteristic that higher the applying voltage is, larger the capacitance becomes.

Next, with reference to FIG. 49 and FIGS. 51A to 51E, the configuration and a producing method of the power supply means used in this embodiment will be described.

Reference numeral 130 denotes a central processing unit (hereinafter to be abbreviated to CPU) to control operation of a later-described optical apparatus 150 in its entirety, and is one-chip microcomputer having ROM, RAM, EEPROM, A/D converter function, D/A converter function, and PWM function. Reference numeral 131 denotes power supply means for applying voltages to the optical element 101, and its configuration will be described as follows.

Reference numeral 132 denotes a direct current electric power supply incorporated into the optical apparatus 150 such as a dry cell, etc., reference numeral 133 denotes a DC/DC converter to increase the voltage outputted from the electric power supply 132 to a desired voltage value corresponding with control signal of the CPU 130, reference numerals 134 and 135 are amplifiers to amplify in accordance with controlling signals of the CPU 130, for example, frequency/duty ratio variable signals to be realized by PWM function the signal levels to reach voltage levels increased with the DC/DC converter 133. In addition, the amplifier 134 is brought into connection with the transparent electrode 103 being the second electrode of the optical element 101 and the amplifier 135 with a stick-like electrode 125 being the first electrode of the optical element 101 respectively via LC upstanding resonance circuit 162 of the capacitance detection means 161 to be described later.

That is, corresponding with the controlling signals of the CPU 130, output voltage of the electric power supply 132 will be applied to the optical element 101 by the DC/DC converter 133, the amplifier 134 and the amplifier 135 with a desired voltage value, frequency and duty.

FIGS. 51A to 51E are explanatory views describing voltage waveforms to be outputted from the amplifiers 134 and 135. Incidentally, under assumption that a voltage of 100V was outputted into the amplifiers 134 and 135 from the DC/DC converter 133 respectively, following description will be implemented.

Figure 51A:
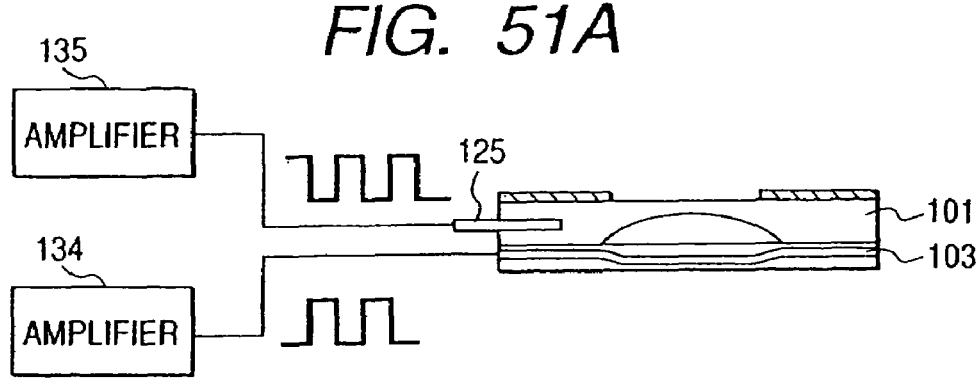
FIGS. 51A, 51B, 51C, 51D and 51E are diagrams describing voltage waveform outputted from an amplifier of a power supply means related to the twelfth embodiment of the present invention respectively.
Figure 51B:
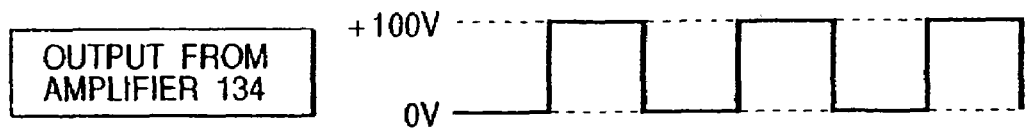
Figure 51C:
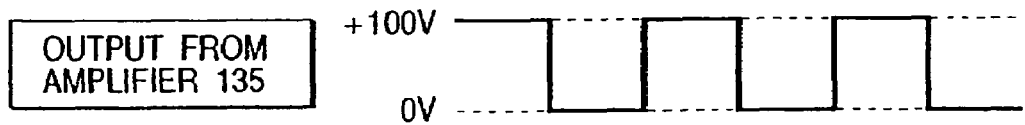
Figure 51D:
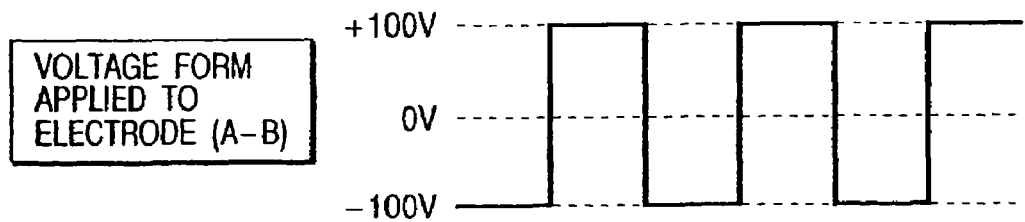

As having been shown in FIG. 51A, the amplifiers 134 and 135 are respectively brought into connection with the optical elements 101. From the amplifier 134, as shown in FIG. 51B, a voltage of rectangular waveform with desired frequency and duty ratio is outputted by the controlling signals of the CPU 130. On the other hand, from the amplifier 135, as having been shown in FIG. 51C, a voltage of rectangular waveform with the opposite phase of the amplifier 134, the same frequency and the same duty ratio is outputted by the controlling signals of the CPU 130. This will cause the voltage to be applied between the transparent electrode 103 and the stick-like electrode 125 of the optical element 101 to become a rectangular waveform of ±100V, that is, an alternate voltage as shown in FIG. 51D.

Therefore, an alternate voltage will be applied to the optical element 101 with the power supply means 131.

Figure 51E:
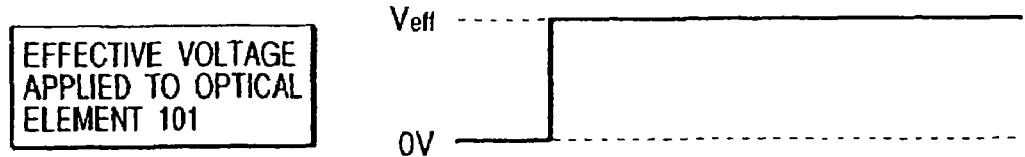

Incidentally, since an effective voltage applied to the optical element 101 from the application start can be expressed as in FIG. 51E, hereafter the waveform of the alternate voltage applied to the optical element 101 shall be expressed according to the FIG. 51E.

Incidentally, in the above-described description, a rectangular waveform voltage was described to be outputted from the amplifiers 134 and 135, but it goes without saying that likewise configuration will be taken for sine waves.

In addition, in the above-described description, the case where the electric power supply 132 is incorporated into the optical apparatus 150 was described, but the case where an exterior-type electric power supply or power supply means implement alternate application into the optical element 101 will do as well.

Figure 49:
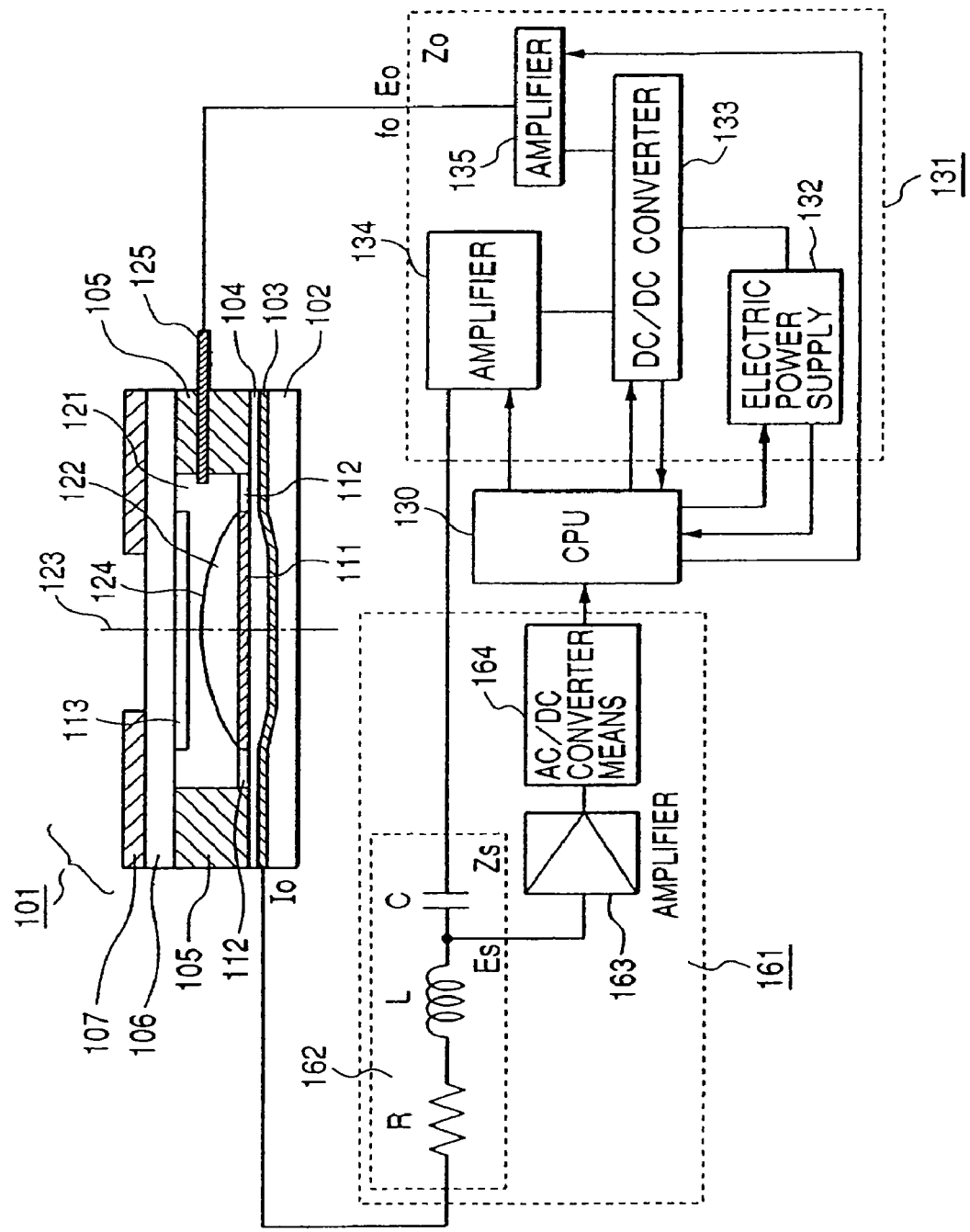
FIG. 49 is a block diagram of electrostatic capacity detecting means and power supply means and a sectional view of an optical element in the twelfth embodiment of the present invention.

Next, with reference to FIG. 49, configuration of the capacitance detection means and the detection method of this embodiment will be described. Applying an alternate current drive voltage $E_0$ with a predetermined frequency $f_0$ to the stick-like electrode 125 being the first electrode of the optical element 101 having an unknown capacitance from the power supply means 131 having output impedance $Z_0$, the electric current $i_0$ that flew out from the transparent electrode 103 being the second electrode of the optical element 101 will flow into the series LC resonance circuit 162 having impedance Zs, giving rise to detection voltage Es in the middle point of the series LC resonance circuit 162. This detected voltage Es will be proportionate to the electric current $i_0$.

In addition, the detection voltage Es in the middle point of the series LC resonance circuit 162 is amplified by A times with the amplifier 163 so that the detection voltage A of the amplifier 163×Es is converted into direct voltage with the AC/DC conversion means 164 to be supplied to CPU 130.

In addition, here the resonance circuit in series was used as means to detect capacitance, but a bridge in parallel used in an LCR meter known as an capacitance detection apparatus and the like may be used.

Figure 50:
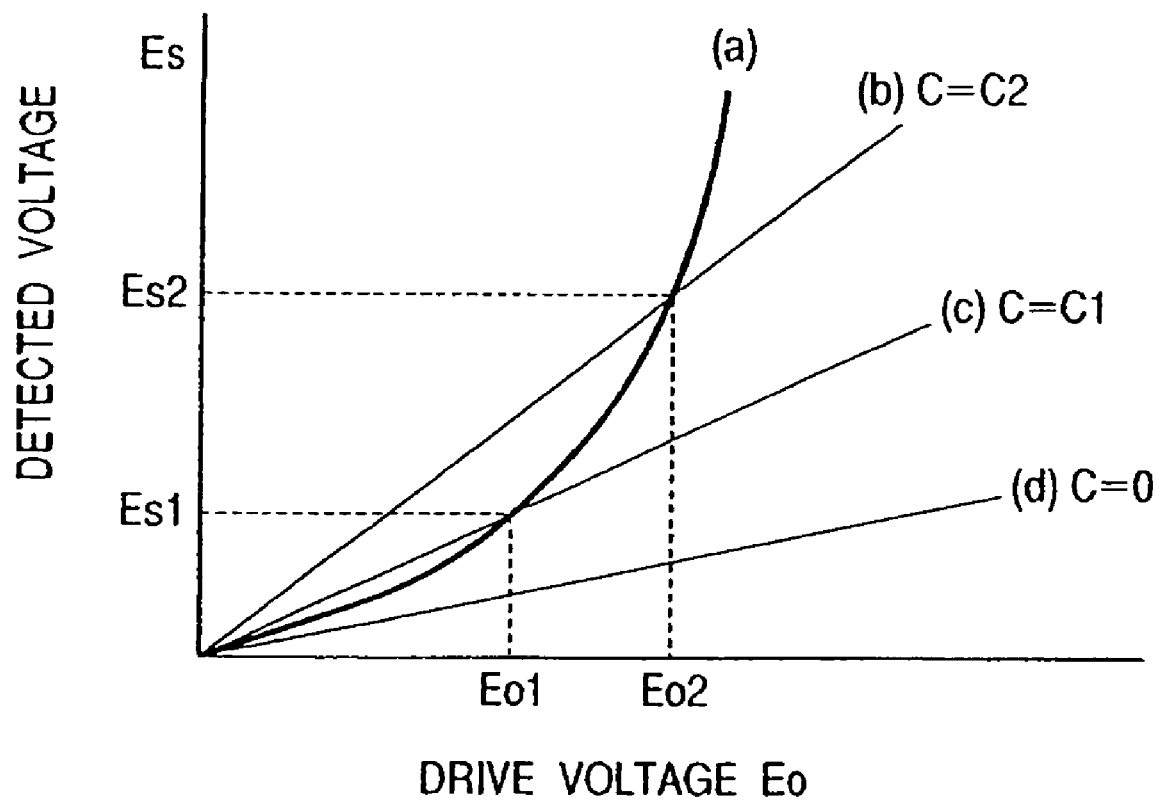
FIG. 50 is a diagram of relationship between driving voltage and detecting voltage in the twelfth embodiment of the present invention.

FIG. 50 is a graph expressing relationship between the drive voltage $E_0$ and the detected voltage Es generated in the middle point of the series LC resonance circuit 162. Capacitance falls within the range of C1<C2. In addition, (d) C=0 in FIG. 50 is a graph showing relationship between the drive voltage and the detected voltage when the circuit was short-circuited in FIG. 49.

The optical element 101 is an element having a capacitor structure, and its capacitance is variable with respect to the applying voltage, and higher the applying voltage is, larger the capacitance becomes When the drive voltage $E_01$ is applied by the power supply means 131, the interface shape 124 of the optical element 101 is deformed and its capacitance will become C1, giving rise to the detected voltage Es1.

Next, since application of Eo2 larger than the drive voltage of Eo1 will further deform the interface shape 124 of the optical element 101, the capacitance of the optical element 101 will become C2, giving rise to the detected voltage Es2.

Therefore, the relationship between the drive voltage $E_o$ on the optical element 101 and the detected voltage Es will represent a curve as (a) in FIG. 50.

Figure 52:
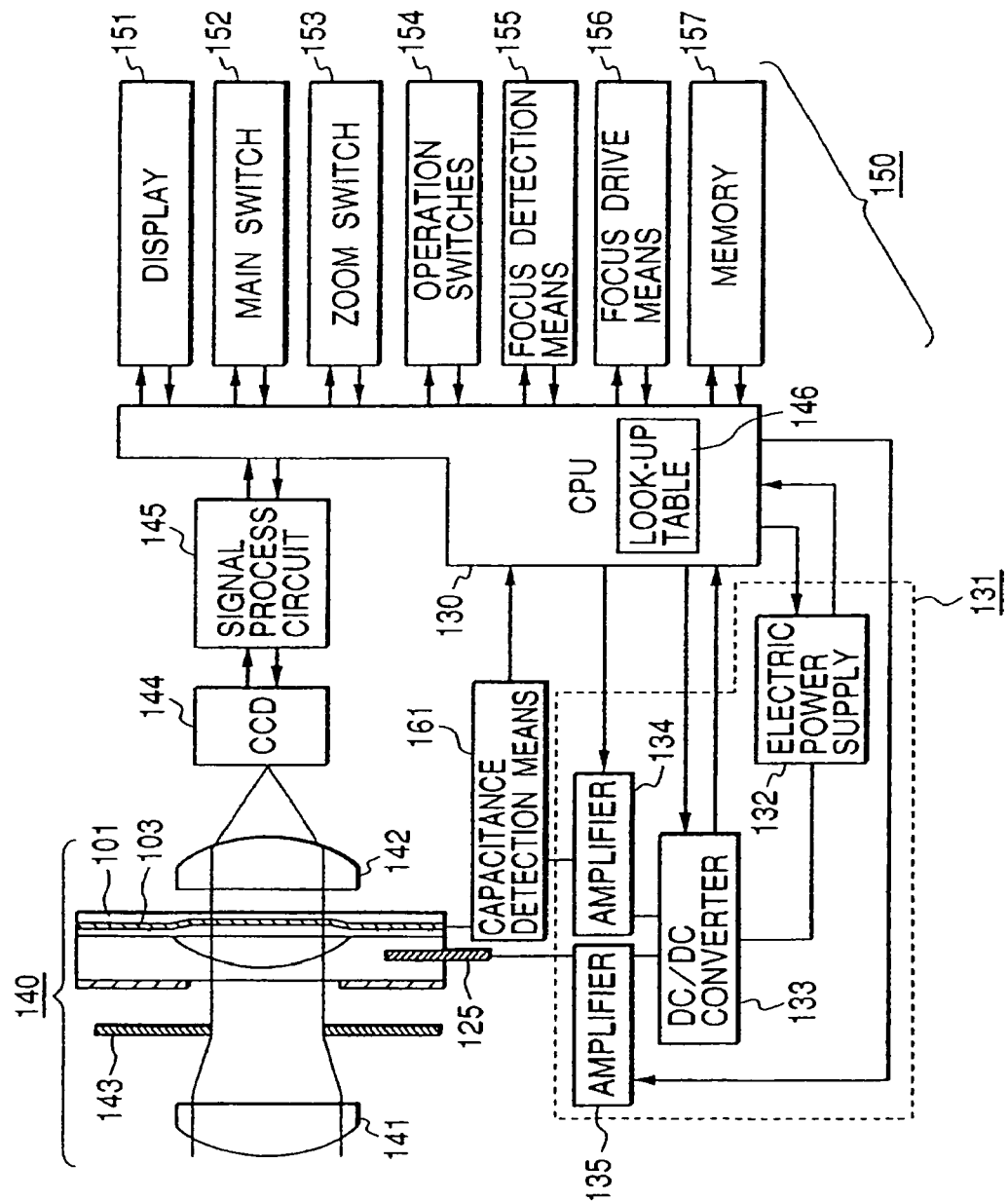
FIG. 52 is a block diagram of an optical apparatus incorporating an optical element related to the twelfth embodiment of the present invention.

FIG. 52 is the one in which the optical element 101 was applied to an optical apparatus having approximately the same configuration as in FIG. 9, and detailed descriptions thereon will be omitted.

Reference numeral 146 in the drawing denotes a look-up table provided within the CPU 130, which is a corresponding table on the focal length f of the photo-taking optical system 140, the drive voltages Eo of the power supply means 131, and the detected voltage Es of the electrostatic detecting means, and by reading them out the voltage to be applied to the optical element 101 is controlled. In addition, reference numeral 161 denotes a capacitance detection means having been shown in FIG. 49.

Figure 53:
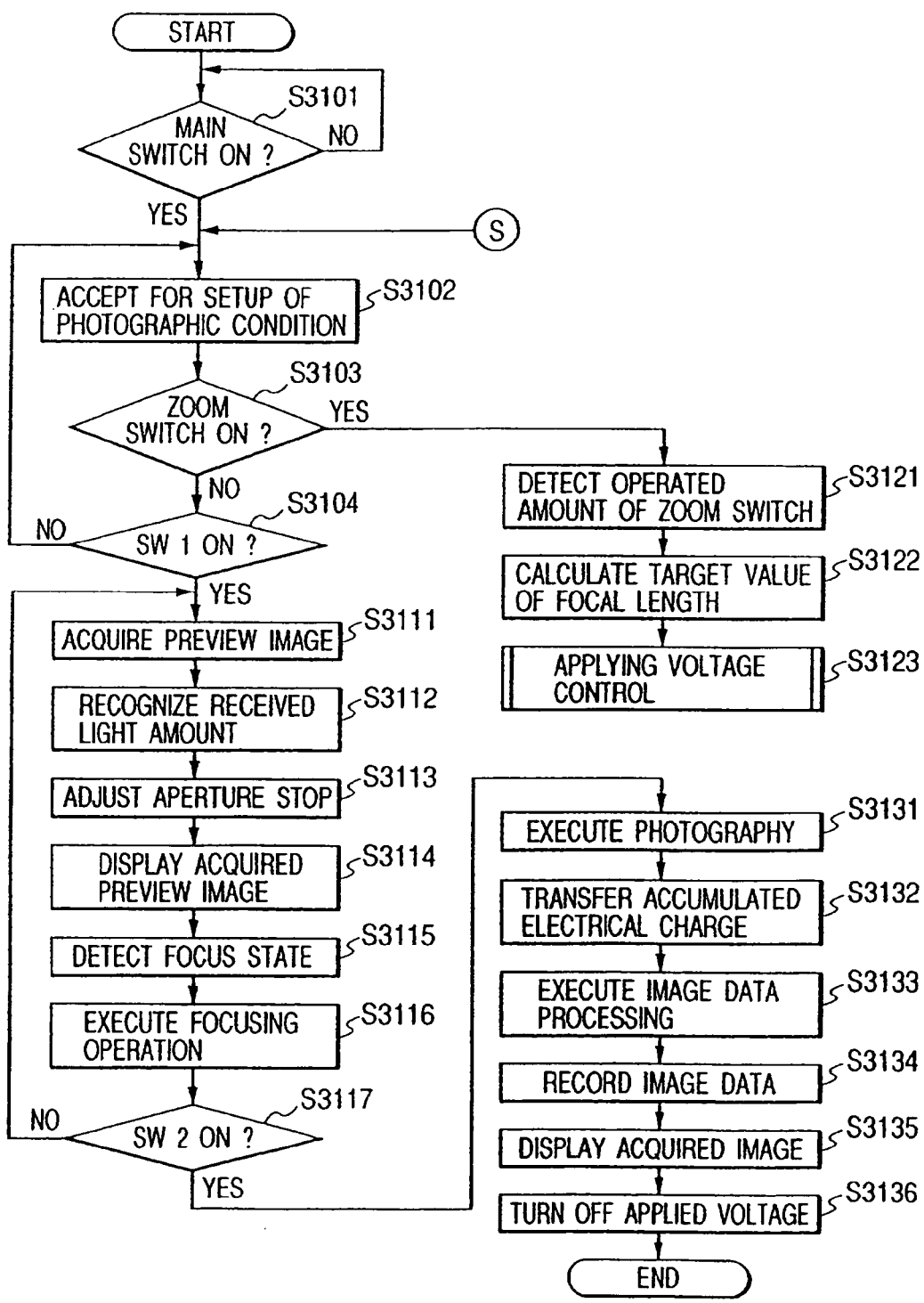
FIG. 53 is a control flow diagram of an optical apparatus related to the twelfth embodiment of the present invention.
Figure 54:
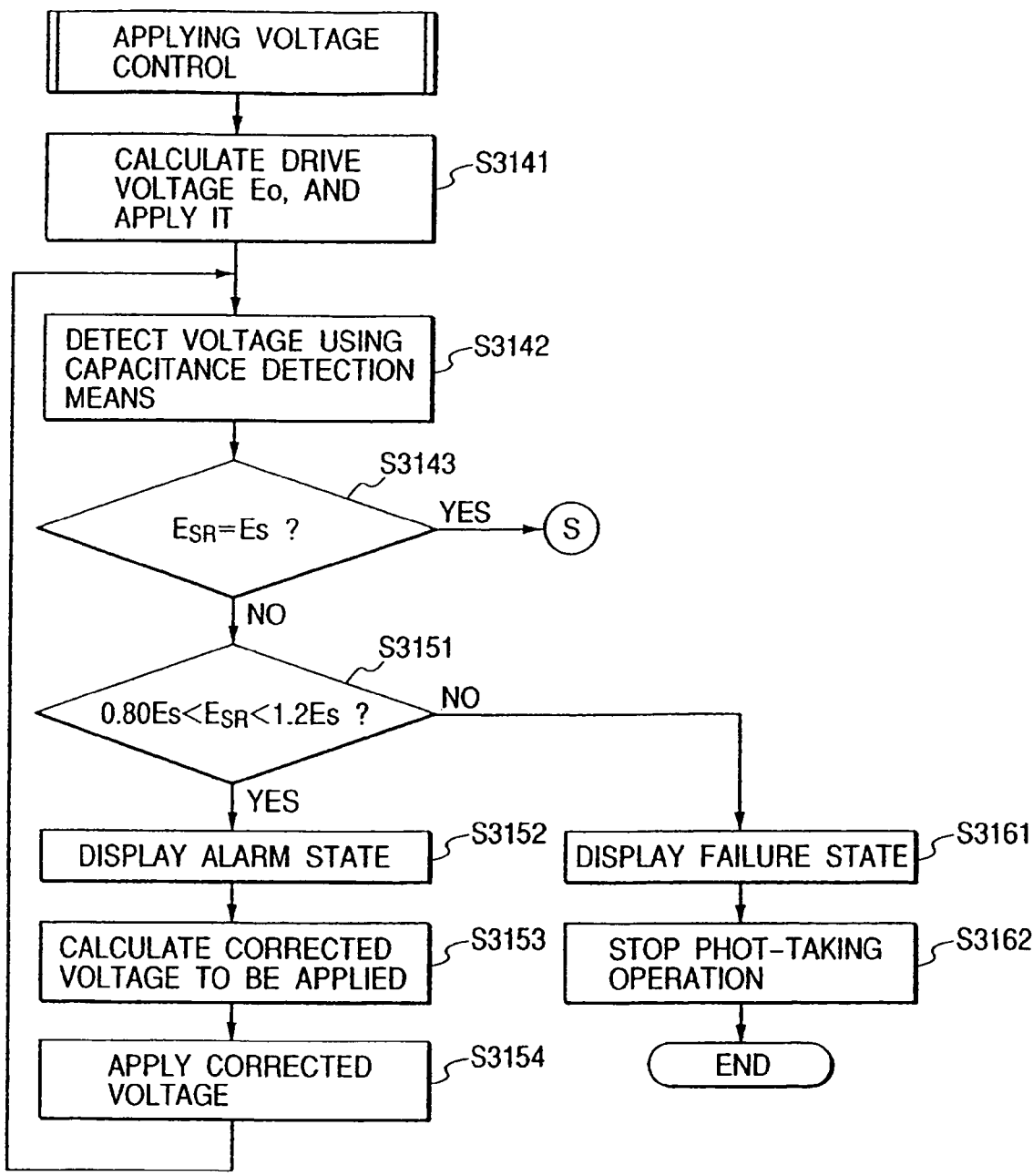
FIG. 54 is a control flow diagram of an optical apparatus related to the twelfth embodiment of the present invention.

FIG. 53 and FIG. 54 are control flow charts on the CPU 130 which the optical apparatus 150 having been shown in FIG. 52 has. The control flow of the optical apparatus 150 will be described as follows.

In the step S3101, distinction on whether or not on-operation of the main switch 152 is executed is implemented and when the on-operation is not yet executed, a waiting mode state in which operation of various switches is waited for remains. In the step S3101, when on-switch operation of the main switch 152 is distinguished, the waiting mode will be overridden and the process continues to the subsequent step S3102 and onward.

In the step S3102, setup of photographic conditions by a photographer is accepted. For example, setup such as setup on exposure control mode (shutter priority AE and program AE, etc.), image quality mode (size in the number of recording pixels and size of image compression rate, etc.), and the electronic flash mode (compulsory flash and flash prohibition, etc.), etc. is implemented.

In the step S3103, distinction on whether or not the zoom switch 153 has been operated by the photographer is implemented. In the case no on-operation has been executed, the process continues to the step S3104. Here, in the case where the zoom switch 153 has been operated, the process continues to the step S3121. In the step S3121, the operation quantity of the zoom switch 153 (operation direction and on-time period, etc.) is detected, altered designated value with respect to the focal length of the photo-taking optical system 140 is calculated based on that operation quantity, and the focal length f after the change is calculated (3122). After the calculations are completed, the process continues to the subroutine of "applying voltage control" of the next step S3123.

In the step S3141, the drive voltage $E_0$ is calculated in order to acquire the focal length f calculated in the above-described step S3122. In particular, since the ROM in the CPU 130 stores the relationship between the drive voltage $E_0$ and the detected voltage $E_s$ corresponding to the respective focal lengths f as the look-up table 146, a predetermined drive voltage $E_0$ is applied to the optical element 101 by the power supply means 131 with reference to the table 146. The capacitance detection means 161 detects the detected voltage $E_{SR}$ at that time (S3142) and judges whether or not the $E_{SR}$ value is equal to the read out $E_S$ from the look-up table 146 in the CPU 130 (S3143). Here both parties coincide, the state returns to the step S3102, but if they do not coincide, the state will shift to S3151 and onward. Incidentally, in some cases of the characteristic of the optical apparatus, the step S3143 may pick up not only complete agreement between the actual detected voltage $E_{SR}$ and the value in the look-up table 146 but also may be caused to permit a certain degree of range.

In the step S3151, it is judged whether or not the value of the detected voltage $E_{SR}$ is within a predetermined range, and if within the range, the state shifts to the step S3152. If it is out of the range, the optical element 101 is judged to suffer from failure, and the state shifts to the step S3161 to display the failure on the display 151 (S3161) and cancel the photo-taking operation (S3162). Incidentally, in some cases of the characteristic of the optical apparatus, the range of the step S3151 may either be a little wider or be a little narrower.

On the other hand, in the step S3152 an alarm is displayed onto the display 151 so that the corrected voltage V is calculated by the equation (1) (S3153), and based on that calculation outcome the corrected voltage V is applied to the optical element 101 by the power supply means 131 (S3154).

$$V = [\text{voltage } V \text{ for previous time}] + \frac{|E_S - E_{SR}|}{2} \quad (1)$$

In addition, the state returns to the step S3142. That is, the steps S3142 to S3154 are repeated until the detected voltage value $E_{SR}$ agrees with the voltage $E_S$ read out from the look-up table 146.

In addition, when the both parties agree, the state returns to the step S3102. That is, in the case where the zoom switch 153 is kept in operation, the step S3102 to the step S3123 are repeatedly executed and at the time point when the on-operation of the zoom switch S153 is completed, the state shifts to the step S3104.

In the step S3104, distinction on whether or not on-operation on the pre-photo-taking switch (indicated as SW1 in the flow chart in FIG. 53) among the operation switches 154 has been executed by the photographer is implemented. In the case where the on-operation is not executed, the state returns to the step S3102 so that acceptance for setup of photographic conditions and distinguishing on operation of zoom switch 153 is repeated. Once the pre-photo-taking switch is determined to have been operated on in the step S3104, the process continues on to the step S3111.

Incidentally, the onward steps are approximately the same as the above-described respective embodiments, descriptions thereon will be omitted.

According to the above-described twelfth embodiment, by utilizing the drive electrode of the optical element in the optical element having a capacitor structure, its capacitance can be detected. In addition, since changes in capacitance corresponds not with changes in distance but with changes in area, capacitance can be detected accurately.

In addition, in the optical apparatus in which the optical element having capacitor structure was incorporated, by detection of capacitance of the optical element, control of the applying voltage to the optical element for obtaining desired focal distance can be executed. In addition, there are effects that failure of the optical apparatus can be detected.

Incidentally, also in this embodiment, as an example of the optical element, a digital still camera was taken, but it goes without saying that also a video camera or a silver halide film camera, etc. other than that can be taken likewise without spoiling the effects.

Thirteenth Embodiment

Figure 55:
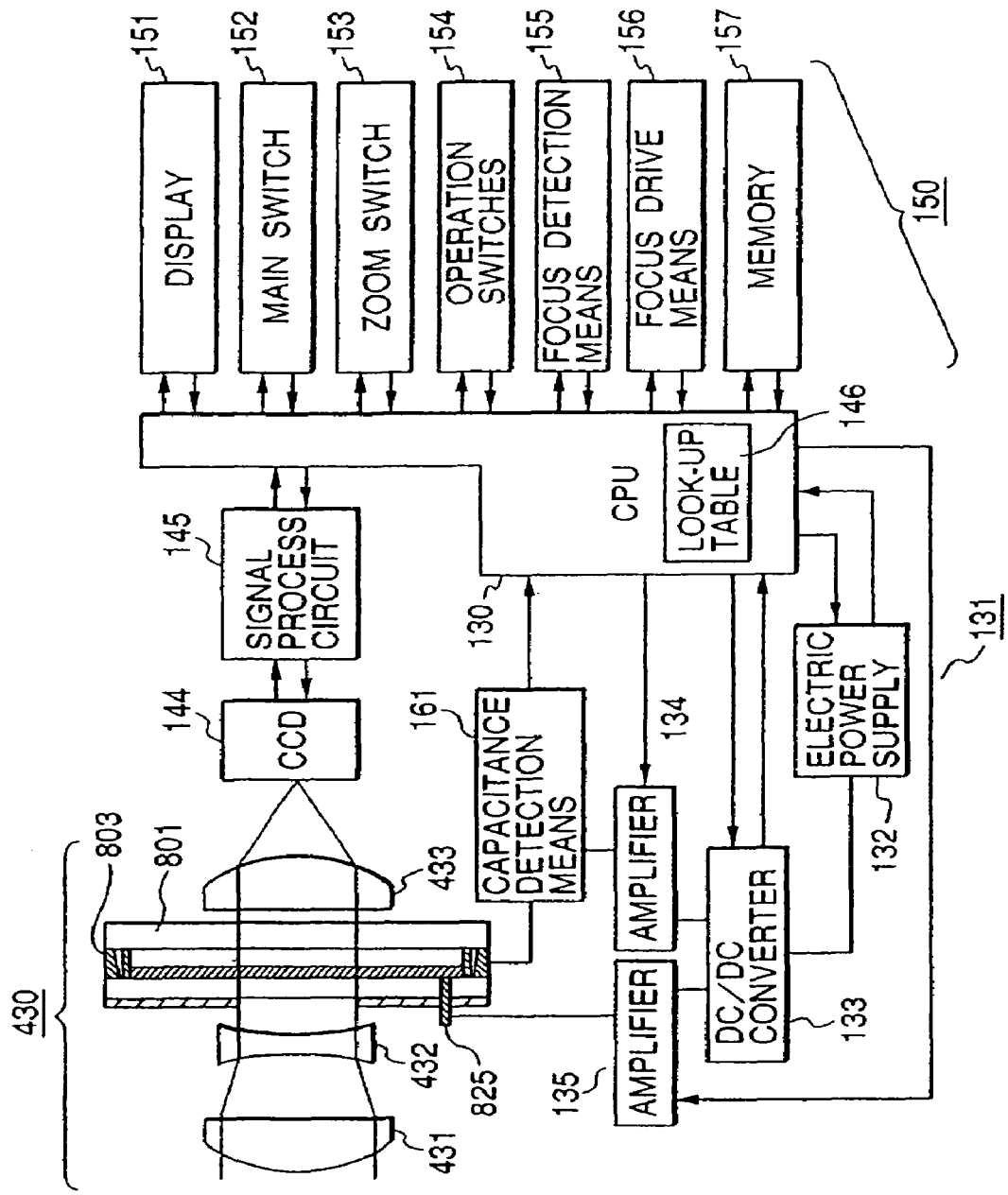
FIG. 55 is a block diagram of an optical apparatus incorporating electrostatic capacity detecting means and power supply means and an optical element related to the thirteenth embodiment of the present invention.
Figure 56:
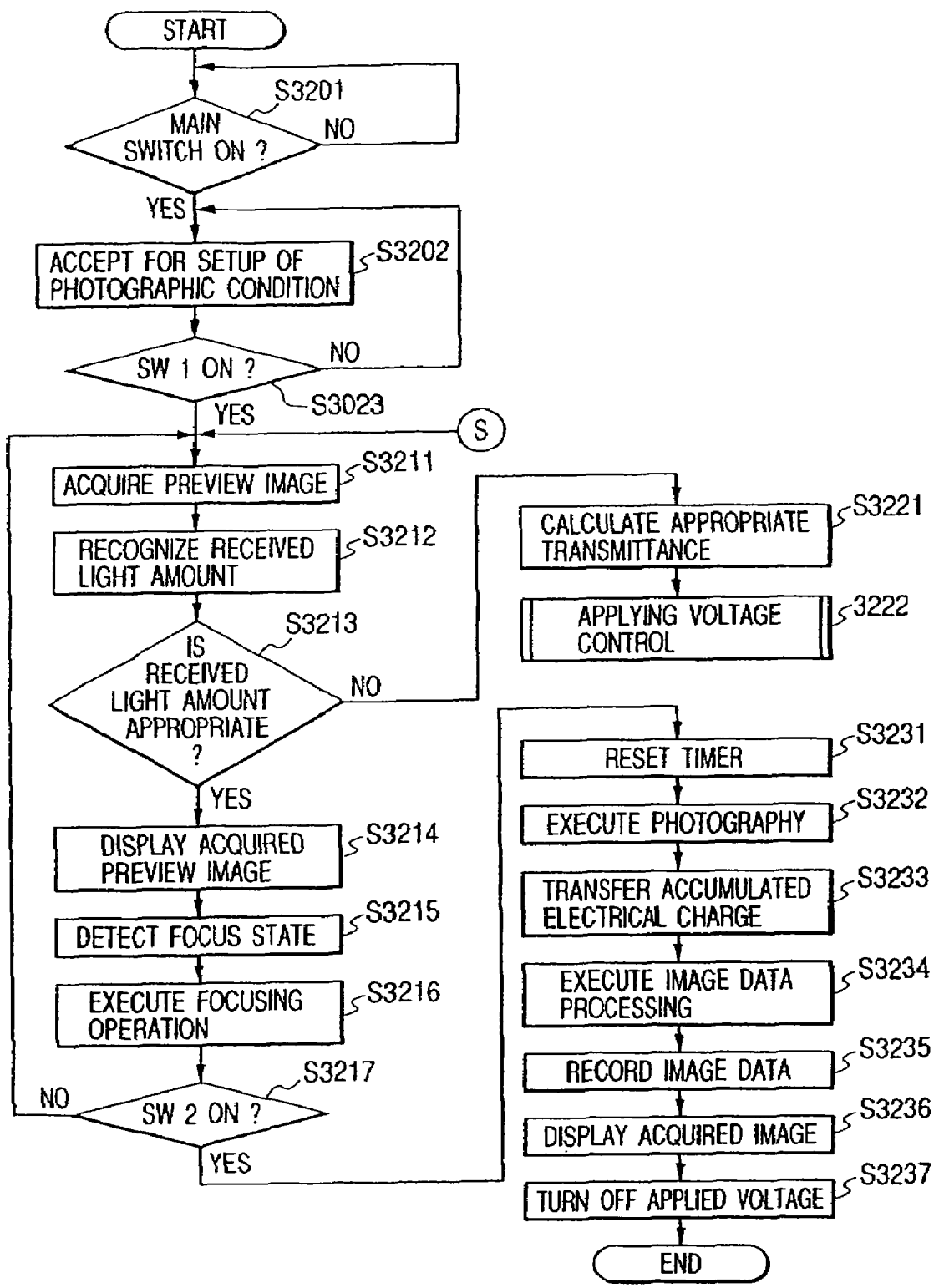
FIG. 56 is a control flow diagram of an optical apparatus related to the thirteenth embodiment of the present invention.
Figure 57:
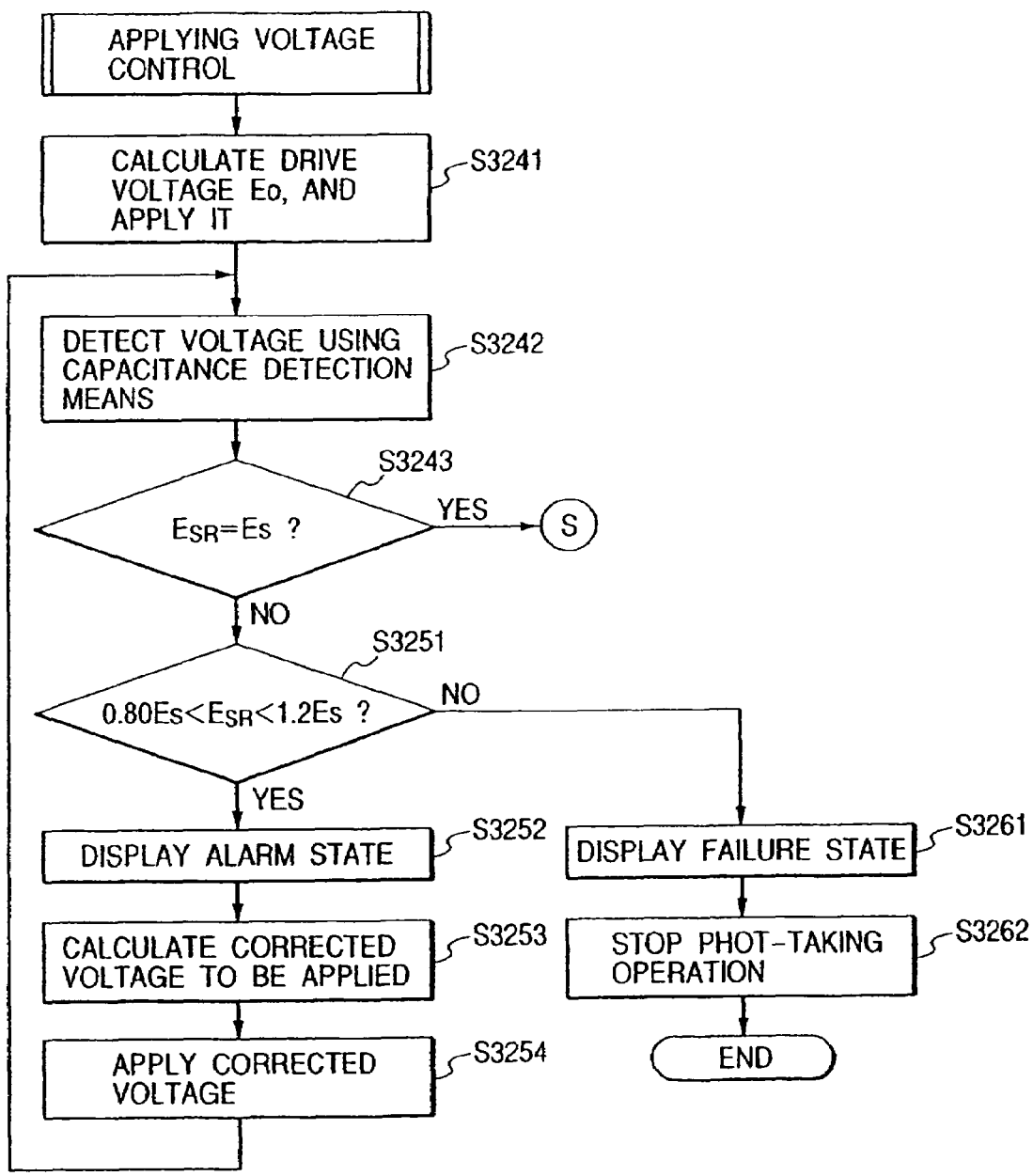
FIG. 57 is a control flow diagram of an optical apparatus related to the thirteenth embodiment of the present invention.

FIG. 55 to FIG. 57 are drawings related to the thirteenth embodiment of the present invention, and the optical element 801 in FIG. 55 is the one with configuration shown in FIG. 16, and therefore, descriptions thereon will be omitted.

In this embodiment, as in the twelfth embodiment, reference numeral 161 denotes the capacitance detection means to detect capacitance of the optical element 801, and the optical apparatus 150 will be exemplified, for description, by so-called digital still camera which converts a still image into electric signals with photo-taking means and records them as digital data. Incidentally, as for those similar to the ones in the twelfth embodiment, detailed description thereon will be omitted.

In FIG. 55, reference numeral 430 denotes a photo-taking optical system comprising a plurality of lens groups and are configured by first lens group 431, second lens group 432, and the third lens group 433. Forward and backward movement in the optical axis of the first lens group 431 implements focus adjustment. Forward and backward movement in the optical axis of the second lens group 432 implements zooming. The third lens group 433 is a relay lens group without movement. In addition, an optical element 801 is disposed between the second lens group 432 and the third lens group 433. In addition, the photo-taking means 430 is disposed in the focusing position (planned image forming surface) of the photo-taking optical system 144.

The optical element 801 in this embodiment is the one which is used as a variable ND filter.

FIG. 56 and FIG. 57 are a control flow chart on the CPU 130 which the optical apparatus 150 having been shown in FIG. 55 has. The control flow of the optical apparatus 150 will be described with reference to FIG. 55 as well as FIG. 56 as follows. Incidentally, as for the control flow similar to that in the above-described embodiment, detailed description thereof will be omitted.

In the step S3201, distinction on whether or not on-operation of the main switch 152 is executed by the photographer is implemented and when the on-operation is not yet executed, the state remains in the step S3201.

In the step S3201, when on-switch operation of the main switch 152 is distinguished, the CPU 130 gets out of the sleep state so as to execute the step S3202 and onward.

In the step S3202, setup of photographic conditions by a photographer is accepted.

In the step S3203, it is distinguished whether or not on-operation on the pre-photo-taking switch (indicated as SW1 in the flow chart) has been executed by the photographer. In the case where the on-operation is not executed, the state returns to S3202 so that distinguishing on acceptance for setup of photographic conditions is repeated.

Once the pre-photo-taking switch is determined to have been operated on in the step S3203, the process continues on to the step S3211.

Since the step S3211 as well as the step S3212 is similar to those in the twelfth embodiment, description thereon will be omitted.

In the step S3213, it is distinguished whether or not the received light amount judged in the above-described step S3212 is appropriate.

In addition, when in the present step its appropriateness is recognized, the process continues to the step S3214.

On the other hand, when in the step S3213 it is distinguished that the received light amount judged in the above described step S3212 is not appropriate, the state leaps to the step S3221.

In the step S3221 the appropriate transmittance is calculated, after the calculation is completed, the process continues to the subroutine of "applying voltage control" of the next step S3222.

In the step S3241, the drive voltage $E_0$ is calculated in order to acquire the appropriate transmittance calculated in the above-described step S3221. In particular, since the ROM inside the CPU 130 stores the relationship between the drive voltage $E_0$ and the detected voltage $E_s$ corresponding to the respective transmittance as the look-up table 146, a predetermined drive voltage Eo is applied to the optical element 101 by the power supply means 131 with reference to the table.

The capacitance detection means 161 detects the detected voltage $E_{SR}$ at that time (S3242) and judges whether or not the $E_{SR}$ value is equal to the read out $E_s$ from the look-up table 146 in the CPU (S3243).

Here the both parties coincide, the state returns to the step S3202, but if they do not coincide, the state will shift to S3251 and onward.

Incidentally, in some cases of the characteristic of the optical apparatus, in the step S3243 the coincidence may mean not only complete agreement between the actual detected voltage $E_{SR}$ and the value in the look-up table 146 but also may be caused to permit a certain degree of range. In the step S3251, it is judged whether or not the value of the detected voltage $E_{SR}$ is within a predetermined range, and if within the range, the state shifts to the step S3252. If it is out of the range, the optical element 101 is judged to suffer from failure, and the state shifts to the step S3261 to display the failure on the display 151 (S3261) and cancel the photo-taking operation (S3262). Incidentally, in some cases of the characteristic of the optical apparatus, the range of the step S3151 may either be a little wider or be a little narrower.

On the other hand, in the step S3252 an alarm is displayed onto the display 151 so that the corrected voltage V is calculated by the equation (2) (S3253), and based on that calculation outcome the corrected voltage V is applied to the optical element 801 by the power supply means 131 (S3254).

$$V = [\text{voltage } V \text{ for previous time}] + \frac{|E_S - E_{SR}|}{2} \quad (2)$$

In addition the state returns to the step S3242. That is, the step S3242 to S3254 are repeated until the detected voltage value $E_{SR}$ agrees with the voltage $E_s$ read out from the look-up table 146.

Since the step S3214 to the step S3237 are similar to those in the twelfth embodiment, descriptions thereon will be omitted.

As described so far, in the optical apparatus in which the optical element having capacitor structure was incorporated, detection of capacitance of the optical element can control the applying voltage to the optical element for obtaining desired transmittance. In addition, there are effects that failure of the optical apparatus can be detected.

Incidentally, also in this embodiment, as an example of the optical element, a digital still camera was taken, but it goes without saying that also a video camera or a silver halide film camera, etc. other than that can be taken likewise without spoiling the effects.

What is claimed is:

1. An optical apparatus comprising:
   an optical element having a container sealing a first liquid that is conductive or polarized and a second liquid that does not mutually mix with the first liquid, with an interface of the first liquid and second liquid in a predetermined form, wherein optical characteristics of the optical element change according to change of interface form due to application of voltage between first and second electrodes provided in the container;
   a power supply circuit which applies a predetermined voltage to the electrodes in order to change the interface form;
   a detecting circuit which detects change of the interface form; and
   a controlling circuit which controls the applied voltage signal based on information detected by the detecting circuit.

2. An optical apparatus according to claim 1, wherein the detecting circuit detects the change in the interface form based on a capacitace that is proportional to an area of the interface form.

* * * * *